US012750194B2

(12) United States Patent
Sevindik

(10) Patent No.: US 12,750,194 B2
(45) Date of Patent: Sep. 29, 2026

(54) METHODS AND APPARATUS FOR TRANSMITTING DATA IN COMMUNICATIONS NETWORKS

(71) Applicant: Charter Communications Operating, LLC, St. Louis, MO (US)

(72) Inventor: Volkan Sevindik, Parker, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 241 days.

(21) Appl. No.: 18/804,510

(22) Filed: Aug. 14, 2024

(65) Prior Publication Data

US 2024/0413952 A1 Dec. 12, 2024

Related U.S. Application Data

(63) Continuation of application No. 17/520,247, filed on Nov. 5, 2021, now Pat. No. 12,088,529.

(51) Int. Cl.
*H04L 5/00* (2006.01)

(52) U.S. Cl.
CPC .................................. *H04L 5/0055* (2013.01)

(58) Field of Classification Search
CPC ... H04L 5/0055; H04L 1/1825; H04L 1/1835; H04L 1/1848; H04L 1/1854; H04L 1/1887; H04L 1/1896; H04L 49/90
See application file for complete search history.

(56) References Cited

U.S. PATENT DOCUMENTS

2014/0181611 A1* 6/2014 Currivan ............... H04L 1/1877 714/751
2017/0265216 A1* 9/2017 Andreoli-Fang ... H04L 12/4625

* cited by examiner

*Primary Examiner* — Charles C Jiang
*Assistant Examiner* — Rachel Elizabeth Cerlanek
(74) *Attorney, Agent, or Firm* — Straub & Straub; Stephen T. Straub; Michael P. Straub

(57) ABSTRACT

The presentation invention relates to methods and apparatus for communicating data in communications networks. An exemplary method in accordance with one embodiment includes the steps of: establishing a first Transmission Control Protocol (TCP) session between a wireless base station and a Cable Modem Termination System (CMTS); receiving via the first TCP session at the CMTS a first set of TCP data packets from a cable modem located on a communications path between the wireless base station and the CMTS, the first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

20 Claims, 32 Drawing Sheets

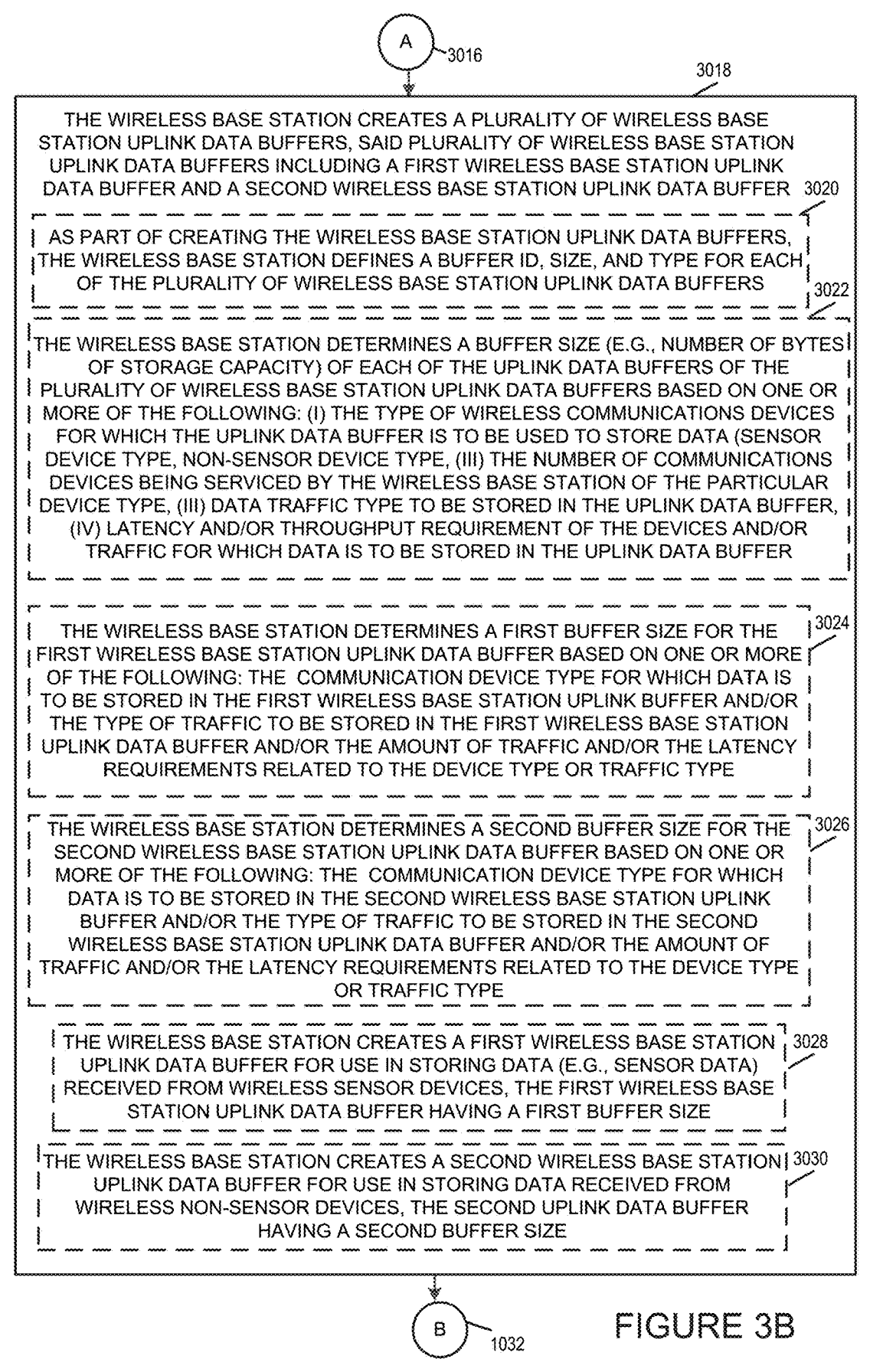

A 3016

3018

THE WIRELESS BASE STATION CREATES A PLURALITY OF WIRELESS BASE STATION UPLINK DATA BUFFERS, SAID PLURALITY OF WIRELESS BASE STATION UPLINK DATA BUFFERS INCLUDING A FIRST WIRELESS BASE STATION UPLINK DATA BUFFER AND A SECOND WIRELESS BASE STATION UPLINK DATA BUFFER

3020

AS PART OF CREATING THE WIRELESS BASE STATION UPLINK DATA BUFFERS, THE WIRELESS BASE STATION DEFINES A BUFFER ID, SIZE, AND TYPE FOR EACH OF THE PLURALITY OF WIRELESS BASE STATION UPLINK DATA BUFFERS

3022

THE WIRELESS BASE STATION DETERMINES A BUFFER SIZE (E.G., NUMBER OF BYTES OF STORAGE CAPACITY) OF EACH OF THE UPLINK DATA BUFFERS OF THE PLURALITY OF WIRELESS BASE STATION UPLINK DATA BUFFERS BASED ON ONE OR MORE OF THE FOLLOWING: (I) THE TYPE OF WIRELESS COMMUNICATIONS DEVICES FOR WHICH THE UPLINK DATA BUFFER IS TO BE USED TO STORE DATA (SENSOR DEVICE TYPE, NON-SENSOR DEVICE TYPE, (III) THE NUMBER OF COMMUNICATIONS DEVICES BEING SERVICED BY THE WIRELESS BASE STATION OF THE PARTICULAR DEVICE TYPE, (III) DATA TRAFFIC TYPE TO BE STORED IN THE UPLINK DATA BUFFER, (IV) LATENCY AND/OR THROUGHPUT REQUIREMENT OF THE DEVICES AND/OR TRAFFIC FOR WHICH DATA IS TO BE STORED IN THE UPLINK DATA BUFFER

3024

THE WIRELESS BASE STATION DETERMINES A FIRST BUFFER SIZE FOR THE FIRST WIRELESS BASE STATION UPLINK DATA BUFFER BASED ON ONE OR MORE OF THE FOLLOWING: THE COMMUNICATION DEVICE TYPE FOR WHICH DATA IS TO BE STORED IN THE FIRST WIRELESS BASE STATION UPLINK BUFFER AND/OR THE TYPE OF TRAFFIC TO BE STORED IN THE FIRST WIRELESS BASE STATION UPLINK DATA BUFFER AND/OR THE AMOUNT OF TRAFFIC AND/OR THE LATENCY REQUIREMENTS RELATED TO THE DEVICE TYPE OR TRAFFIC TYPE

3026

THE WIRELESS BASE STATION DETERMINES A SECOND BUFFER SIZE FOR THE SECOND WIRELESS BASE STATION UPLINK DATA BUFFER BASED ON ONE OR MORE OF THE FOLLOWING: THE COMMUNICATION DEVICE TYPE FOR WHICH DATA IS TO BE STORED IN THE SECOND WIRELESS BASE STATION UPLINK BUFFER AND/OR THE TYPE OF TRAFFIC TO BE STORED IN THE SECOND WIRELESS BASE STATION UPLINK DATA BUFFER AND/OR THE AMOUNT OF TRAFFIC AND/OR THE LATENCY REQUIREMENTS RELATED TO THE DEVICE TYPE OR TRAFFIC TYPE

3028

THE WIRELESS BASE STATION CREATES A FIRST WIRELESS BASE STATION UPLINK DATA BUFFER FOR USE IN STORING DATA (E.G., SENSOR DATA) RECEIVED FROM WIRELESS SENSOR DEVICES, THE FIRST WIRELESS BASE STATION UPLINK DATA BUFFER HAVING A FIRST BUFFER SIZE

3030

THE WIRELESS BASE STATION CREATES A SECOND WIRELESS BASE STATION UPLINK DATA BUFFER FOR USE IN STORING DATA RECEIVED FROM WIRELESS NON-SENSOR DEVICES, THE SECOND UPLINK DATA BUFFER HAVING A SECOND BUFFER SIZE

B 1032

FIGURE 3B

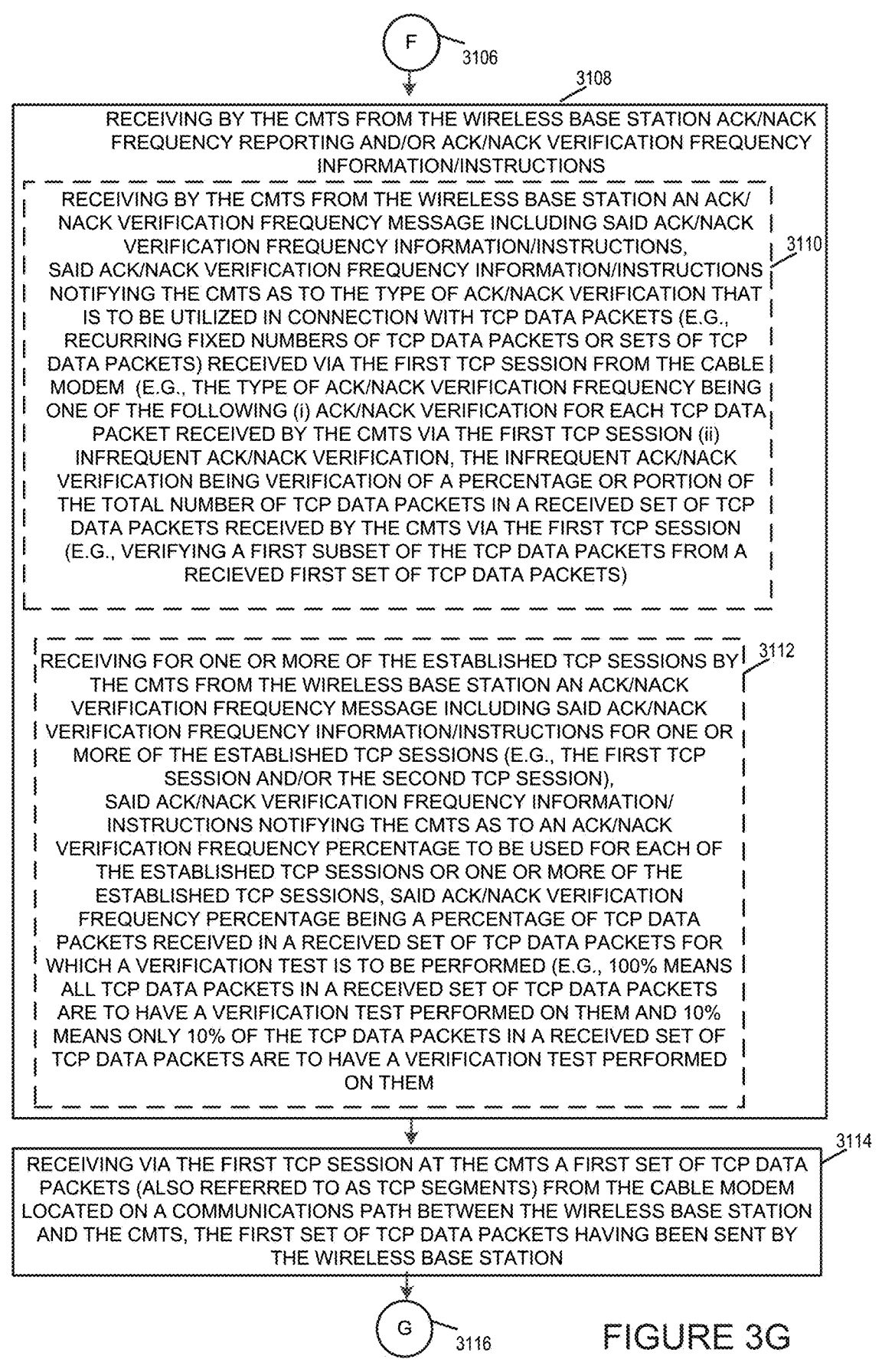

F 3106

3108

RECEIVING BY THE CMTS FROM THE WIRELESS BASE STATION ACK/NACK FREQUENCY REPORTING AND/OR ACK/NACK VERIFICATION FREQUENCY INFORMATION/INSTRUCTIONS

3110

RECEIVING BY THE CMTS FROM THE WIRELESS BASE STATION AN ACK/NACK VERIFICATION FREQUENCY MESSAGE INCLUDING SAID ACK/NACK VERIFICATION FREQUENCY INFORMATION/INSTRUCTIONS, SAID ACK/NACK VERIFICATION FREQUENCY INFORMATION/INSTRUCTIONS NOTIFYING THE CMTS AS TO THE TYPE OF ACK/NACK VERIFICATION THAT IS TO BE UTILIZED IN CONNECTION WITH TCP DATA PACKETS (E.G., RECURRING FIXED NUMBERS OF TCP DATA PACKETS OR SETS OF TCP DATA PACKETS) RECEIVED VIA THE FIRST TCP SESSION FROM THE CABLE MODEM (E.G., THE TYPE OF ACK/NACK VERIFICATION FREQUENCY BEING ONE OF THE FOLLOWING (i) ACK/NACK VERIFICATION FOR EACH TCP DATA PACKET RECEIVED BY THE CMTS VIA THE FIRST TCP SESSION (ii) INFREQUENT ACK/NACK VERIFICATION, THE INFREQUENT ACK/NACK VERIFICATION BEING VERIFICATION OF A PERCENTAGE OR PORTION OF THE TOTAL NUMBER OF TCP DATA PACKETS IN A RECEIVED SET OF TCP DATA PACKETS RECEIVED BY THE CMTS VIA THE FIRST TCP SESSION (E.G., VERIFYING A FIRST SUBSET OF THE TCP DATA PACKETS FROM A RECIEVED FIRST SET OF TCP DATA PACKETS)

3112

RECEIVING FOR ONE OR MORE OF THE ESTABLISHED TCP SESSIONS BY THE CMTS FROM THE WIRELESS BASE STATION AN ACK/NACK VERIFICATION FREQUENCY MESSAGE INCLUDING SAID ACK/NACK VERIFICATION FREQUENCY INFORMATION/INSTRUCTIONS FOR ONE OR MORE OF THE ESTABLISHED TCP SESSIONS (E.G., THE FIRST TCP SESSION AND/OR THE SECOND TCP SESSION), SAID ACK/NACK VERIFICATION FREQUENCY INFORMATION/INSTRUCTIONS NOTIFYING THE CMTS AS TO AN ACK/NACK VERIFICATION FREQUENCY PERCENTAGE TO BE USED FOR EACH OF THE ESTABLISHED TCP SESSIONS OR ONE OR MORE OF THE ESTABLISHED TCP SESSIONS, SAID ACK/NACK VERIFICATION FREQUENCY PERCENTAGE BEING A PERCENTAGE OF TCP DATA PACKETS RECEIVED IN A RECEIVED SET OF TCP DATA PACKETS FOR WHICH A VERIFICATION TEST IS TO BE PERFORMED (E.G., 100% MEANS ALL TCP DATA PACKETS IN A RECEIVED SET OF TCP DATA PACKETS ARE TO HAVE A VERIFICATION TEST PERFORMED ON THEM AND 10% MEANS ONLY 10% OF THE TCP DATA PACKETS IN A RECEIVED SET OF TCP DATA PACKETS ARE TO HAVE A VERIFICATION TEST PERFORMED ON THEM

3114

RECEIVING VIA THE FIRST TCP SESSION AT THE CMTS A FIRST SET OF TCP DATA PACKETS (ALSO REFERRED TO AS TCP SEGMENTS) FROM THE CABLE MODEM LOCATED ON A COMMUNICATIONS PATH BETWEEN THE WIRELESS BASE STATION AND THE CMTS, THE FIRST SET OF TCP DATA PACKETS HAVING BEEN SENT BY THE WIRELESS BASE STATION

G 3116

FIGURE 3G

METHODS AND APPARATUS FOR TRANSMITTING DATA IN COMMUNICATIONS NETWORKS

RELATED APPLICATIONS

The present application is a continuation of U.S. patent application Ser. No. 17/520,247 which was filed on Nov. 5, 2021 and which was published as U.S. Patent Application Publication No. US 2023-0142266 A1 on May 11, 2023 and which is hereby expressly incorporated by reference in its entirety.

FIELD OF INVENTION

The present invention relates to methods and apparatus for communicating or transmitting data, e.g., data packets, in an efficient manner in a communications network, e.g., a cable network. The present invention also relates to methods and apparatus for increasing the speed with which Transmission Control Protocol (TCP) data packets are transmitted in cable networks. The present invention is also related to methods and apparatus for selecting a type of verification testing and/or reporting to be performed on a particular data session, for example based on the type of traffic to be communicated using the data session. The present invention is also directed to implementing dynamic transmission control protocol verification testing and reporting methods and apparatus in cable systems, e.g., Data Over Cable Service Interface Specification (DOCSIS) networks. Various features of the present invention also relate to methods and apparatus for dynamically managing data buffers for transmitting uplink and/or downlink data traffic in one or more of the following: wireless base stations, cable modems, and cable modem termination systems. The present invention also relates to methods and apparatus for storing and/or buffering and transmitting data in cable modems, cable modem termination systems and wireless base stations in a manner allowing for efficient and fast communication of packets, e.g., TCP data packets, between a wireless base station and a cable modem termination system via a cable modem.

BACKGROUND OF THE INVENTION

Transmission Control Protocol (TCP) is the main data transmission protocol for Internet communications today. TCP is also used in wireless networks to transmit data from a core network to wireless base stations, e.g., Citizens Broadband Radio Devices (CBSDs) operating in Citizen Citizens Broadband Radio Service networks. However, the TCP protocol was developed for computer networks that is cable networks. As a result TCP has been modified for wireless network data transmission numerous times.

One of the main TCP features is the slow start feature. With this feature, a transmitting device first sends a small amount of data to a receiving device, and then waits for an acknowledgement, i.e., ACK message, that the small amount of data was correctly received by the receiving device. Once the transmitting device receives the acknowledgement message, then the transmitting device doubles the amount of data that is sent the next time. This process continues until the receiving device sends a negative acknowledgement, i.e., NACK message. Upon the transmitting device receiving the NACK message, the transmitting device starts the process over from the very beginning again sending a small amount of data to the receiving device and then once again increasing the amount when an ACK message is received. This data transmission process continues for the duration of the TCP session.

However, some subscribers such as for example utility companies require extremely fast uplink connections for their devices. There are various sensors and other devices which do not require constant network connections but do require need high network availability. That is for example, when sensors (e.g., wireless sensors) wake up and want to communicate with a wireless base station, e.g., CBSD, a connection should be provided immediately regardless of the wireless base stations resources, or cable network (e.g., DOCSIS) network capacity. This poses challenges to service providers with wireless base stations and the cable networks as to how to efficiently and effectively provide the required speed and network capacity for such data transmission. While increasing the number of wireless base stations and upgrading the cable network is a possibility it is extremely expensive and also time consuming so that it is not practical in that it can be readily implemented.

From the above it should be understood that there is a need for new and/or improved methods and apparatus for efficiently and effectively communicating and managing the communication of data, e.g., TCP data packets, between devices in communications networks. There is a further new and/or improved methods and apparatus for providing fast uplink data services in a cost efficient manner, e.g., without adding additional network base stations or upgrading a service providers cable networks with faster equipment or additional cabling. Furthermore, there is a need for a technology solution to how to increase the speed of data communications such as TCP data packets between devices in mixed technology communications networks (e.g., communications networks including wireless and cable sub-networks). There is a further need for new and/or improved methods and apparatus for increasing the speed of communicating or transmitting TCP data packets in an efficient manner in a communications network, e.g., a cable network. There is a further need for new and/or improved methods and apparatus for selecting a type of verification testing and/or reporting, e.g., TCP verification testing and/or reporting, to be performed on a particular data session, for example based on the type of traffic to be communicated using the data session. There is a further need for new and/or improved methods and apparatus for implementing dynamic transmission control protocol verification testing and reporting methods and apparatus in cable systems, e.g., Data Over Cable Service Interface Specification (DOCSIS) networks. There is a further need for new and/or improved methods and apparatus for dynamically managing data buffers for transmitting uplink and/or downlink data traffic in one or more of the following wireless base stations, cable modems, and cable modem termination systems. There is a further need for new and/or improved methods and apparatus for storing and/or buffering and transmitting data in cable modems, cable modem termination systems and wireless base stations in a manner allowing for efficient and fast communication of packets, e.g., TCP data packets, between a wireless base station and a cable modem termination system via a cable modem. There is a further need for new and/or improved methods and apparatus for storing and/or buffering and transmitting data between cable modems, cable modem termination systems and wireless base stations which allows for the dynamic selection and modification of buffering, transmitting, verifying and acknowledging data transmission based on traffic type and/or amount of traffic to be communicated in a session.

SUMMARY OF THE INVENTION

Some service providers which operate both wireless and wired networks use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations, e.g., CBSDs, is connected to a separate cable modem (CM) and each of the separate cable modems is in turn connected to a cable modem termination system (CMTS). The cable modem termination system is a server typically residing in the service provider's data center or cable head end. The cable modem termination system is connected to the service provider's core network, e.g., a 5G core network. In some situations, the service provider's data center and in turn the cable modem termination system are located in the service provider's core network. The cable modem termination system receives data from core network elements and/or devices and will schedule and send this data to the wireless base stations, e.g., CBSDs, via the cable modems to which the wireless base stations are connected. cable modem termination system does not have any information about the wireless base stations, e.g., CBSDs, or other users that are connected to the wireless base stations, e.g., CBSDs. Each cable modem termination system may, and typically does, have a plurality of cable modems connected to it. In some examples, the cable modem termination system supports thousands or tens of thousands of cable modems which are connected to it.

As discussed above, there are various services provided by service providers which require fast uplink data connections and data transfer such as utility company with wireless sensor devices.

The present invention provides new and/or improved methods and apparatus for communicating or transmitting data, e.g., data packets, in an efficient manner in a communications network, e.g., a cable network. Various embodiments of the present invention provide new and/or improved methods and apparatus for increasing the speed with which Transmission Control Protocol (TCP) data packets are transmitted in cable networks. Various embodiments of the present invention also provide new and/or improved methods and apparatus for selecting a type of verification testing and/or reporting to be performed on a particular data session, for example based on the type of traffic to be communicated using the data session. Various embodiments of the present invention also provide new and/or improved methods and apparatus for implementing dynamic transmission control protocol verification testing and reporting methods and apparatus in cable systems, e.g., Data Over Cable Service Interface Specification (DOCSIS) networks. Various features of the present invention also provide new and/or improved methods and apparatus for dynamically managing data buffers for transmitting uplink and/or downlink data traffic in one or more of the following wireless base stations, cable modems, and cable modem termination systems. Various embodiments of the present invention also provide new and/or improved methods and apparatus for storing and/or buffering and transmitting data in cable modems, cable modem termination systems and wireless base stations in a manner allowing for efficient and fast communication of packets, e.g., TCP data packets, between a wireless base station and a cable modem termination system via a cable modem. Various embodiments of the present invention provide new and/or improved methods and apparatus for suppressing the TCP feedback mechanism in order to increase the speed of uplink data transmissions. Various embodiments of the present invention provide new and/or improved methods to speed up or increase the speed of uplink traffic communications, i.e., the transmission of uplink data packets, over cable, e.g., DOCSIS networks, by changing the TCP protocol feed back mechanism so that ACK/NACK messages are not sent per packet but for an entire uplink buffer of packets, i.e., a set of packets. Various embodiments of the present invention solve one or more of the problems discussed above.

In explaining the various features of the invention they will sometimes be discussed in the context of examples where the wireless base stations are CBSD devices in a CBRS network connected to a cable modem which is connected to a core network. However, such examples are to facilitate understanding of the invention and it should be appreciated that the methods and apparatus are not limited to CBRS embodiments or wireless base stations which are CBSDs. An exemplary method in accordance with one embodiment of the present invention includes the steps of: establishing a first Transmission Control Protocol (TCP) session between a wireless base station and a Cable Modem Termination System (CMTS); receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

In some embodiments, the communications method further includes that prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to the type of ACK/NACK verification that is to be utilized in connection with sets of TCP data packets received via the first TCP session from the cable modem.

In some embodiments, the type of ACK/NACK verification is one of the following: (i) ACK/NACK verification for each TCP data packet received by the CMTS via the first TCP session or (ii) infrequent ACK/NACK verification, said infrequent ACK/NACK verification being verification of a percentage or portion of the total number of TCP data packets in a received set of TCP data packets received by the CMTS via the first TCP session (e.g., verifying a subset of the TCP data packets received from a first set of TCP data packets received). In some embodiments, infrequent ACK/NACK verification includes performing a verification test on only a subset of TCP data packets received from a set of TCP data packets (e.g., a verification test is performed on 10 TCP data packets received out of a first set of 100 TCP data packets (the 100 TCP data packets being equal to the size of the cable modem upstream buffer used for storing TCP data packets received from the wireless base station and destined for the CMTS)). In various embodiments, prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, the CMTS performs the step of receiving from the wireless base station by the CMTS an ACK/NACK verification frequency message, said ACK/NACK verification frequency message including information notifying the CMTS as to a ACK/NACK frequency percentage, said ACK/NACK frequency percentage being a percentage of TCP data packets received in a received set of TCP data packets for which a verification test is to be performed (e.g., 100% means all TCP data packets in a received set of TCP data packets are to have a verification test performed on them which 10% means only 10% of the TCP data packets in a received set of TCP data packets are to have a verification test performed on them).

In some embodiments, the method further includes the step of dynamically determining by the CMTS to change the ACK/NACK frequency percentage based on a first threshold value. In some embodiments, the step of dynamically determining by the CMTS to change the ACK/NACK frequency percentage based on the first threshold value includes reducing the ACK/NACK frequency percentage when a verification failure percentage falls below the first threshold value (e.g., the verification failure percentage being the number of TCP data sets which failed the verification test out of the total number of TCP data sets for which a verification test was performed within a specified time period—100 TCP data sets were tested during a first time period and only 1 data set failed—1% verification failure percentage is 1%, when the first threshold is 5% then then the verification failure percentage has fallen below the first threshold and the ACK/NACK frequency percentage will be reduced for example if it was 10% of received TCP data packets in a received set of data packets will be verified then it will be reduced to 8%.)

In some embodiments, the step of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether each of the TCP data packets of the subset of TCP data packets of the first set of TCP data packets was correctly received by the CMTS (e.g., received without error such as being corrupted or altered during transmission).

In some embodiments, the step of determining whether each of the TCP data packets of the subset of TCP data packets of the first set of TCP data packets was correctly received by the CMTS includes: (i) performing a TCP checksum verification test on each of the TCP data packets of the first set of TCP data packets; (ii)

making a determination that that subset of TCP data packets of the first set of TCP data packets was correctly received when all of the TCP data packets of the subset of TCP data packets of the first set of TCP data packets pass the TCP checksum verification test; and (iii) making a determination that that subset of TCP data packets of the first set of TCP data packets was not correctly received when at least one of the TCP data packets of the subset of TCP data packets of the first set of TCP data packets does not pass the TCP checksum verification test.

In some embodiments, the step of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether at least one of the subset of TCP data packets of the first set of TCP data packets was not correctly received by the CMTS (e.g., received with an error such as being corrupted or altered during transmission).

In some embodiments, the step of determining whether at least one of the subset of TCP data packets of the first set of TCP data packets was not correctly received by the CMTS (e.g., received with an error such as being corrupted or altered during transmission) includes: (i) performing a TCP checksum verification test on each of the TCP data packets of the first set of TCP data packets; (ii) making a determination that that subset of TCP data packets of the first set of TCP data packets was correctly received when all of the TCP data packets of the subset of TCP data packets of the first set of TCP data packets pass the TCP checksum verification test; and (iii) making a determination that that subset of TCP data packets of the first set of TCP data packets was not correctly received when at least one of the TCP data packets of the subset of TCP data packets of the first set of TCP data packets does not pass the TCP checksum verification test (e.g., a checksum error is detected).

In various embodiments, the communications method further includes the step of: sending an Acknowledgement (ACK) message from the CMTS to the wireless base station when the CMTS makes a determination that the sub-set of TCP data packets of the first set of TCP data packets was correctly received by the CMTS.

In some embodiments, the communications method further includes the step of: sending a Negative Acknowledgement (NACK) message from the CMTS to the wireless base station when the CMTS makes a determination that the sub-set of TCP data packets of the first set of TCP data packets was not correctly received by the CMTS.

In some embodiments, the number of TCP data packets included in the first set of TCP data packets is equal to a first cable modem upstream buffer size, said first cable modem upstream buffer size being the size of a first cable modem upstream buffer located in the cable modem.

In some embodiments, the method further includes the step of: dynamically changing the percentage of received TCP data packets of a received set of TCP data packets to be verified at the CMTS for the first TCP session in response to receiving updated ACK/NACK verification frequency information from the wireless base station.

In some embodiments, the communications method further includes the step of: dynamically changing the percentage of received TCP data packets of a received set of TCP data packets to be verified at the CMTS for the first TCP session from a first percentage to a second percentage in response to receiving an ACK/NACK verification frequency update message from the wireless base station, said ACK/NACK verification frequency update message including a new percentage of the total number of TCP data packets from each set of received TCP to be verified by the CMTS and the number of TCP data packets to be included in each set of TCP data packets.

In some embodiments, the communications method further includes the step of: receiving at the CMTS a second set of TCP data packets via the first TCP session from the wireless base station via the cable modem subsequent to dynamically changing the percentage of received TCP data packets of a received set of TCP data packets to be verified at the CMTS for the first TCP session; and performing a verification test on a second sub-set of TCP data packets from the received second set of TCP data packets.

In some embodiments, the communications method further includes the step of: making a determination as to whether to send an ACK/NACK message to the wireless base station with respect to the second set of TCP data packets received at the CMTS based on the results of the verification test performed on the second sub-set of TCP data packets.

In some embodiments, the communications method further includes the step of: determining the number of TCP data packets to be included in the second sub-set of TCP data packets based on the updated ACK/NACK verification frequency information received by the CMTS.

In some embodiments, the communications method further includes the step of: determining, by the wireless base station, a percentage of TCP data packets from the first set of TCP data packets to be verified by the CMTS and communicating this information to the CMTS.

In some embodiments, the step of determining, by the wireless base station, the percentage of TCP data packets from the first set of TCP data packets to be verified by the CMTS includes: making said determination based on one or more of the following: (i) the type of data (e.g., sensor data or non-sensor data) to be transmitted to the CMTS using the first TCP session, (ii) the amount of uplink data capacity allocated for the first TCP session at the wireless base station, and (iii) the amount of uplink congestion data congestion at the wireless base station.

In some embodiments, the amount of uplink data congestion at the wireless base station is determined through monitoring the wireless base station available uplink buffer capacity for the first TCP session.

In some embodiments, the first wireless base station adjusts the percentage of TCP data packets per total number of TCP data packets in a set of TCP data packets to be verified by the CMTS based on determining through the monitoring that the amount of available uplink data buffer capacity for the first TCP session has fallen below a first threshold value or the amount of available uplink data buffer capacity has exceeded a second threshold value.

In some embodiments, the first threshold value is less than said second threshold value. In some embodiments, the wireless base station increases the percentage of TCP data packets of a set of TCP data packets for the first TCP session which are to be verified when the amount of available uplink data buffer capacity has exceeded the second threshold value (i.e., when there is excess uplink data capacity and no issue with uplink buffer overflow). In some embodiments, the wireless base station decreases the percentage of TCP data packets of a set of TCP data packets for the first TCP session which are to be verified when the amount of available uplink data buffer capacity has fallen below a first threshold (e.g., when the congestion at the wireless base station indicates that the uplink data buffer for the first TCP session may overflow).

In some embodiments, the method includes the additional steps of: establishing a second TCP session between the wireless base station and the CMTS; receiving via the second TCP session at the CMTS a second set of TCP data packets from the cable modem; and determining, by the CMTS, the frequency of reporting or sending ACK or NACK messages to the wireless base station for received TCP data packets based on instructions received from the wireless base station.

In some embodiments, the data communicated in the TCP data packets of the first TCP session include sensor data; and the data communicated in the TCP data packets of the second TCP session include non-sensor data. In some embodiments, the frequency of reporting or sending ACK or NACK messages to the wireless base station for the received TCP data packets of the first TCP session and the second TCP session is based on the data type.

The present invention is also applicable to apparatus and system embodiments wherein one or more devices implement the steps of the method embodiments. In some apparatus embodiments each of the cable modems, cable modem termination systems, wireless base stations, CBSDs, user equipment devices, mobile terminals, cable modem termination system power management devices, resource allocation management devices, SAS devices, sensor devices and non-sensor devices and each of the other apparatus/devices/nodes of the system include one or more processors and/or hardware circuitry, input/output interfaces including receivers and transmitters, and a memory. The memory includes instructions which when executed by one or more of the processors control the apparatus/device of the system to operate to perform the steps and/or functions of various method embodiments of the invention.

The present invention is also applicable to and includes apparatus and systems such as for example, apparatus and systems that implement the steps and/or functions of the method embodiments. For example, a communication system in accordance with one embodiment of the present invention includes a cable modem termination system (CMTS) including: a memory, said memory including an uplink buffer and a downlink buffer; and a first processor that controls the CMTS to perform the following operations: establishing a first Transmission Control Protocol (TCP) session between a wireless base station and the Cable Modem Termination System; receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

In some embodiments, the first processor further controls the cable modem termination system to perform the following additional operation: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to the type of ACK/NACK verification that is to be utilized in connection with sets of TCP data packets received via the first TCP session from the cable modem.

In some embodiments, the type of ACK/NACK verification is one of the following: (i) ACK/NACK verification for each TCP data packet received by the CMTS via the first TCP session or (ii) infrequent ACK/NACK verification, said infrequent ACK/NACK verification being verification of a percentage or portion of the total number of TCP data packets in a received set of TCP data packets received by the CMTS via the first TCP session (e.g., verifying a subset of the TCP data packets received from a first set of TCP data packets received).

In some embodiments, the infrequent ACK/NACK verification includes performing a verification test on only a subset of TCP data packets received from a set of TCP data packets (e.g., a verification test is performed on 10 TCP data packets received out of a first set of 100 TCP data packets (the 100 TCP data packets being equal to the size of the cable modem upstream buffer used for storing TCP data packets received from the wireless base station and destined for the CMTS)).

In some embodiments, the first processor further controls the cable modem termination system to perform the following additional operation: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to an ACK/NACK verification frequency percentage, said ACK/NACK verification frequency percentage being a percentage of TCP data packets received in a received set of TCP data packets for which a verification test is to be performed (e.g., 100% means all TCP data packets in a received set of TCP data packets are to have a verification test performed on them, and 10% means only 10% of the TCP data packets in a received set of TCP data packets are to have a verification test performed on them).

In some embodiments, the first processor further controls the cable modem termination system to perform the following additional operation: dynamically determining by the CMTS to change the ACK/NACK frequency percentage based on a first threshold value.

In some embodiments, said dynamically determining by the CMTS to change the ACK/NACK verification frequency percentage based on the first threshold value includes reducing the ACK/NACK frequency percentage when a verification failure percentage falls below the first threshold value (e.g., the verification failure percentage being the number of TCP data sets which failed the verification test out of the total number of TCP data sets for which a verification test was performed within a specified time period—100 TCP data sets were tested during a first time period and only 1 data set failed—1% verification failure percentage is 1%, when the first threshold is 5% then then the verification failure percentage has fallen below the first threshold and the ACK/NACK frequency percentage will be reduced for example if it was 10% of received TCP data packets in a received set of data packets will be verified then it will be reduced to 8%.)

The present invention is also directed to non-transitory computer readable medium embodiments. In an exemplary non-transitory computer readable medium embodiment includes a non-transitory computer readable medium including a first set of computer executable instructions which when executed by a processor of a cable modem termination system (CMTS) cause the CMTS to perform the steps of: establishing a first Transmission Control Protocol (TCP) session between a wireless base station (e.g., first CBSD) and the CMTS; receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

While various embodiments have been discussed in the summary above, it should be appreciated that not necessarily all embodiments include the same features and some of the features described above are not necessary but can be desirable in some embodiments. Numerous additional features, embodiments and benefits of various embodiments are discussed in the detailed description which follows.

BRIEF DESCRIPTION OF THE DRAWINGS

FIG. 3B illustrates the steps of the second part of an exemplary method in accordance with one embodiment of the present invention.

FIG. 3G illustrates the steps of the seventh part of an exemplary method in accordance with one embodiment of the present invention.

DETAILED DESCRIPTION

Figure 1:
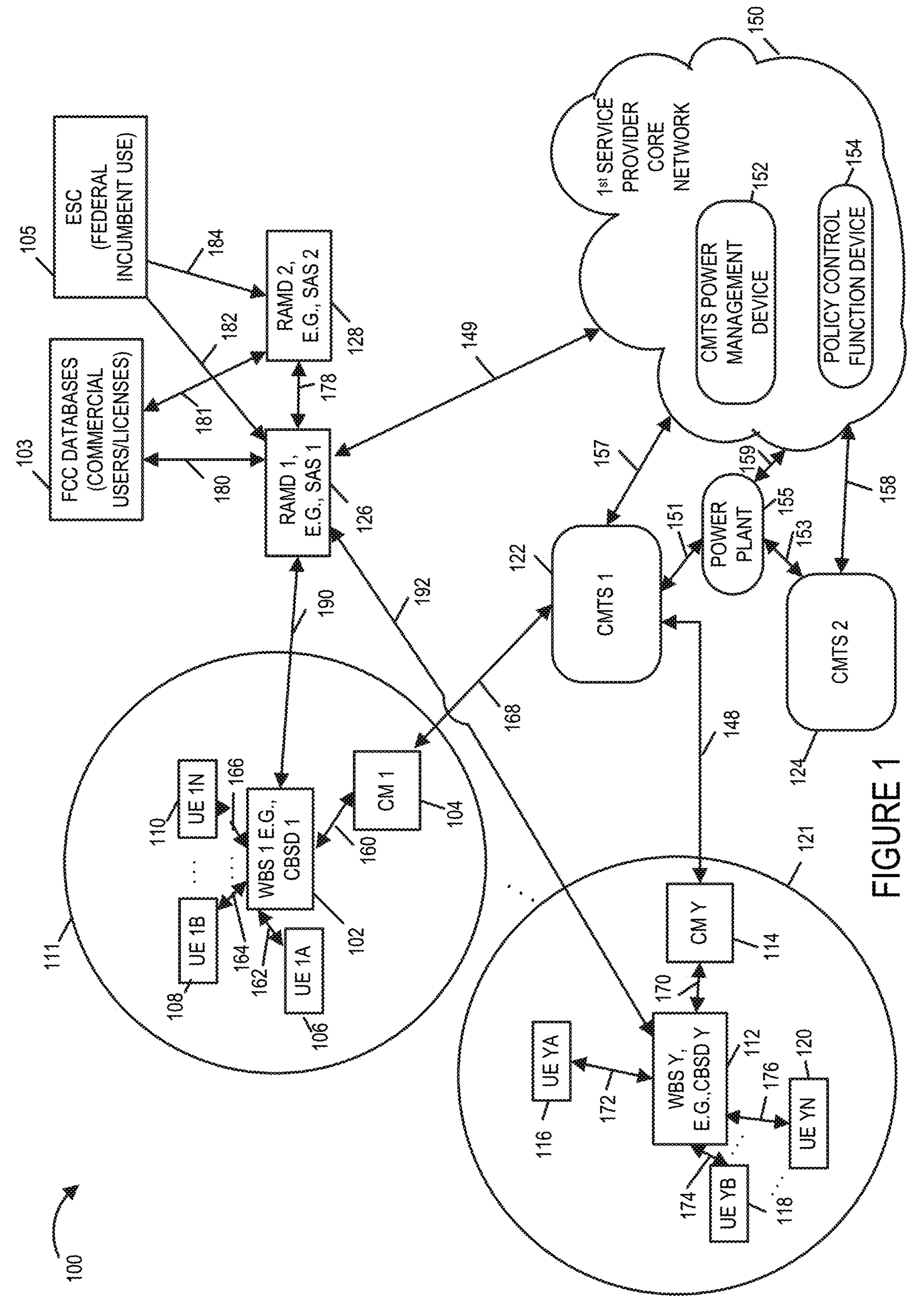
FIG. 1 illustrates an exemplary system in accordance with one embodiment of the present invention.

The current invention is applicable to cable systems which employ cable modem termination systems which provide services to cable modems and/or wireless base stations. The current invention is also applicable to service providers which operate both wireless and wired networks that use a strand based deployment model for at least a portion of their wireless base stations. In the strand based deployment model, the service provider places or connects one or more of its wireless base stations, e.g., Citizen Broadband Radio Service Devices (CBSDs) in a Citizen Broadband Radio Service (CBRS) network, to the service provider's cable strand to provide services, e.g., 5G services, to its subscribers. Each of the wireless base stations. e.g., CBSDs, is connected to a separate cable modem (CM) and each of the separate cable modems is in turn connected to a cable modem termination system (CMTS). The cable modem termination system is a server which typically resides in the service provider's data center. The cable modem termination system may be, and in some embodiments, is located in the service provider's cable head end location. The cable modem termination system is connected to the service provider's core network, e.g., a 5G core network. In some embodiments, the service provider's data center and the cable modem termination systems located in the data center are located in the service providers core network.

The cable modem termination system receives data from core network elements and/or devices and will schedule and send this data to the wireless base stations, e.g., CBSDs, via the cable modems to which the CBSDs are connected. The cable modem termination system has a buffer for each cable modem which is attached to it. The cable modem termination system does not have any information about the wireless base stations, e.g., CBSDs, or other users that are connected to the wireless base stations, e.g., CBSDs. The cable modem termination system typically receives power from a power plant that is owned and/or operated by the service provider. The cable modem termination system provides power to the cable modems to which it is connected. Each cable modem in turn typically provides power to the wireless base station, e.g., CBSD, which is connected to the cable modem. A cable modem in most embodiments supports and/or is connected to a single wireless base station. Each cable modem termination system may, and typically, does support a plurality of cable modems, i.e., has a plurality of cable modems connected to it. In some embodiments, the cable modem termination system supports thousands or tens of thousands of cable modems.

As discussed above, the present invention provides new and/or improved methods and apparatus for communicating data in communications networks such as communicating TCP data packets using a TCP session. The present invention is also directed to implementing new and/or improved dynamic verification testing and/or reporting, e.g., verification of TCP data packets and reporting of results of TCP verification tests, methods and apparatus in cable systems, e.g., Data Over Cable Service Interface Specification (DOCSIS) networks. Various features of the present invention relate to methods and apparatus for efficiently and dynamically managing and utilizing data buffers in cable modems and wireless base stations. Various embodiments of the present invention also provide new and/or improved methods and apparatus for managing, storing and/or buffering and transmitting data in and between wireless base station, cable modems, and cable modem termination systems in an a manner allowing for an increase in the speed of transmission of TCP packets in a TCP session.

For explanatory purposes various features of the current invention will be explained using CBRS wireless network. However, as also explained above a CBRS wireless network is merely an exemplary wireless network in which the invention may be implemented.

Citizens Broadband Radio Service networks are networks that include user equipment devices, e.g., mobile or wireless communications devices such as for example sensors, cell phones, smart phones, laptops, tablets, Citizens Broadband Radio Service Devices (CBSDs) which serve as access points/base stations, and Spectrum Access Systems which are resource allocation management devices that provide spectrum assignments and manage frequency interference through power management of the wireless base stations (CBSDs) transmission power. The Citizens Broadband Radio Service network utilizes 150 megahertz in the 3550-3700 MHz band referred to as the 3.5 GHz Band. One important aspect of the CBRS network is the limitation of interference, e.g., radio transmission, from multiple transmission sources, e.g., multiple CBSD devices located near each other or in close proximity to one another. The CBRS network includes resource allocation management devices referred to as Spectrum Access Systems that obtain information about registered or licensed commercial users in the 3.5 GHz band from FCC databases and information about federal incumbent users of the band from ESC (Environmental Sensing Capability) system and interact directly or indirectly with CBSDs operating in the band to ensure that Citizens Broadband Radio Service users operate in a manner consistent with their authorizations and promote efficient use of the spectrum resource. Among the Spectrum Access System functions as defined in the Amendment of the Commission's Rules with Regard to Commercial Operations in the 3550-3650 MHz Band released Apr. 21, 2015 are that: it determines the available frequencies at a given geographic location and assign them to CBSDs; it determines the maximum permissible transmission power level for CBSDs at a given location and communicates that information to the CBSDs; it registers and authenticates the identification information and location of CBSDs; it enforces exclusion and protection zones, including any future changes to such Zones, to ensure compatibility between Citizens Broadband Radio Service users and incumbent federal operations; it protects Priority Access Licensees (PAL) from impermissible interference from other Citizens Broadband Radio Service users such as the General Authorized Access users; ensures secure and reliable transmission of information between the SAS, ESC, and CBSDs; and it facilitates coordination and information exchange between SASs. Through the management of the CBSDs power transmission levels in a geographical area the SAS manages the radio interference in the geographical area.

FIG. 1 illustrates an exemplary communications system 100 having an architecture implemented in accordance with the present invention. This exemplary communications system includes a 5G Citizens Broadband Radio Service wireless network, a core network and a cable network which couples at least some of the wireless base stations of the CBRS network to the core network. In the exemplary embodiment, a first service provider or operator operates and/or owns the cable network, the CBRS wireless network and the core network. The communications system 100 includes a plurality of wireless base stations (WBS 1 (e.g., Citizens Broadband Radio Service Device (CBSD) 1 102, . . . , WBS Y (e.g., CBSD Y) 112, a resource allocation management device (RAMD 1)(e.g., Spectrum Access System device 1 (SAS 1)) 126, a RAMD 2 (e.g., SAS 2) 128, databases of commercial users/licenses (e.g., an FCC Database) 103, an Environmental Sensing Capability (e.g., Federal Incumbent Use) (ESC)) system 105, a plurality of user equipment (UE) devices UE 1A 106, UE 1B 108, . . . , UE 1N 110, UE YA 116, UE YB 118, . . . , UE YN 120, Cable Modem (CM) 1 104, . . . , Cable Modem Y 114, Cable Modem Termination System (CMTS) 1 122, Cable Modem Termination System 124, Cable Modem Termination System Power Management Device 152, Policy Control Function Device 154, communications links 148, 149, 156, 158, 160, 162, 164, . . . , 166, 168, 170, 172, 174, . . . , 176, 178, 181, 182, 184, 190, 192, a first cell 111 illustrating the first base station 102's coverage area, a second cell 121 illustrating the second base station 112's coverage area.

The first cell 111 of the network is serviced by the WBS 1 (e.g., CBSD 1) 102. The first cell 111 illustrates the wireless coverage range of WBS 1 (e.g., CBSD 1) 102 at a first time T1. The user equipment devices also sometimes referred to as user terminal devices UE 1A 106, UE 1B 108, . . . , UE 1N 110 are located in the first cell 111 and are in active wireless communications with WBS 1 (e.g., CBSD 1) 102. Communications links 162, 164, and 166 illustrate wireless communications channels, e.g., radio channels, over which WBS 1 (e.g., CBSD 1) 102 and UE 1A 106, UE 1B 108, . . . , UE 1N 110 communicate respectively.

The second cell 121 of the wireless network is serviced by WBS 2 (e.g., CBSD 2) 112. The second cell 121 illustrates the wireless coverage range of WBS 2 (e.g., CBSD 2) 112 at the first time T1. The user equipment devices UE YA 116, UE YB 118, . . . , UE YN 120, (Y being an integer greater than 1) are located in the second cell 121 and are in communication with WBS 2 (e.g., CBSD 2) 112. Communications links 172, 174, . . . , 176 illustrate wireless communications channels, e.g., radio channels, over which WBS 2 (e.g., CBSD 2) 112 and UE YA 116, UE YB 116, . . . , UE YN 1260 communicate respectively.

Resource Allocation Management Device (RAMD) 1 (e.g., SAS 1) 126 is coupled to Resource Allocation Management Device (RAMD) 2 (e.g., SAS 2) 128 via communications link 178. RAMD 1 (e.g., SAS 1) 126 is coupled to databases 103 via communications link 180. RAMD 2 (e.g., SAS 2) 128 is coupled to databases 103 via communications link 181. ESC system 105 is coupled to RAMD 1 (e.g., SAS 1) 126 and RAMD 2 (e.g., SAS 2) 128 via communications links 182 and 184. The ESC system is used to detect, sense Navy radar operations in the wireless bands utilized for communications in the wireless network, e.g., in CBRS networks the ESC detects or senses Navy radar operation within 3550-3650 MHz near the coasts, and provide notifications over the communications links to RAMD 1 (e.g., SAS 1) 126 and RAMD 2 (e.g., SAS 2) 128. RAMD 1 (e.g., SAS 1) 126 manages the WBS 1 (e.g., CBSD 1) 102 and WBS 2 (e.g., CBSD 2) 112 spectrum allocation and transmission power to limit interference in the wireless network (e.g., CBRS wireless network). RAMD 2 (e.g., SAS 2) 128 manages other wireless base stations (e.g., CBSDs) in the wireless network which are not shown in FIG. 1. Resource Allocation Management Device 1 (e.g., SAS 1) 126 and Resource Allocation Management Device 2 (e.g., SAS 2) 128 communicate and share information regarding the wireless network coverage of the wireless base stations (e.g., CBSDs) each respectively manage and coordinate management of the allocation of spectrum and power transmission levels of wireless base stations (e.g., CBSDs) throughout the wireless network. While only two Resource Allocation Management Devices (e.g., SAS devices) are shown in FIG. 1 it should be understood that additional Resource Allocation Management Devices (e.g., SAS devices) are typically used in the wireless network (e.g., CBRS network). The WBS 1 102, and WBS Y 112 coupled and/or connected to the RAMD 1 126 via the 1st service provider core network 150. The RAMD 1 126 is coupled to the first service provider's core network 150 via communications link 149. The WBS 1 102 is coupled and/or connected to the RAMD 1 126 via communications link 190. WBSD 2 112 is coupled and/or connected to RAMS 1 128 via communications link 192.

WBS 1 102 is coupled and/or connected to cable modem 104 via communications link 160. The cable modem 1 104 is coupled and/or connected to the cable modem termination system 1 122 via communications link 168. The cable modem termination system 1 122 is coupled and/or connected to the first service provider core network 150 via communications link 156. The WBS 1 102 communicates with the devices in the first service provider core network 150 via cable modem 104 and CMTS 1 122.

WBS Y 112 is coupled and/or connected to cable modem CM Y 114 via communications link 170. Cable Modem Y 114 is coupled and/or connected to the cable modem termination system 1 122 via communications link 148. The cable modem termination system 1 122 is coupled and/or connected to the first service provider core network 150 via communications link 156. The WBS Y 112 communicates with the devices in the first service provider core network 150 via the cable modem Y 114 and CMTS 1 122.

WBS 1 102, WBS Y 112, CM 1 104, CM Y 114, CMTS 1 122 and CMTS 2 124 are owned and/or operated by the first service provider.

The nodes, devices and elements of the first service providers core network 150 are interconnected via a communications network including communications links which allow the various nodes, devices and elements of the first service providers core network 150 to communicate and exchange information and data.

The first service provider's core network 150 in this exemplary embodiment is a 5G network including a cable modem termination system power management device 152 and a policy control function device 154. The 5G network core typically also includes a session management function device or node, security gateway function device or node, an access and mobility management function (AMF) device and a user plane function (UPF) device. The cable modem termination system power management device 152 is connected and/or coupled to a power plant system 155 via communications link 159. The cable modem termination system power management device 152 controls the management, supply and/or distribution of power for the cable modem system. The cable modem termination system power management device 152 instructs the CMTS devices in specific regions on whether it needs to reduce power and/or have the cable modems connected to the CMTS devices enter a power savings mode of operation as will be explained herein. In some embodiments, the CMTS power management device 152 is not located in the core network of the first service provider but is instead coupled and/or connected to the core network of the first service provider. In some embodiments, the CMTS power management device 152 is located at the service provider's power plant 155. The service provider's power plant 155 supplies power to the cable modem termination system devices in the cable modem system. In this example, the service provider's power plant 155 supplies power to the cable modem termination system 1 122 and cable modem termination system 2 124 via power cables 151 and 153 respectively as in this example CMTS 1 122 and CMTS 2 124 are located at different locations. In some embodiments the power plant also supplies power to the service providers data center and/or location at which the core network devices are located so that the power plant can provide power to one, some or all of the service providers equipment located in the data center, e.g., CMTS devices, and/or core network, e.g., CMTS power management device, etc.

CMTS 2 124 is coupled to the core network via communications link 158. CMTS 1 and CMTS 2 may be, and in some embodiments are, included in a cable head end system of first service provider.

The cable modems 1 104 and cable modem Y 114 may be, and in some embodiments are DOCSIS compliant cable modems, e.g., DOCSIS compliant 3.0, 3.1, 4.0 cable modems. The particular release/version of DOCSIS is not important to the invention as the messages exchanged between the cable modem and the CMTS devices may be, and in some embodiments are, text messages which can be sent between any CMTS, cable modem and wireless base station.

The communications links 148, 149, 156, 158, 159, 160, 168, 170, 178, 180, 181, 182, 183, 190, and 192 as well as the communications links coupling together the elements of the core network 150 are typically wired communications links or fiber optic cables. The communications links 162, 164, . . . , 166, 172, 174, . . . , 176 are wireless or over the air communications links. It is to be understood that the communication links shown in system 100 are only exemplary and other network configurations and communications links may be employed that couple together the devices, servers, nodes, entities, databases and controllers of the system. Elements or steps with the same reference numbers used in different figures are the same or similar and those elements or steps will not be described in detail again.

While for the sake of simplicity in explaining the invention system 100 only illustrates two active wireless base stations (e.g., CBSD devices), two cable modems, two CMTS devices, two Resource Allocation Management Devices (e.g., SAS devices) and a few UE devices, it will be appreciated that system 100 typically includes a large plurality of active wireless base stations (e.g., CBSDs) in the wireless network supporting a large plurality of UE devices (e.g., a large plurality of sensor and non-sensor wireless devices) with a large number of the plurality of active wireless base stations being coupled to the core network via a cable modem and CMTS. The cable system includes a large plurality of cable modem termination systems each coupled to a large plurality of cable modems which may be either connected to a single wireless base station, e.g., CBSD, or another device or devices. As previously discussed, the CMTS devices are typically located in the service provider's data center or cable head end and provide high speed data service connections.

The Cable Modem Termination System powers up the cable modems connected to it through the communications link which connects the cable modem termination system to the cable modem. The communications link for example may be, and in some embodiments is, an Ethernet cable. In various embodiments, the Cable Modem Termination System also powers the wireless base station, e.g., CBSD, which is connected to the cable modem termination system via the cable modem. That is the Cable Modem Termination System first powers up the cable modem which in turn provides and/or supplies power to the wireless base station, e.g., CBSD. The power passing through the cable modem and communications link connecting the wireless base station and the cable modem. In some embodiments, the communications link coupling the cable modem to the wireless base station is an Ethernet cable.

The cable modems are located on the cable strands to provide the connection to the wireless base stations, e.g., a DOCSIS connection to CBSDs in a CBRS system.

The first service provider will also operate one or more power plants, e.g., power plant 155 in system 100. Each power plant is the power house which provides power for all Cable Modem Termination Systems in the network. Power plants are local power resources that are responsible for the provisioning and distribution of power for all Cable Modem Termination Systems and Cable Modems (through the CMTSs) running in the local region for which the power plant is supplying power. Cables through which power is supplied run from the power plant to Cable Modem Termination Systems.

Figure 2:
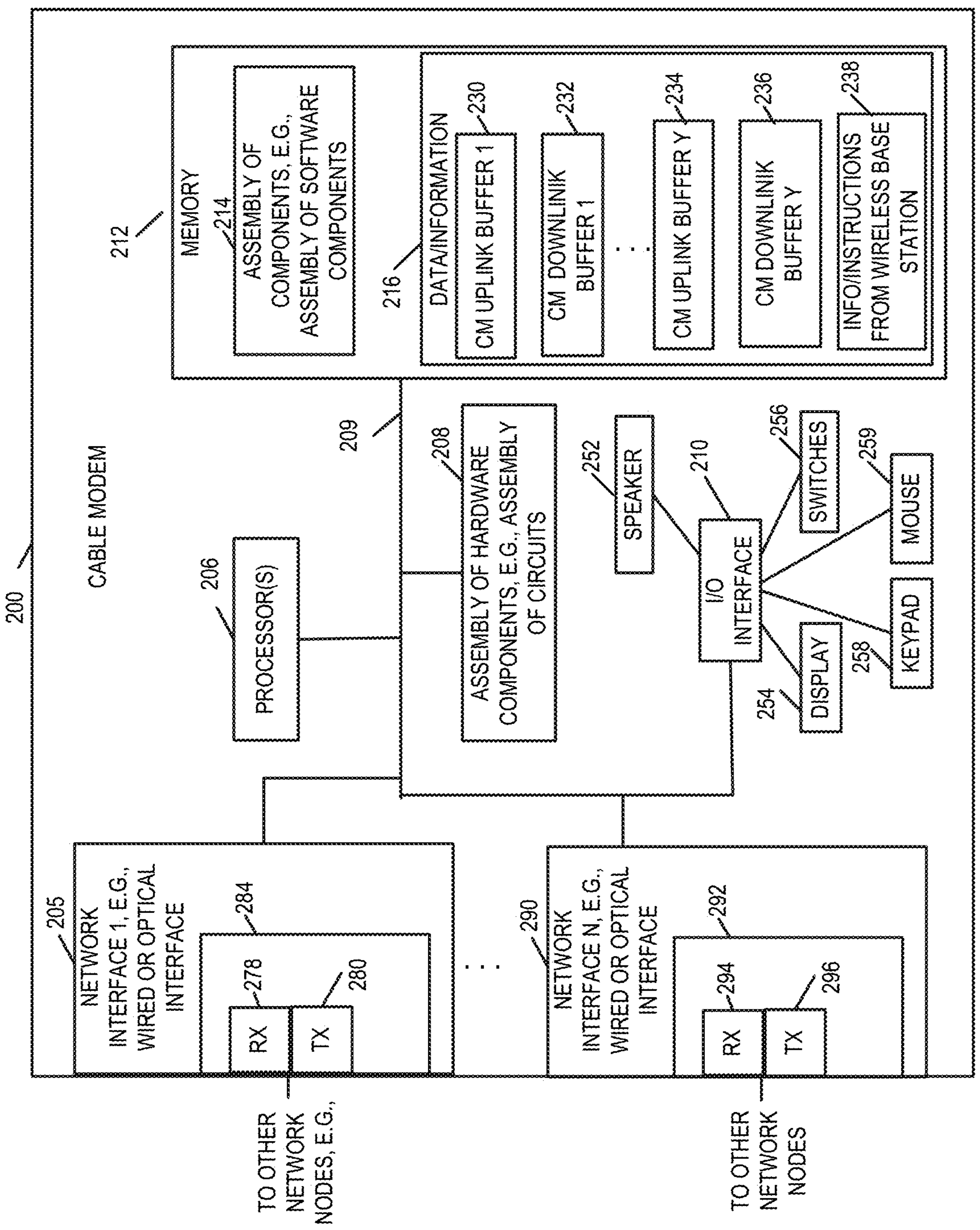
FIG. 2 illustrates details of an exemplary cable modem in accordance with one embodiment of the present invention.

FIG. 2 is a drawing of an exemplary cable modem such as a cable modem 1 104 of system 100. The cable modem 200 includes a plurality of network interfaces 1 205, . . . , network interface N 290, e.g., each being a wired or optical interface, a processor(s) 206 (e.g., one or more processors), e.g., a CPU, an assembly of hardware components 208, e.g., an assembly of circuits, and I/O interface 210 and memory 212 coupled together via a bus 209 over which the various elements may interchange data and information. The cable modem 200 further includes a speaker 252, a display 254, switches 256, keypad 258 and mouse 259 coupled to I/O interface 210, via which the various I/O devices (252, 254, 256, 258, 259) may communicate with other elements (206, 208, 212) of the cable modem 200. Network interface 205 includes a receiver 278 and a transmitter 280. Network interface 290 includes receiver 299 and transmitter 296. In some embodiments, network interfaces 205 and/or 290 includes multiple receivers and transmitters. The network interfaces 205 and 290 are used to communicate with other devices, e.g., wireless base station and/or cable modem termination system. In some embodiments, receiver 278 and transmitter 280 are part of a transceiver 284. In some embodiments, receiver 294 and transmitter 296 are part of a transceiver 292. Memory 212 includes an assembly of component 214, e.g., an assembly of software components, and data/information 216. Data/information 216 typically includes, among other things, cable modem uplink buffer 1 230, cable modem downlink buffer 1 232, . . . , cable modem uplink buffer Y 234, cable modem downlink buffer Y 236, information/instruction from wireless base station 238 which typically includes information for creating and managing cable modem uplink data buffers. In some embodiments, the cable modems disclosed in the figures and/or discussed in connection with the various embodiments of the invention are implemented in accordance with cable modem 200. For example, cable modem 1 (e.g., CM 1 104), . . . , cable modem Y (CM Y 114) of FIG. 1 are implemented in accordance with cable modem 200.

The steps of an exemplary method in accordance with an embodiment of the present invention will now be discussed. A wireless base station (e.g., CBSD 1 102 of system 100) turns on and connects with a cable modem (e.g., CM 1 104 of system 100). The cable modem is connected to and powered by a cable modem termination system (e.g., CMTS 1 122 of system 100). The cable modem is positioned between the wireless base station and the cable modem termination system. The wireless base station connects to its service providers core network via the cable modem and cable modem termination system. The cable modem termination system being connected to the core network. The CBSD connects with a Spectrum Access System (e.g., SAS 1 126 of system 100). The Spectrum Access System grants spectrum to the CBSD for use in communicating with and providing services to user equipment devices (e.g., UE 1A 106, UE 1B 108, . . . , UE 1N 110 of system 100). The user equipment devices include wireless communications devices of different types (e.g., sensors which classified as sensor type devices and non-sensor devices which are classified as non-sensor type devices). The sensor device type devices transmit and/or receive sensor data traffic which is sometimes referred to as being sensor data traffic type. The non-sensor devices transmit and/or receive non-sensor data traffic which is sometimes referred to as being non-sensor data traffic type. In Data Over Cable Service Interface Specification (DOCSIS) networks the direction of traffic from CMTS to cable modem is referred to as downlink or downstream direction with data being transmitted from the CMTS to the cable modem being referred to as downstream or downlink data traffic. Similarly, data transmitted from the cable modem to the wireless base station is referred to as downstream or downlink data traffic. Also in Data Over Cable Service Interface Specification (DOCSIS) networks the direction of traffic from the cable modem to CMTS is referred to as uplink or upstream direction with data being transmitted from the CM to the CMTS being referred to as upstream or uplink data traffic. Similarly, data transmitted from the wireless base station to the cable modem is referred to as upstream or uplink data traffic. Traffic from a UE to the wireless base station is uplink traffic also sometimes referred to as upstream traffic and traffic from a wireless base station to a UE is downlink traffic sometimes referred to as downstream traffic. The CMTS holds the data queue or buffer for downlink traffic for delivery to the cable modem from the CMTS. The cable modem holds the data queue or buffer for uplink traffic delivered to the CMTS from the CM. The cable modem creates separate uplink data buffers for different traffic types. In this example, there will be two different types of data traffic, the first being sensor data traffic and the second being non-sensor data traffic.

The cable modem creates a first cable modem uplink data buffer for wireless uplink sensor data traffic and a second cable modem uplink data buffer for wireless uplink non-sensor data traffic. The wireless base station will utilize different data packet sizes for each of the different traffic types. In this example, the wireless base station, e.g., CBSD 1, will notify the cable modem that packets, e.g., TCP data packets, which are N-byte size are wireless sensor data traffic and that packets, e.g., TCP data packets, which are M-byte size are wireless non-sensor data traffic. The cable modem will use the first cable modem uplink data buffer for storing N-byte size packets received from the wireless base station. The cable modem will use the second cable modem uplink data buffer for storing M-byte size packets received from the wireless base station.

The user equipment devices connect to the wireless base station and begin sending uplink data. The wireless base station creates a TCP session with the CMTS for each separate data type of traffic. In this example, the wireless base station has two separate types of traffic sensor data traffic and non-sensor data traffic and hence creates a first TCP session for sensor data traffic and a second TCP session for non-sensor data traffic. The wireless base station notifies the CMTS of the ACK/NACK reporting required for each TCP session created. In some embodiments, the wireless base station sends a message, e.g., ACK/NACK reporting frequency message, to the CMTS indicating for each established TCP session how often an ACK/NACK message is to be sent by the CMTS to the wireless base station, e.g., after how many received packets for a session or how many received bytes for a session, will the CMTS send an ACK/NACK message. In some embodiments, the wireless base station sends separate ACK/NACK reporting frequency messages for each session. In some embodiments, the ACK/NACK reporting frequency message indicates a type of ACK/NACK message reporting, wherein the type indicates how often an ACK/NACK message is to be sent for a session (for example, type 1 ACK/NACK message reporting requires ACK/NACK reporting after each received TCP message, type 2 ACK/NACK message reporting requiring ACK/NACK reporting after every P number of packets are received, P being a positive integer greater than 1, type 3

ACK/NACK message reporting being after Q bytes of packets have been received, Q being a positive integer greater than twice the packet size being used for the TCP session. In various embodiments, P is set to the number of packets equal to the size of the cable modem uplink data buffer being used for the session. In various embodiments, Q is the number of bytes of the size of the cable modem uplink data buffer being used for the session. This information may be obtained by the wireless base station from the cable modem or the wireless base station may instruct the cable modem to create buffers of particular sizes for each of the TCP session created that is for each of the different data types requiring different buffers and having different packet sizes.

In this example, the wireless base station notifies the CMTS that the frequency of reporting of ACK/NACKs for the first TCP session is to be type 2 and that P=100 packets which is the size of the first cable modem uplink data buffer being used to store the sensor data of N-byte size TCP data packets received from the wireless base station. In some embodiments, the wireless base station can specify that the ACK/NACK frequency reporting for the first TCP session is type 3 with Q being equal to (N)*(P), N being the number of bytes in each packet and P being the size of the first cable modem uplink data buffer in packets. In this way, the CMTS will suppress or refraining from reporting ACK/NACK messages until the specified plurality of TCP data packets for the first TCP session have been completed.

In this example, the wireless base station notifies the CMTS that the frequency of reporting of ACK/NACKs for the second TCP session is to be type 1 which is that an ACK/NACK message is to reported by the CMTS to the wireless base station for each received TCP data packet of the second TCP session.

The wireless base station receives the uplink data sent by the user equipment devices. The wireless base station determines which data received from user equipment devices is sensor data and which is non-sensor data. In some embodiments, the wireless base station determines the user equipment device type based on information provided by the user equipment device when a connection established between the wireless base station and the user equipment device. The wireless base station classifying or determining that a user equipment device is a sensor or non-sensor based on the received information. Based on the user equipment device type determination the wireless base station then determines that uplink data received from the user equipment device is either sensor or non-sensor traffic type. Data received from a device being of a sensor type being of type sensor data. Data received from a device being of a non-sensor type being of type non-sensor data.

Uplink sensor data received by the wireless base station is packetized into TCP data packets of size N-bytes and transmitted to the cable modem. In some embodiments, the packetized N-bytes sensor data is stored in a first wireless base station uplink data buffer created by the wireless base station with the wireless base station transmitting the sensor data to the cable modem once the number of packets in the wireless base station is equal to the number of packets the first cable modem uplink buffer can store at which time the wireless base station transmits all of the sensor data packets to the cable modem at once, e.g., as a set of sensor data uplink TCP data packets each being of length N-bytes.

Uplink non-sensor data received by the wireless base station is packetized into TCP data packets of size M-bytes and transmitted to the cable modem.

The cable modem upon receiving the uplink TCP data packets from the wireless base station determines the size of each of the TCP data packets and stores the TCP data packets in the cable modem uplink data buffer created for TCP data packets having the determined packet size of the received uplink TCP data packet. When the cable modem receives TCP data packets containing sensor data these packets will have a size of N-bytes. Upon the cable modem determining the received TCP data packet has a size of N-bytes, the cable modem will store the received TCP data packet in the first cable modem uplink data buffer. When the cable modem receives TCP data packets containing non-sensor data these packets will have a size of M-bytes. Upon the cable modem determining the received TCP data packet has a size of M-bytes, the cable modem will store the received TCP data packet in the second cable modem uplink data buffer.

With respect to the sensor traffic with TCP data packets of size N-bytes, the cable modem will continue to store received sensor data TCP data packets in the first cable modem uplink buffer until the cable modem determines that the first cable modem uplink buffer is full. Once the cable modem determines the first cable modem uplink data buffer is full, the cable modem sends all of the sensor traffic stored in the first cable modem uplink data buffer to the CMTS at once, e.g., as set of TCP data packets. In some embodiments, as described previously the wireless base station sends the number of N-byte size packets necessary to fill up the entire first cable modem uplink data buffer at one time. In this way, the cable modem will be able to quickly receive and transmit the entire buffer full of sensor data packets.

The CMTS will receive the first cable modem buffer worth of sensor data TCP data packets (e.g., P TCP data packets) and will perform a TCP verification check on the received plurality or set of P TCP data packets, P being the size of the first cable modem uplink data buffer in packets. After completing the TCP verification check on the received plurality or set of TCP data packets, the CMTS will send one ACK or NACK for the entire received plurality or set of TCP data packets (e.g., one ACK or NACK for the entire first cable modem uplink data buffer worth of received TCP data packets). If the verification test passes then the CMTS sends an ACK message to the wireless base station and the wireless base station continues sending new sensor data TCP data packets. For example, a next set of sensor data TCP data packets with the number of TCP data packets in the set equal to the first cable modem uplink data buffer size in data packets. If the verification test fails then the CMTS will send a NACK message to the wireless base station. The wireless base station in response to receiving the NACK message will resend to the cable modem for transmission to the CMTS the last set of P packets having a N-byte size (i.e., sensor data TCP data packets) which had been previously transmitted to the cable modem. The described process continues for the first TCP session. The use of infrequent ACK/NACK reporting for the first TCP session speeds up the uplink data transmission from the wireless base station to the CMTS.

In this example, the CMTS will receive non-sensor data packets on an on-going basis as the cable modem will not wait for the second cable modem uplink data buffer to fill before sending on TCP data packets from the second cable modem uplink data buffer but will send them as uplink traffic bandwidth allows. these non-sensor data packets having a lower priority than the sensor data packets. The CMTS will perform a verification check on each of the TCP data packets in the second TCP session and will send an ACK/NACK message to the wireless base station indicating whether the TCP data packet was correctly received or was not correctly received. If the verification test passes then the CMTS sends an ACK message to the wireless base station for the tested packet and sends the next non-sensor data traffic packet. If the verification test fails then the CMTS will send a NACK message to the wireless base station. The wireless base station in response to receiving the NACK message will resend to the cable modem the packet which failed the test. The described process continues for the second TCP session. In some embodiments, the wireless base station will designate the type of ACK/NACK reporting to be reporting using the slow start method of TCP reporting for the second TCP session.

In various embodiments, the verification test performed on the received TCP data packets by the CMTS is a TCP checksum verification.

In some embodiments, the wireless base station tracks the number of ACKs and number of NACKs received for a TCP session for a predetermined number of TCP data packets sent to the CMTS and based on the ACK and NACK tracking dynamically adjusts the size of the wireless base station uplink data buffer corresponding to the TCP session and instructs the cable modem to also adjust the corresponding cable modem uplink data buffer. This is typically done with respect to established TCP sessions which are using infrequency ACK/NACK messaging that is the CMTS only acknowledges a set or plurality of received TCP data packets (e.g., a complete cable modem uplink buffer worth of packets) for the TCP session and not each individual TCP data packet received. For example, when the number of ACKs received per a specified number of sets of TCP data packets sent to the CMTS falls below a first threshold value, the wireless base station instructs the cable modem to reduce the size of its first cable modem uplink data buffer. Alternatively, when the number of NACKs received per a specified number of sets of TCP data packets sent to the CMTS exceeds the first threshold value, the wireless base station instructs the cable modem to reduce the size of its cable modem uplink data buffer. The wireless base station will also reduce the number of sensor TCP data packets it sends to the cable modem at one time to match the adjusted size of the first cable modem uplink data buffer. For example, if the reduced size of the first cable modem is K packets, the wireless base station will only send K sensor TCP data packets to the cable modem at one time as that amount will fill the first cable modem uplink data buffer. The wireless base station will also notify the CMTS to adjust its ACK/NACK reporting frequency to the new value of K packets that is after each K TCP data packets it receives in the first TCP session, it will send an ACK/NACK message to the wireless base station for the entire set of K packets. In this example, K is an integer number less than P the initial size of the first cable modem uplink data buffer. Re-sending sets of TCP data packets can be very costly and time consuming as a result by reducing the number of packets in a set less packets will need to be re-sent thereby saving time. The first threshold value may be implemented as a percentage of sets of packets. The process may be repeated additional times reducing the number of packets in the set being sent to the CMTS.

Furthermore, when the number of ACKs received per a specified number of sets of TCP data packets sent to the CMTS exceeds a second threshold value, the wireless base station instructs the cable modem to increase the size of its first cable modem uplink data buffer. Alternatively, when the number of NACKs received per a specified number of sets of TCP data packets sent to the CMTS falls below the second threshold value, the wireless base station instructs the cable modem to increase the size of its cable modem uplink data buffer. The wireless base station will also increase the number of sensor TCP data packets it sends to the cable modem at one time to match the adjusted size of the first cable modem uplink data buffer. For example, if the increased size of the first cable modem is B packets, the wireless base station will send B sensor TCP data packets to the cable modem at one time as that amount will fill the first cable modem uplink data buffer. The wireless base station will also notify the CMTS to adjust its ACK/NACK reporting frequency to the new value of B packets that is after each B TCP data packets it receives in the first TCP session, it will send an ACK/NACK message to the wireless base station for the entire set of B packets received. In this example, B is an integer number greater than P the initial size of the first cable modem uplink data buffer. The second threshold value may be implemented as a percentage of sets of packets. The process may be repeated additional times increasing the number of packets in the set being sent to the CMTS each time. In this way, when the channel over which the data packets are sent is very good and there are few errors the number of ACK/NACK messages is reduced per the number of packets sent.

In some embodiments, the wireless base station will send information and/or instructions to the CMTS specifying the number of packets per a set or plurality of packets received for a session on which a verification test is to be performed. For example, instead of the CTMS performing a verification on each received TCP data packet for the first TCP session the wireless base station may, and some does, instruct the CMTS to only sample and test W % of each P packets received, W being a positive integer number. In such an example, if P is 100 and W is 10, then the CMTS only samples and performs a verification test on 10 of each 100 TCP data packets received from the cable modem. This verification testing instruction or information may be, and in some embodiments is, sent when the TCP session is established. For example, this verification testing instruction and/or information may be sent with the ACK/NACK frequency reporting information. Additionally, the wireless base station dynamically send instructions and/or information to the CMTS during the TCP session to adjust and/or change the percentage of received TCP data packets per set or number of packets received. In some embodiments, the wireless base station make a determination to increase or decrease the number of packets verified in a set of packets or received number of packets based on the amount of uplink congestion at the wireless base station. For example, if the wireless base station determines that its uplink data buffer for sensor data has exceeded a first wireless uplink threshold amount (e.g., an amount indicating the probability of buffer overflow is eminent or likely) the wireless base station will notify and/or instruct the CMTS to test or verify a fewer number of received TCP data packets per set or number of packets received than previously instructed. If previously instructed to test or verify 10% of each set of P packets received for the first TCP session then the number of TCP data packets to test or verify may be, and in some embodiments is, reduced to 5% of the set of P packets. Similarly, if the wireless base station determines that its uplink data buffer for sensor data is falls below a second wireless uplink threshold amount, the wireless base station may, and in some embodiments, does notify and/or instruct the CMTS to increase the number of packets received for the first TCP session. For example, when the wireless base station determines that its uplink data buffer being used for sensor data has excess storage capacity, the wireless base station makes a decision to increase the number or percentage of sensor data TCP data packets received by the CMTS. If the CMTS was verifying 10% of each set of P packets received via the first TCP session, the wireless base station may, and in some embodiments does, instruct or notify the CMTS to increase the percentage of packets verified per set of TCP data packets per set of TCP data packets received via the first TCP session to be 15% of each set of P packets received. In various embodiments, the percentage of packets to be verified per a total number of packets received for a session may be sent as a parameter of a text message.

In some embodiments, the CMTS uses random sampling of packets to determine which packets of a received set of packets are to be verified. The number of packets being determined via information and/or instructions provided by the wireless base station.

While the various method embodiments have been described for uplink data traffic the procedures may also be applied to downlink data traffic to increase the speed with which downlink data traffic is communicated for example from the core network via the CMTS to sensors being serviced by a wireless base station.

The above described embodiments allow for the dynamic customization and adjustment on a per session basis of ACK/NACK reporting frequency as well as adjusting the percentage of packets verified from a received set of packets with respect recurring sets of packets being received.

Furthermore, the above described embodiments provide for a dynamic method of managing and dynamically adjusting wireless base station, cable modem and CMTS data buffers in a cable network so as to increase the efficiency and speed of communicating data of different types between elements of the cable modem network and in particular between the wireless base station and CMTS. In some embodiments, when a TCP session is used for communicating multiple devices data uplink data buffers in the wireless base station and cable modem may, and in some embodiments do, include sub-partitions such that different portions of a buffer are reserved for sending data for different devices. For example, if the first cable modem uplink data buffer has a capacity of 100 packets and the first TCP session is being used for sending sensor data from four different sensors then the first 25 packets may be reserved for the first sensor's data, the second 25 packets may be reserved for the second sensor's data, the third 25 packets may be reserved for the third sensor's data and the fourth 25 packets may be reserved for the fourth sensor's data. The reservation of portion of the packets reserved for each sensor being communicated from the wireless base station to the CMTS.

Figure 3A:
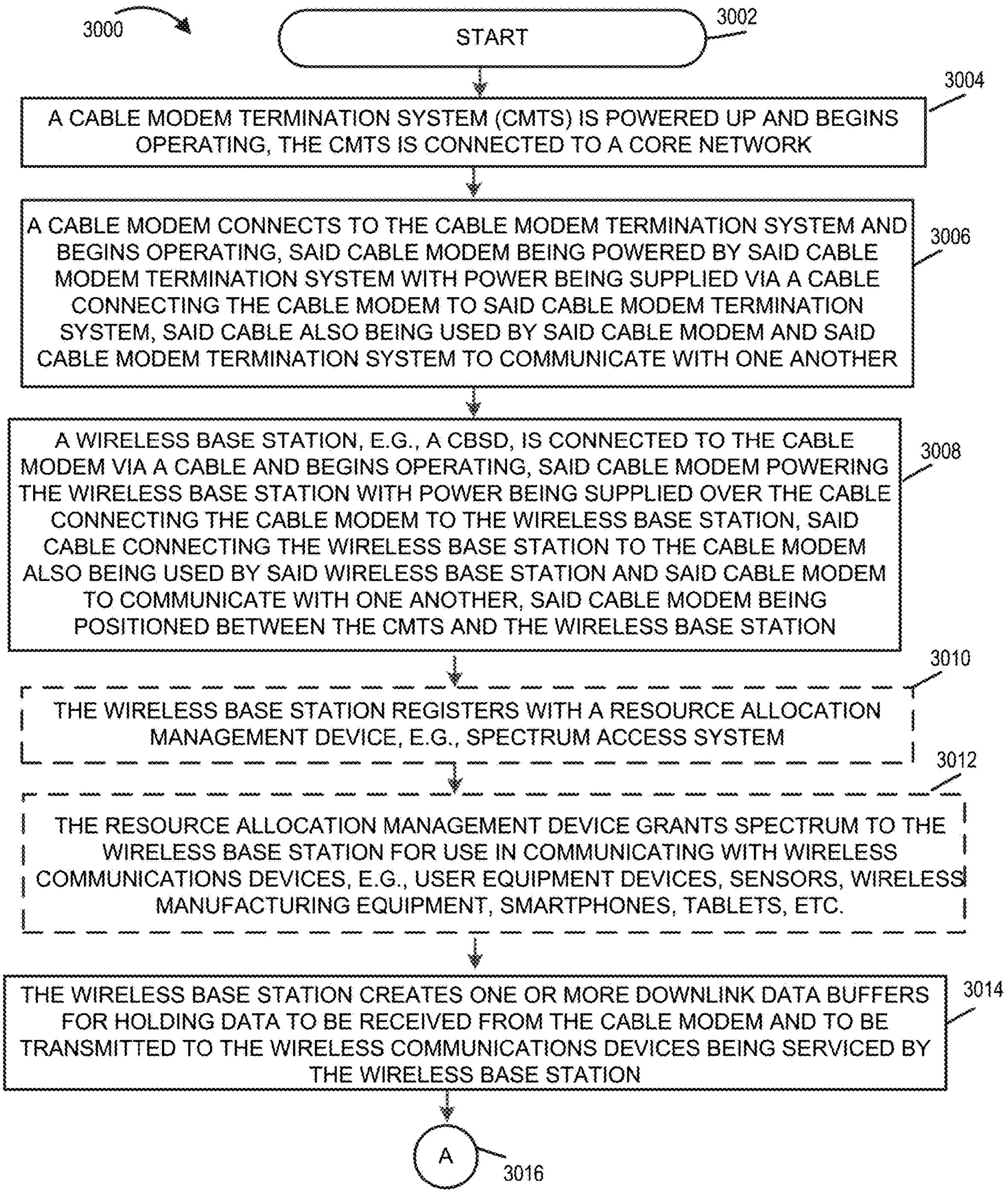
FIG. 3A illustrates the steps of the first part of an exemplary method in accordance with one embodiment of the present invention.
Figure 3C:
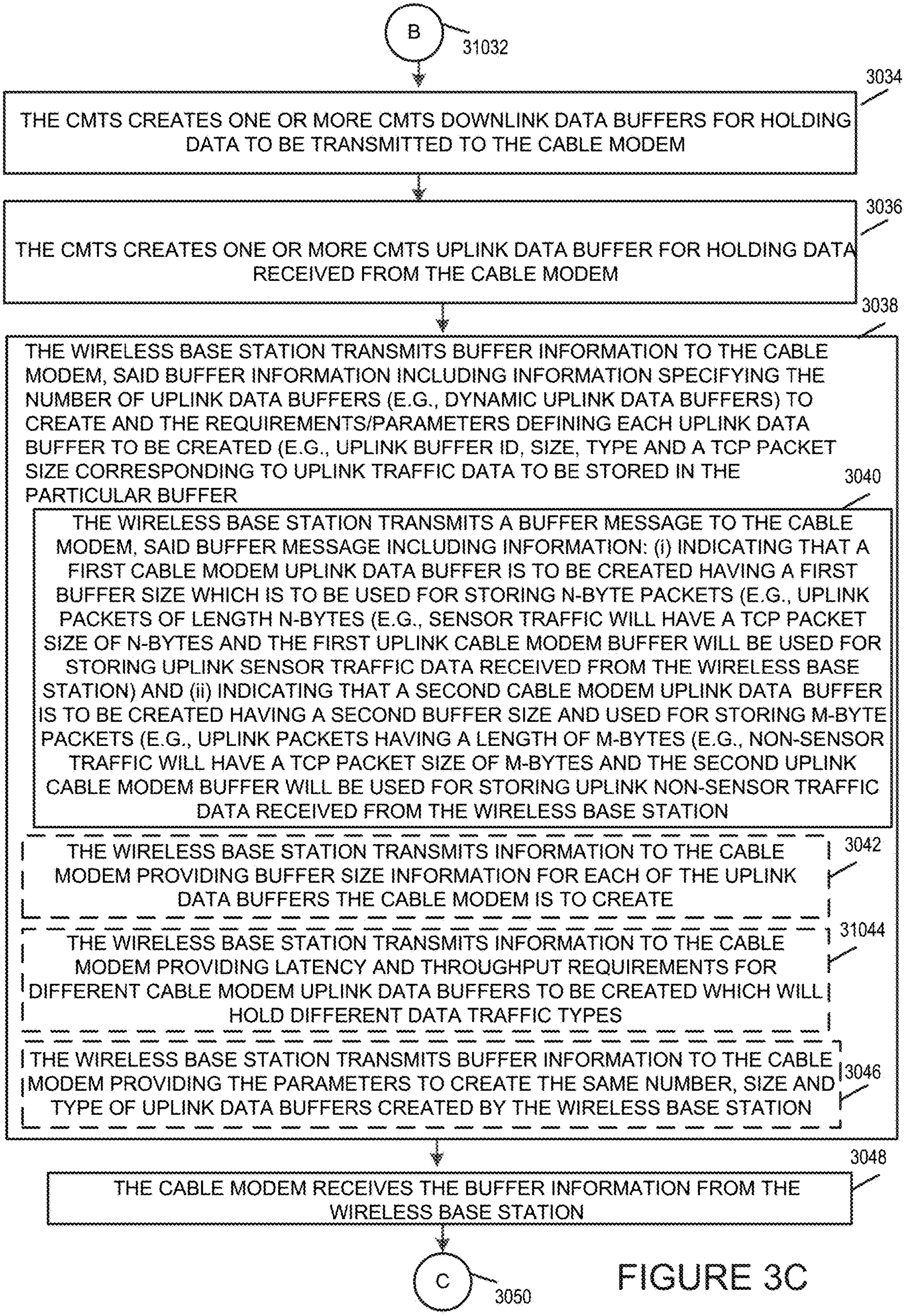
FIG. 3C illustrates the steps of the third part of an exemplary method in accordance with one embodiment of the present
Figure 3D:
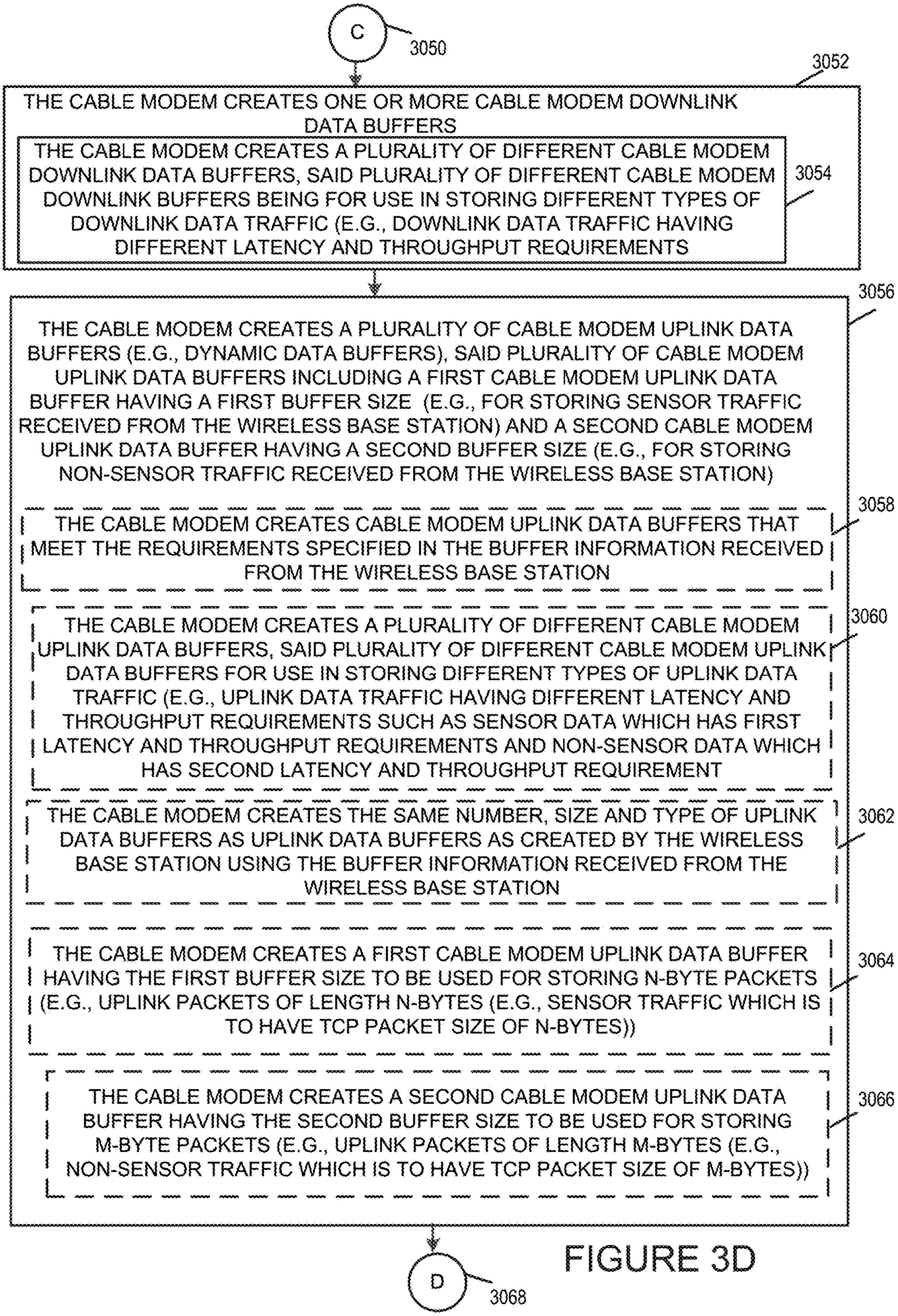
FIG. 3D illustrates the steps of the fourth part of an exemplary method in accordance with one embodiment of the present invention.
Figure 3E:
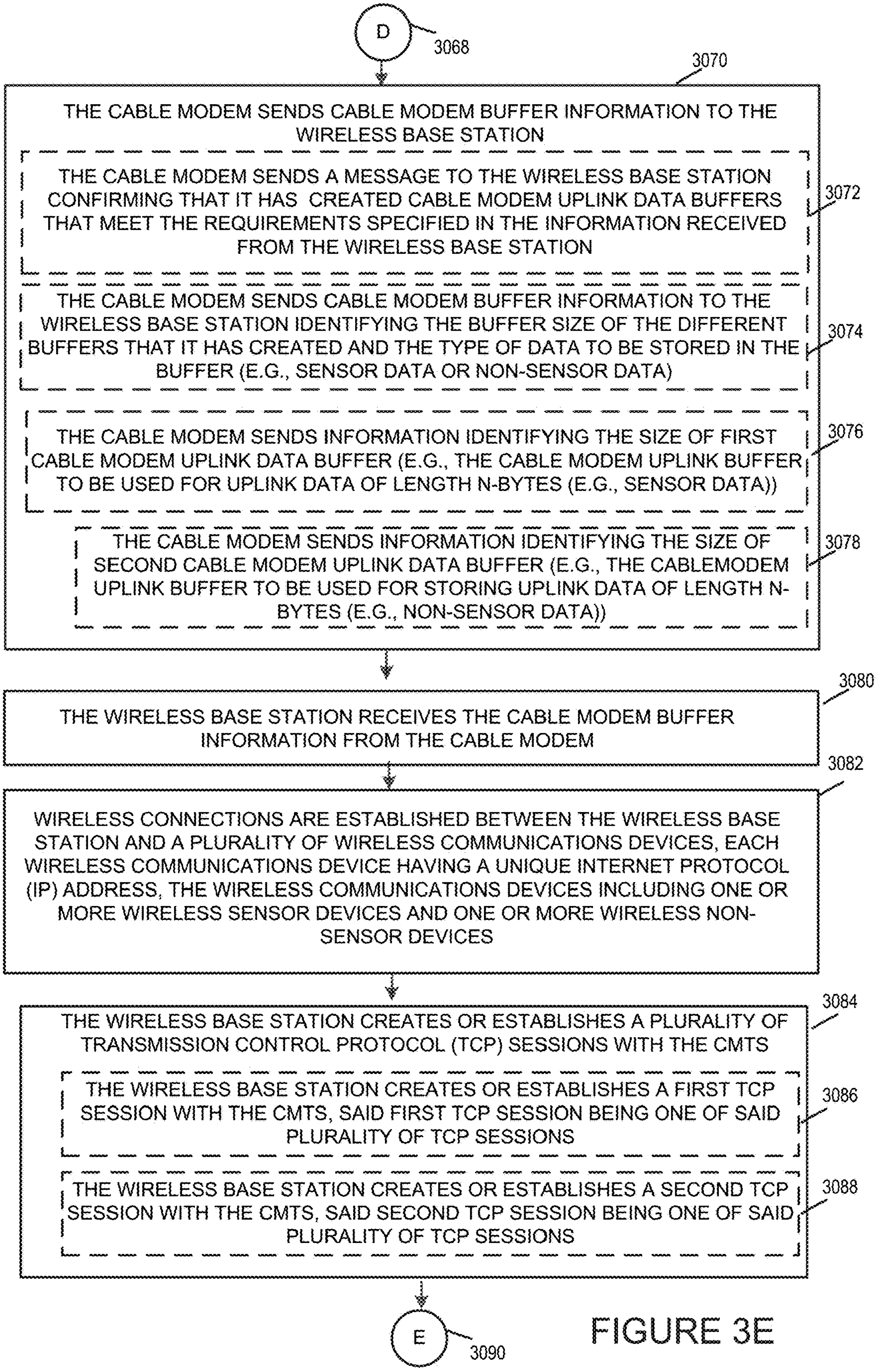
FIG. 3E illustrates the steps of the fifth part of an exemplary method in accordance with one embodiment of the present invention.
Figure 3F:
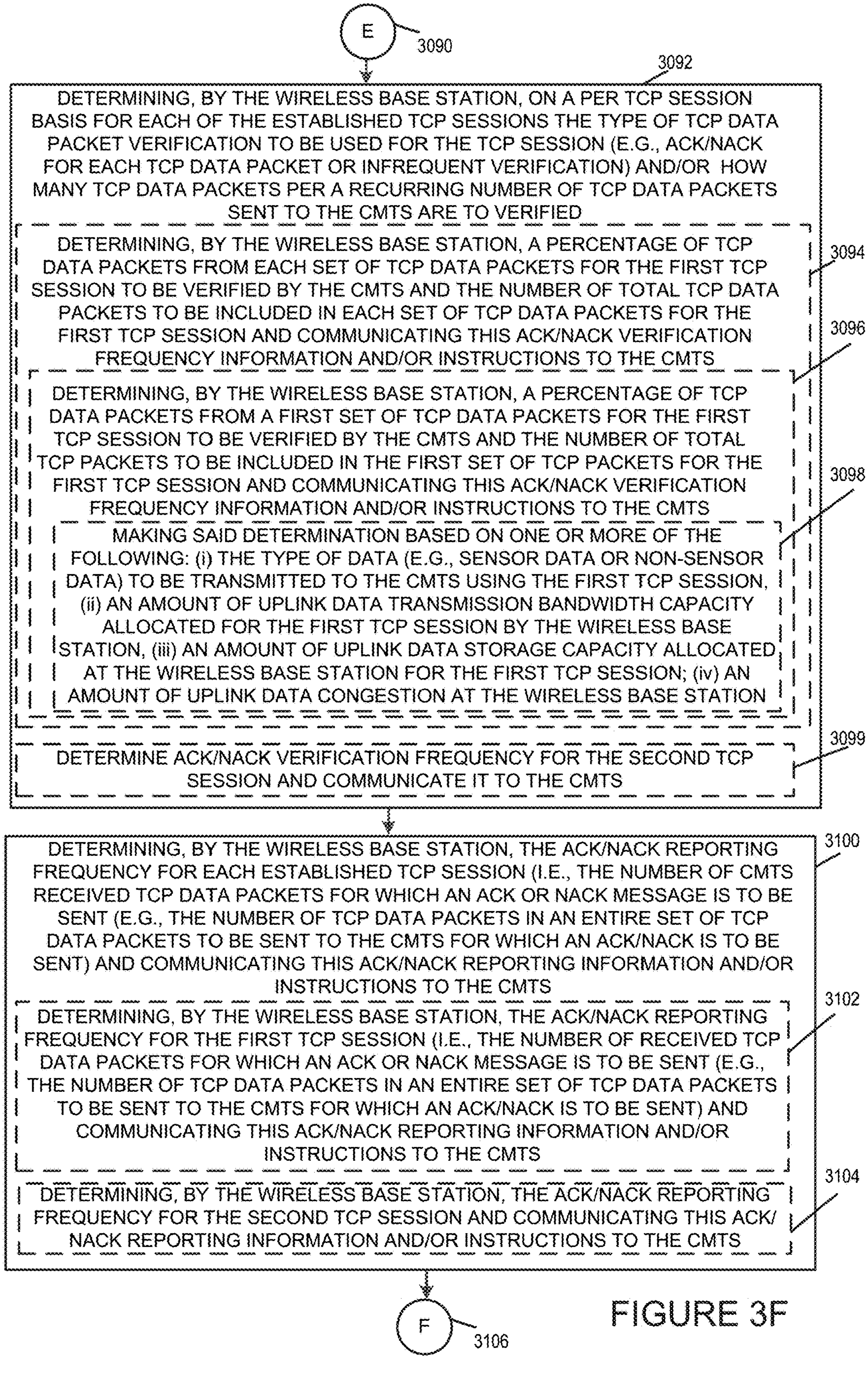
FIG. 3F illustrates the steps of the sixth part of an exemplary method in accordance with one embodiment of the present invention.
Figure 3H:
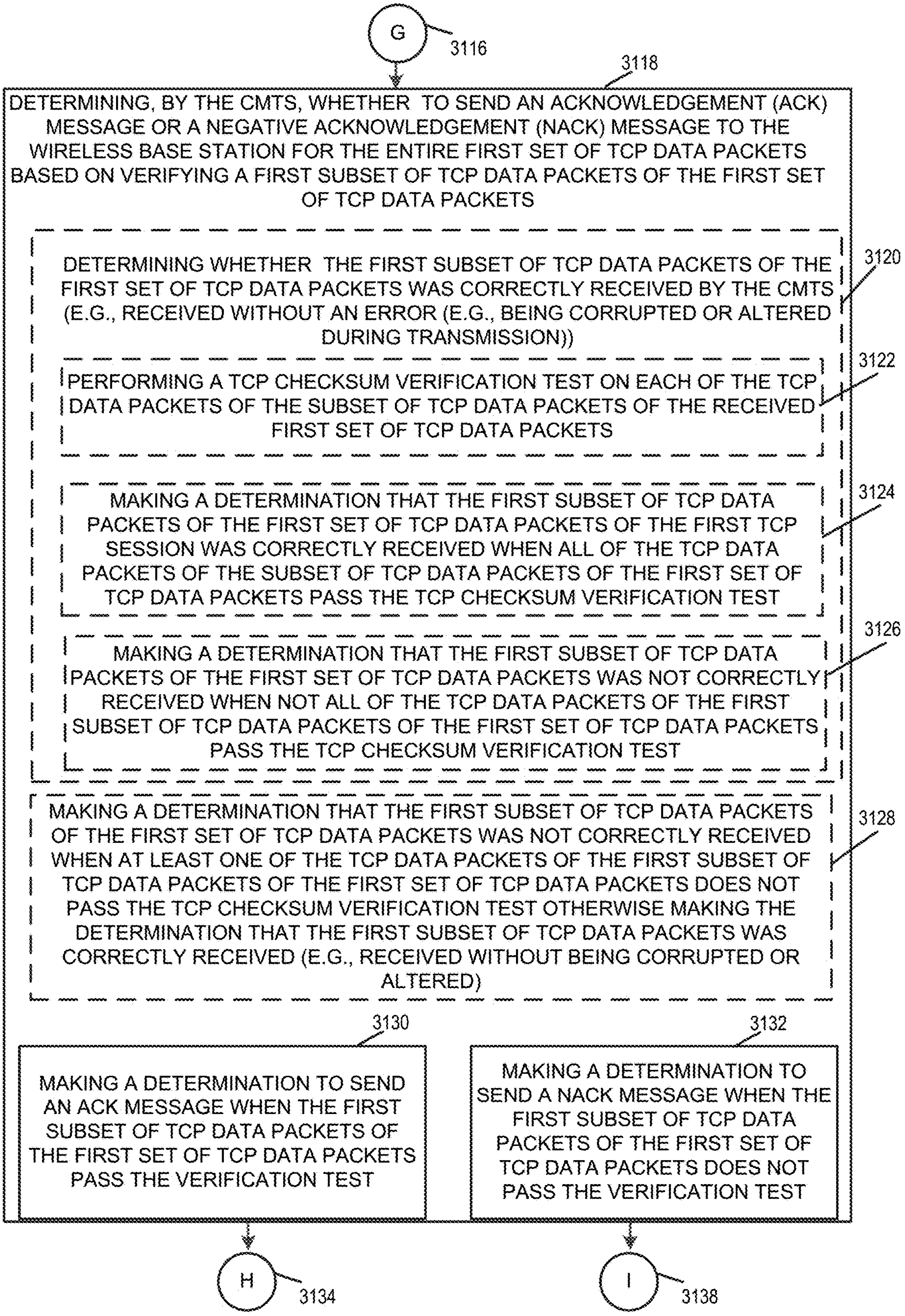
FIG. 3H illustrates the steps of the eighth part of an exemplary method in accordance with one embodiment of the present invention.
Figure 3I:
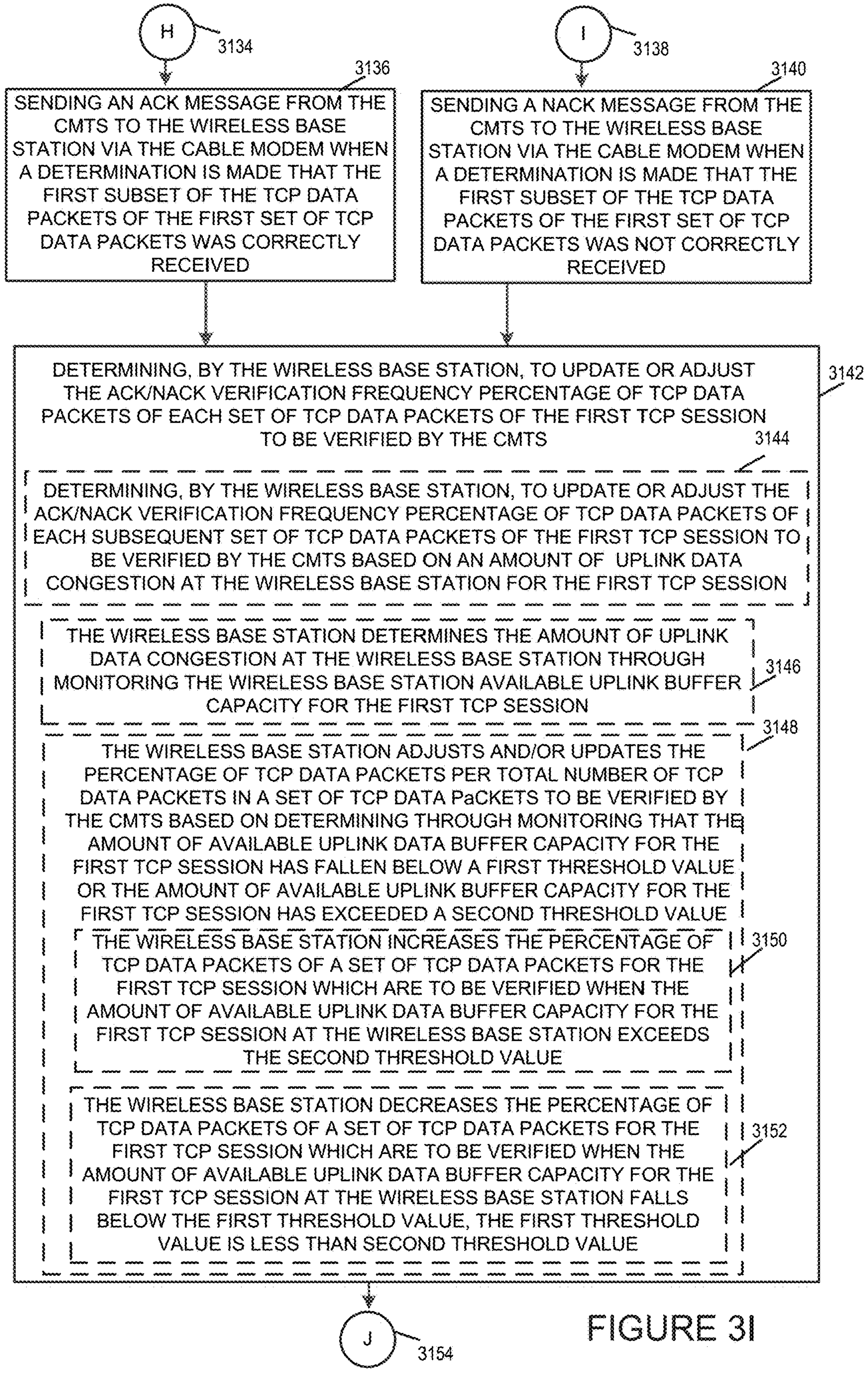
FIG. 3I illustrates the steps of the ninth part of an exemplary method in accordance with one embodiment of the present invention.
Figure 3J:
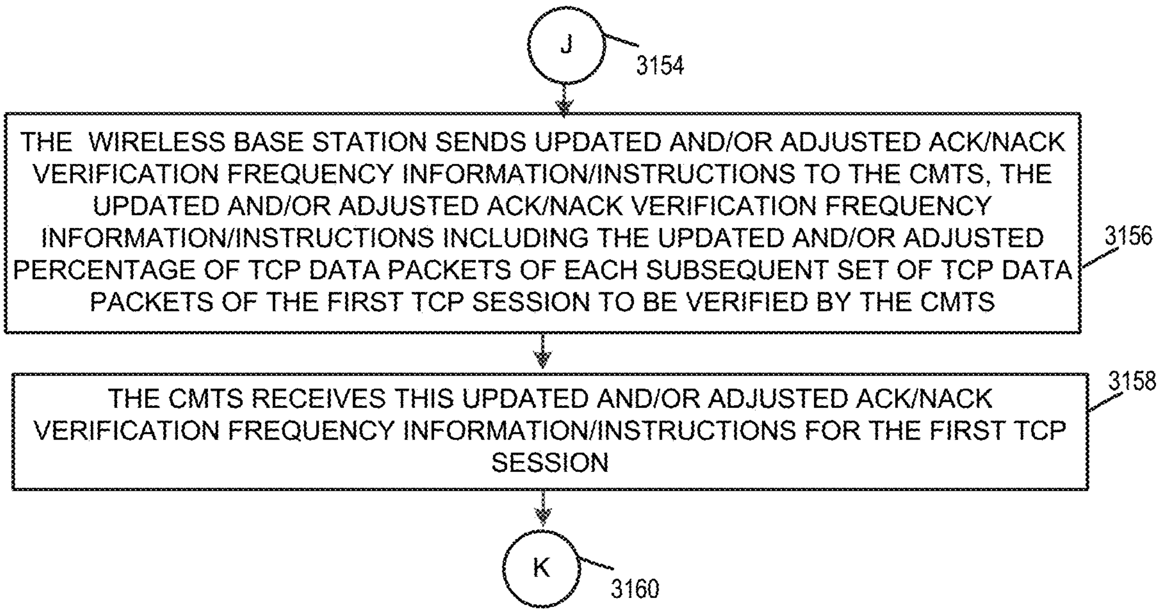
FIG. 3J illustrates the steps of the tenth part of an exemplary method in accordance with one embodiment of the present invention.
Figure 3:
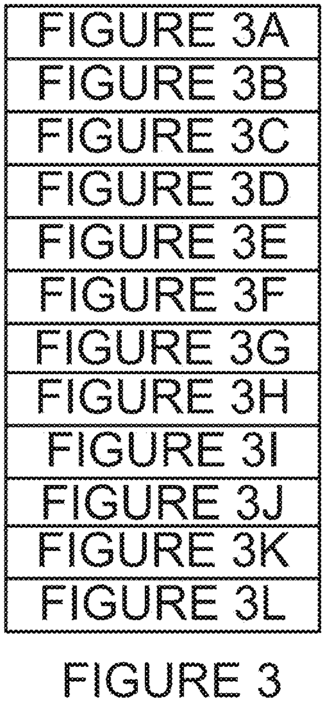
FIG. 3 illustrates the combination of FIGS. 3A, 3B, 3C, 3D, 3E, 3F, 3G, 3H, 3I, 3J, 3K, and 3L.
Figure 3K:
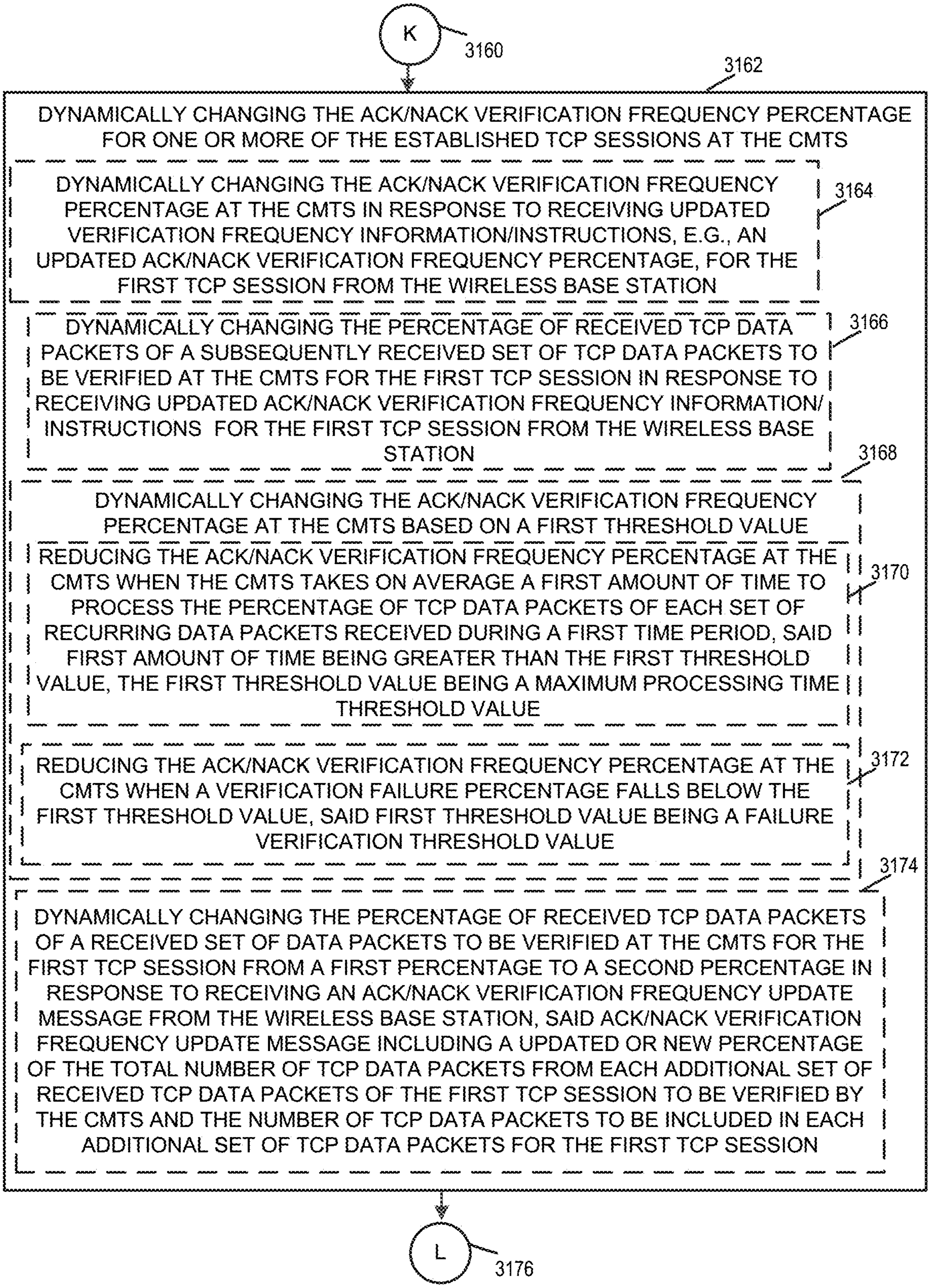
FIG. 3K illustrates the steps of the eleventh part of an exemplary method in accordance with one embodiment of the present invention.
Figure 3L:
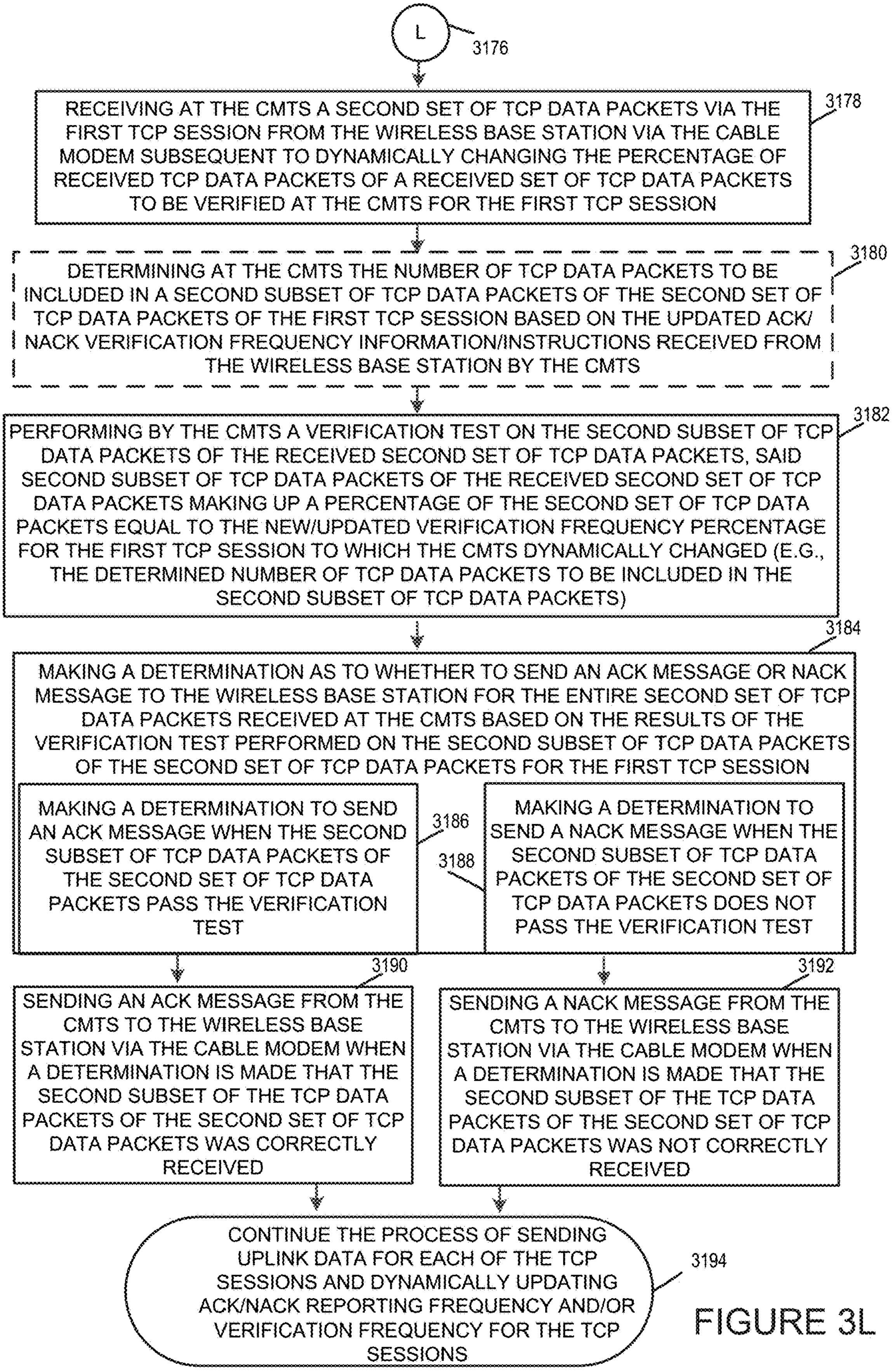
FIG. 3L illustrates the steps of the twelfth part of an exemplary method in accordance with one embodiment of the present invention.

FIG. 3 which illustrates the steps of a flowchart of a method 3000 which illustrates another exemplary method embodiment for communicating TCP packets between a wireless base station and a cable modem termination system via a cable modem. FIG. 3 illustrates the combination of FIGS. 3A, 3B, 3C, 3D, 3E, 3F, 3G, 3H, 3I, 3J, 3K, and 3L. FIG. 3A illustrates the steps of the first part of an exemplary method in accordance with one embodiment of the present invention. FIG. 3B illustrates the steps of the second part of an exemplary method in accordance with one embodiment of the present invention. FIG. 3C illustrates the steps of the third part of an exemplary method in accordance with one embodiment of the present. FIG. 3D illustrates the steps of the fourth part of an exemplary method in accordance with one embodiment of the present invention. FIG. 3E illustrates the steps of the fifth part of an exemplary method in accordance with one embodiment of the present invention. FIG. 3F illustrates the steps of the sixth part of an exemplary method in accordance with one embodiment of the present invention. FIG. 3G illustrates the steps of the seventh part of an exemplary method in accordance with one embodiment of the present invention. FIG. 3H illustrates the steps of the eighth part of an exemplary method in accordance with one embodiment of the present invention. FIG. 3I illustrates the steps of the ninth part of an exemplary method in accordance with one embodiment of the present invention. FIG. 3J illustrates the steps of the tenth part of an exemplary method in accordance with one embodiment of the present invention. FIG. 3K illustrates the steps of the eleventh part of an exemplary method in accordance with one embodiment of the present invention. FIG. 3L illustrates the steps of the twelfth part of an exemplary method in accordance with one embodiment of the present invention.

For explanatory purposes the exemplary method 3000 will be explained in connection with the exemplary communications system 100 illustrated in FIG. 1 wherein the wireless network is a CBRS network, wireless base stations are CBSD devices, the resource allocation management devices are SAS devices, the user equipment devices are wireless communications devices which are either sensors or non-sensor device types, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 3000 shown in FIG. 3 will now be discussed in detail. The method starts in start step 3002 shown on FIG. 3A.

Operation proceeds from start step 3002 to step 3004.

In step 1004, a cable modem termination system (e.g., cable modem termination system 1 122 of system 100) is powered up and begins operating. Operation proceeds from step 3004 to step 3006.

In step 3006, a cable modem (e.g., cable modem 1 104 of system 100) connects to the cable modem termination system and begins operating. In various embodiments, the cable modem is powered by the cable modem termination system with power being supplied via a cable connecting the cable modem to the cable modem termination system. The cable is also used by the cable modem termination system and the cable modem to communicate with one another. In at least some embodiments, the power is supplied using power over Ethernet protocols, technologies and/or connections. In some embodiments, the cable modem not powered by the CMTS by a separate power source located at the site at which the cable modem is installed. Operation proceeds from step 3006 to step 3008.

In step 3008, a wireless base station (e.g., wireless base station 102 (e.g., a CSBD) of system 100) is connected to the cable modem via a cable and begins operating. The cable modem supplies power to the wireless base station. The power is supplied by the cable modem to the wireless base station over the cable connecting the wireless base station to the cable modem. The cable connecting the wireless base station to the cable mode is also used by the cable modem and the wireless base station to communicate with one another. The cable modem is positioned between the wireless base station and the cable modem termination system, The cable modem is positioned on the communications path between the wireless base station and the cable modem termination system such that the transmission of packets between the wireless base station and the cable modem termination system pass through the cable modem.

When the system is operating, the wireless base station provides services, e.g., broadband services, to user equipment devices, e.g., wireless communications devices such as sensor devices (e.g., devices which communicate sensor data traffic), non-sensor devices (devices which do not communicate sensor data traffic), laptops, smartphones, cellphones, tablets, cars, etc. which connect to the wireless base station. The user equipment device uplink data is sent to the core network (e.g., core network 150) of the service provider (e.g., service provider 1 in system 100) which typically operates both the wireless base station 1 102, the cable modem 104, the cable modem termination system 1 122 and the core network 150. The service provider typically provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device. The terms downlink and downstream are used interchangeable herein, The terms uplink and upstream are also used interchangeable herein.

Operation proceeds from step 3008 to optional step 3010. In optional step 3010. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 3010 to optional step 3012.

In optional step 3012, the resource allocation management device grants spectrum to the wireless base station for use in communicating with user equipment devices. Operation proceeds from optional step 3012 to step 3014.

When optional steps 3010 and 3012 are not implemented, operation proceeds from step 3008 to step 3014.

In step 3014, the wireless base station creates one or more downlink data buffers for holding data to be received from the cable modem and to be transmitted to the wireless communications devices to which the wireless base station provides services. Operation proceeds from step 3014 via connection node A 3016 to step 3018 shown on FIG. 3B.

In step 3018, the wireless base station creates a plurality of wireless base station uplink data buffers (e.g., from memory located within the wireless base station), said plurality of wireless base station uplink data buffers including a first wireless base station uplink data buffer and a second wireless base station uplink data buffer. In some embodiments, step 3018 includes one or more sub-steps 3020, 3022, 3024, 3026, 3028 and 3030.

In sub-step 3020, as part of creating the wireless base station uplink data buffers, the wireless base station defines a buffer ID, size, and type for each of the plurality of wireless base station uplink data buffers. With respect to the first wireless base station uplink data buffer, the wireless base station in some embodiments defines the buffer ID as a buffer ID 1, the size is a first buffer size which is X bytes (X being a positive integer number such as 1 MB (megabytes), and the type is for traffic with a first latency requirement, e.g., low latency sensor data traffic. With respect to the second wireless base station uplink data buffer, the wireless base station in some embodiments defines the buffer ID as a buffer ID 2, the size is a second buffer size which is Z bytes (Z being a positive integer number such as 0.5 MB (megabytes), and the type is for traffic with a second latency requirement, e.g., non-sensor data traffic.

In sub-step 3022, the wireless base statin determines a buffer size (e.g., number of bytes of storage capacity) of each of the uplink data buffers based on one or more of the following: (i) the type of wireless communications devices for which the uplink data buffer is to be used to store data (e.g., sensor device type, non-sensor device type), (ii) the number of communications devices of a particular type expected or estimated to be serviced at the same time by the wireless base station for which the buffer is to be used to store data, (iii) type of data traffic to be stored in the buffer (e.g., sensor data or non-sensor data), and (iv) latency and/or throughput requirements of the devices and/or traffic for which data is to be stored in the uplink data buffer.

In step 3024, the wireless base station determines a first buffer size for the first wireless base station uplink data buffer based on one or more of the following: (i) the communication device type for which data is to be stored in the first wireless base station uplink data buffer, (ii) the type of data traffic to be stored in the first wireless base station uplink data buffer, (iii) the amount of data traffic and/or the latency requirements related to the device type or data traffic type for which the first wireless base station uplink data buffer is to be used to store data.

In sub-step 3026, the wireless base station determines a second buffer size for the second wireless base station uplink data buffer based on one or more of the following: (i) the communication device type for which data is to be stored in the second wireless base station uplink data buffer, (ii) the type of data traffic to be stored in the second wireless base station uplink data buffer, (iii) the amount of data traffic and/or the latency requirements related to the device type or data traffic type for which the second wireless base station uplink data buffer is to be used to store data.

In sub-step 3028, the wireless base station creates a first wireless base station uplink data buffer for use in storing data (e.g., sensor data) received from wireless sensor devices. The first wireless base station uplink data buffer having a first buffer size.

In sub-step 3030, the wireless base station creates a second wireless base station uplink data buffer for use in storing data (e.g., sensor data) received from wireless non-sensor devices. The second wireless base station uplink data buffer having a second buffer size.

Operation proceeds from step 3018 via connection node B 3032 to step 3034 shown on FIG. 3C.

In step 3034, the CMTS creates one or more CMTS downlink data buffers for storing or holding data to be transmitted to the cable modem. Operation proceeds from step 3034 to step 3036.

In step 3036, the CMTS creates one or more CMTS uplink data buffers for storing or holding data received from the cable modem. Operation proceeds from step 3036 to step 3038.

In step 3036, the wireless base station transmits information to the cable modem, the buffer information including information specifying the number of cable modem uplink data buffers to create and the requirements and/or parameters for each of the uplink data buffers to be created (e.g., uplink data buffer ID, size, type and TCP packet size of received TCP packets to be stored in the uplink data buffer). Operation proceeds from step 3036 to step 3038.

In step 3038, the wireless base station transmits buffer information to the cable mode. The buffer information includes information specifying the number of uplink data buffers (e.g., dynamic uplink data buffers) to create and the requirements/parameters defining each uplink data buffer to be created (e.g., uplink buffer ID, size, type and a TCP packet size corresponding to uplink data traffic to be stored in the particular uplink data buffer). The cable modem uplink data buffers are referred to as dynamic uplink data buffers as the cable modem will be capable of adjusting and/or changing the number of cable modem uplink data buffers (e.g., based on the latency and uplink data speed. Also, the size of the uplink buffers will be adjustable and may be, and in some embodiments is adjusted based on for example the data processing speed of the cable modem and/or other components in the system. The adjustments to the cable modem uplink data buffers may be, and in some embodiments are, implemented by the cable modem in response to instructions or information, e.g., updated buffer information, received from the wireless base station. The wireless base station uplink and downlink data buffers are also dynamic data buffers which are adjustable by the wireless base station. In some embodiments step 1038, includes one or more sub-steps 3040, 3042, 3044, and 3046.

In sub-step 3040, the wireless base station transmits a buffer message to the cable modem. The buffer message includes one or more of the following: (i) information indicating that a first cable modem uplink data buffer is to be created having a first buffer size which is to be used for N-byte packets (e.g., uplink TCP data packets having a length of N-bytes (N being a positive integer) (e.g., sensor traffic will have a TCP packet size of N-bytes and the first uplink cable modem buffer will be used for storing uplink sensor traffic data received from the wireless base station), and (ii) information indicating that a second cable modem uplink data buffer is to be created having a second buffer size which is to be used for M-byte packets (e.g., uplink TCP data packets having a length of M-bytes (M being a positive integer) (e.g., non-sensor traffic will have a TCP packet size of M-bytes and the first uplink cable modem buffer will be used for storing uplink non-sensor traffic data received from the wireless base station).

In sub-step 3042, the wireless base station transmits information to the cable modem providing buffer size information for each of the uplink data buffers the cable modem is to create (e.g., capacity of the buffer specified in number of bytes).

In sub-step 3044, the wireless base station transmits information to the cable modem providing latency and throughput requirements for different cable modem uplink data buffers to be created which will be used to hold different data traffic types (e.g., sensor traffic vs. non-sensor traffic).

In sub-step 3046, the wireless base station transmits buffer information to the cable modem providing the parameters to create the same number, size and type of uplink data buffers created by the wireless base station.

Operation proceeds from step 3038 to step 3048.

In step 3048, the cable mode receives the buffer information from the wireless base station.

Operation proceeds from step 3048 via connection node C 3050 to step 3052 shown on FIG. 3D.

In step 3052, the cable modem creates one or more downlink data buffers. In some embodiments, step 3052 includes sub-step 3054. In sub-step 3054, the cable modem creates a plurality of different cable modem downlink data buffers. The plurality of different cable modem downlink buffers being for use in storing different types of downlink data traffic (e.g., downlink data traffic having different latency and throughput requirements. Operation proceeds from step 3052 to step 3056.

In step 1056, the cable modem creates a plurality of cable modem uplink data buffers (e.g., dynamic data buffers). The plurality of cable modem uplink data buffers includes a first cable modem uplink data buffer having a first buffer size (e.g., for storing sensor traffic received from the wireless base station) and a second cable modem uplink data buffer having a second buffer size (e.g., for storing non-sensor traffic received from the wireless base station). In some embodiments, step 3056 includes one or more sub-steps 3058, 3060, 3062, 3064, and 3066.

In sub-step 3058, the cable modem creates cable modem uplink data buffers (e.g., dynamic data buffers) that meet the requirements specified in the buffer information received from the wireless base station.

In sub-step 3060, the cable modem creates a plurality of different cable modem uplink data buffers, said plurality of different cable modem uplink data buffers for use in storing different types of uplink data traffic (e.g., uplink data traffic having different latency and throughput requirements such as sensor data which has a first latency and throughput requirement and non-sensor data which has a second latency and throughput requirement, the first and second latency and throughput requirements being different.

In sub-step 3062, the cable modem creates the same number of uplink data buffers having the same buffer size and being of the same buffer type as created by the wireless base station using the buffer information received from the wireless base station. In such an embodiment, the created cable modem uplink data buffers match the wireless base station uplink data buffers.

In sub-step 3064, the cable modem creates a first cable modem uplink data buffer having the first buffer size to be used for storing N-byte packets (e.g., uplink TCP data packets having a length of N-bytes (e.g., sensor traffic uplink TCP data packets which have a TCP packet size of N-bytes)).

In sub-step 3066, the cable modem creates a second cable modem uplink data buffer having the second buffer size to be used for storing M-byte packets (e.g., uplink TCP data packets having a length of M-bytes (e.g., non-sensor traffic uplink TCP data packets which have a TCP packet size of M-bytes)).

The cable modem uplink and downlink data buffers may be, and in some embodiments are, implemented in memory (e.g., volatile memory) in the cable modem.

Operation proceeds from step 3056 via connection node D 3068 to step 3070 shown on FIG. 3E.

In step 3070, the cable modem sends cable modem buffer information to the wireless base station, said cable modem buffer information including information about the cable modem uplink buffers created by the cable modem (e.g., ID, number, size, and type for each cable modem uplink buffer and packet byte size to be stored in the buffer).

In some embodiments step 3070 includes one or more sub-steps 3072, 3074, 3076 and 3078.

In sub-step 3071, the cable modem sends a message to the wireless base station confirming that the cable modem has created cable modem uplink data buffers that meet the requirements specified in the buffer information received from the wireless base station.

In sub-step 3074, the cable modem sends cable modem buffer information to the wireless base station identifying the buffer size of the different buffers that the cable modem has created and the type of data to be stored in the buffer (e.g., sensor data or non-sensor data).

In sub-step 3076, the cable modem sends information identifying the size of first cable modem uplink data buffer (e.g., the cable modem uplink data buffer to be used for storing uplink data of length N-bytes, (e.g., sensor data)).

In sub-step 3078, the cable modem sends information identifying the size of second cable modem uplink data buffer (e.g., the cable modem uplink data buffer to be used for storing uplink data of length M-bytes, (e.g., non-sensor data)).

Operation proceeds from step 3078 to step 3080. In step 3080, the wireless base station receives the cable modem buffer information from the cable modem. Operation proceeds from step 3080 to step 3082.

In step 3082, wireless connections are established between the wireless base station and a plurality of wireless communications devices, each wireless communications device having a unique Internet Protocol (IP) address. The wireless communications devices including one or more wireless sensor devices and one or more wireless non-sensor devices. In various embodiments, the wireless communications devices include a plurality of wireless sensor devices and a plurality of wireless non-sensor devices. In some embodiments, the wireless communications devices connected to the wireless base station are classified by the wireless base station as being either sensor device type or non-sensor device type. In such embodiments, the sensor device type devices sending uplink sensor data traffic to the core network and the non-sensor device type device sending uplink data which is not sensor data traffic to the core network. Operation proceeds from step 3082 to step 3084.

In step 3084, the wireless base station creates or establishes a plurality of TCP sessions with the CMTS. In some embodiments, the wireless base station creates one or more TCP session with the CMTS. In some embodiments, step 3084 includes one or more sub-steps 3086 and 3088.

In sub-step 3086, the wireless base station creates or establishes a first TCP session with the CMTS, the first TCP session being one of said plurality of TCP sessions.

In sub-step 3088, the wireless base station creates or establishes a second TCP session with the CMTS, the second TCP session being one of the plurality of TCP sessions.

Operation proceeds from step 3084 via connection node 3090 to optional step 3092 shown on FIG. 3F.

In step 3092, the wireless base station, on a per TCP session basis determines for each of the established TCP sessions the type of TCP data packet verification to be performed by the CTMS for the TCP session (e.g., verification for each received TCP data packet for the TCP session or infrequent verification) and/or how many TCP data packets per a recurring number of TCP data packets sent to the CMTS are to be verified. In some embodiments step 3092 includes one or more sub-step 3094 and 3099.

In sub-step 3094, the wireless base station determines a percentage of TCP data packets from each set of TCP data packets for the first TCP session to be verified by the CMTS and the number of total TCP data packets to be included in each set of TCP data packets for the first TCP session and communicates this ACK/NACK verification frequency information and/or instructions to the CMTS.

Sub-step 3094 in some embodiments includes sub-step 3096. In sub-step 3096, the wireless base station determines a percentage of TCP data packets from a first set of TCP data packets for the first TCP session to be verified by the CMTS and the number of total TCP data packets to be included in the first set of TCP packets for the first TCP session and communicates this ACK/NACK verification frequency information and/or instructions to the CMTS.

In some embodiments, sub-step 3096 includes sub-step 3098. In sub-step 3098, the determination of the percentage of TCP data packets from a first set of TCP data packets to be verified is made based on one or more of the following: (i) the type of data (e.g., sensor data or non-sensor data) to be transmitted to the CMTS using the first TCP session, (ii) an amount of uplink data transmission bandwidth capacity allocated for the first TCP session by the wireless base station, (iii) an amount of uplink data storage capacity allocated at the wireless base statin for the first TCP session (e.g., the size of the first wireless base station uplink data buffer); and (iv) an amount of the uplink data congestion being experienced at the wireless base station.

In sub-step 3099, the wireless base station determines the ACK/NACK verification frequency for the second TCP session and communicates it the CMTS. Though not shown the determination of the ACK/NACK verification frequency for the second TCP session may be, and in some embodiments, is based on the same considerations as shown in the sub-steps with respect to the first TCP session. In some embodiments, the wireless base station bases each of the determinations with respect to each of the established TCP session on the same or similar information as described in connection with the first TCP session.

In various embodiments, the size of the set of TCP packets for each established TCP session is based on and/or equal to the size of the cable modem uplink data buffer created for the particular TCP session. For example, the size of each set of TCP data packets for the first TCP session is based on or set equal to the size in TCP data packets of the first cable modem uplink data buffer. This allows the cable modem to send an entire buffer to the CMTS as a single set of TCP data packets using the full uplink data capacity therein speeding up data transmission for the first TCP data, e.g., sensor data, which is of a low latency requirement type of data traffic in this example. Operation proceeds from step 3092 to step 3100.

In step 3100, the wireless base station determines the ACK/NACK reporting frequency for each established TCP session (i.e., the number of CMTS received TCP data packets for which the CMTS is to send an ACK or NACK message to the wireless base station (e.g., the number of TCP data packets in an entire set of TCP data packets to be sent to the CMTS for which an ACK or NACK message is to be sent and then communicates this ACK/NACK reporting information and/or instructions to the CMTS. In some embodiments, step 3100 includes one or more sub-step 3102 and 3104. In sub-step 3102, the wireless base station determines the ACK/NACK reporting frequency for the first TCP session (i.e., the number of received TCP data packets for which an ACK or NACK message is to be sent and communicates the determined ACK/NACK reporting information and/or instructions for the first TCP session to the CMTS. In some embodiments, the wireless base station determines that the CMTS is to send an ACK or NACK message for each received set of TCP data packet (e.g., one ACK or NACK for the entire first set of TCP data packets sent to the CMTS which in some embodiments is the size in TCP data packets as the cable modem uplink data buffer being used for the TCP data packets of the first TCP session (i.e., the size of the first cable modem uplink data buffer). In sub-step 3104, the wireless base station determines the ACK/NACK reporting frequency for the second TCP session (i.e., the number of received TCP data packets for which an ACK or NACK message is to be sent and communicates the determined ACK/NACK reporting information and/or instructions for the first TCP session to the CMTS. In some embodiments, the second TCP session is used for non-sensor data with an ACK/NACK reporting information and/or instructions being determined to be for every TCP data packet sent there is to be an ACK or NACK sent by the CMTS to the wireless base station. In some embodiments, the number of TCP data packets for which an ACK or NACK message is to be sent for a TCP session is based on the type of data being transmitted from the wireless base station to the CMTS using the TCP session.

Operation proceeds from step 3100 via connection node F 3106 to step 3108 shown on FIG. 3G.

In step 3108, the CMTS receives from the wireless base station via the cable modem ACK/NACK frequency reporting and/or ACK/NACK verification frequency information and/or instructions. The ACK/NACK frequency reporting and/or ACK/NACK verification information includes information/instructions for each of the established TCP sessions. The ACK/NACK verification frequency information and/or instructions are sometimes referred to herein as verification frequency information and/or instructions.

In some embodiments, step 3108 includes one or more sub-steps 3110 and 3112. In sub-step 3110, the CMTS receives from the wireless base station an ACK/NACK verification frequency message including said ACK/NACK verification frequency information/instructions. The ACK/NACK verification frequency information/instructions notifying the CMTS as to the type of ACK/NACK verification that is to be utilized in connection with TCP data packets (e.g., recurring fixed numbers of TCP data packets or sets of TCP data packets) received via the first TCP session from the cable modem (e.g., the type of ACK/NACK verification frequency being one of the following: (i) ACK/NACK verification for each TCP data packet received by the CMTS via the first TCP session, or (ii) infrequent ACK/NACK verification Infrequent ACK/NACK verification being verification of a percentage or portion of the total number of TCP data packets in a received set of TCP data packets or for a received total recurring number of TCP data packets received by the CMTS via the first TCP session (e.g., verifying a first subset of the TCP data packets from a received first set of TCP data packets). The wireless base station in many embodiments sends ACK/NACK verification frequency information/information to the CMTS for each of the TCP sessions established between the wireless base station and the CMTS which is received by the CMTS and may, and in various embodiments does, include information identifying the type of verification to be performed by the CMTS for each of the established TCP sessions.

In sub-step 3112, the CMTS receives from the wireless base station for one or more of the established TCP sessions an ACK/NACK verification frequency message including the ACK/NACK verification frequency information/instructions for one or more of the established TCP sessions (e.g., the first TCP session and/or the second TCP session), said ACK/NACK verification frequency information/instructions notifying the CMTS as to the an ACK/NACK verification frequency percentage to be used for each of the established TCP sessions or for one or more of the established TCP sessions (e.g., different percentages for different TCP session). The ACK/NACK verification frequency percentage being a percentage of tCP data packets received in a received set of TCP data packets for a TCP session for which a verification test is to be performed (e.g., 100% means all TCP data packets in a received set of TCP data packets are to have a verification test performed on them and 10% means only 10% of the TCP data packets in a received set of TCP data packets for the TCP session are to have a verification test performed on them).

In some embodiments, the wireless base station determines the first TCP session is an infrequent verification TCP session based on the data traffic type being communicated from the wireless base station to the CMTS which in this example is sensor traffic. In some such embodiments, the wireless base station specifies to the CMTS the number of received TCP data packets from the wireless base station which make up a set of TCP data packets to be verified and the percentage, amount or portion of the set of TCP data packets to be verified. This information and/or instructions being communicated in the ACK/NACK verification frequency information and/or instructions. The percentage for example is typically a value other than 100% as a subset of packets of the first set of received packets are verified.

In some embodiments, the wireless base station determines the second TCP session is to implement or utilize TCP data packet verification type wherein each TCP data packet of the second TCP session received by the CMTS is to be verified by the CMTS. This determination being based on the type of data traffic being communicated from the wireless base station to the CMTS which in this example is non-sensor data. In some such embodiments, the wireless base station may also determine that ACK/NACK reporting is to be provided after each TCP data packet is verified. The wireless base station communicates this information to the CMTS via the ACK/NACK reporting information and/or the ACK/NACK verification frequency information. In some embodiments, this information is conveyed by the wireless base station sending an ACK/NACK verification frequency percentage indicating 100% of received TCP data packets of the second TCP session are to be verified.

Operation proceeds from step 108 to step 3114.

In step 3114, a first set of TCP data packets is received via the first TCP session at the CMTS from the cable modem located on the communications path between the at the CMTS and the wireless base station. The TCP data packets of the first set of TCP data packets having been generated and sent from the wireless base station. Each TCP data packet is of size N. The cable modem upon receipt determining based on the TCP data packets size that it belong to the first TCP session and was to be stored in the first cable modem uplink data buffer. When the first cable modem uplink data buffer was full transmitting the first set of TCP data packets of the first TCP session to the CMTS at one time (e.g., by using all available uplink bandwidth and outputting/transmitting all the TCP data packets stored in the first cable modem uplink buffer to the CMTS). Operation proceeds from step 3114 via connection node G 3116 to step 3118 shown on FIG. 3H.

In step 3118, the CMTS determines whether to send an acknowledgement (ACK) message or a negative acknowledgement (NACK) message to the wireless base station for the entire set of TCP data packets based on verifying a first subset of TCP data packets of the first set of TCP data packets. In some embodiments, step 3118 includes one or more sub-steps 3120, 3128, 3130 and 3132.

In sub-step 3120, the CMTS determines whether the first subset of TCP data packets of the first set of TCP data packets was correctly received by the CMTS (e.g., received without an error (e.g., an error being the TCP data packet was corrupted or altered during transmission)). In some embodiments sub-step 3120 includes one or more sub-steps 3122, 3124 and 3126.

In sub-step 3122, the CMTS performs a TCP checksum verification test on each of the TCP data packets of the subset of TCP data packets for the received first set of TCP data packets. In sub-step 3124, the CMTS makes a determination that the sub-set of TCP data packets of the first set of TCP data packets of the first TCP session was correctly received when all of the TCP data packets of the first subset of TCP data packets of the first set of TCP data packets pass the TCP checksum verification test. In sub-step 3126, the CMTS makes a determination that the first subset of TCP data packets of the first set of TCP data packets of the first TCP session was not correctly received when not all of the TCP data packets of the first subset of TCP data packets of the first set of TCP data packets of the first TCP session pass the TCP checksum verification test.

In sub-step 3128, the CMTS makes a determination that the first subset of TCP data packets of the first set of TCP packets of the first TCP session was not correctly received when at least one of the TCP data packets of the first subset of TCP data packets of the first set of TCP data packets of the first TCP session does not pass the TCP checksum verification test; otherwise, the CMTS makes the determination that the first subset of TCP data packets was correctly received (e.g., received without being corrupted or altered). The CMTS makes the determination as to whether the entire first set of TCP data packets of the first TCP data session was correctly received or not based on the results of the verification performed on the first subset of TCP data packets.

In sub-step 3130, the CMTS makes a determination to send or transmit an ACK message when the first subset of TCP data packets of the first set of TCP data packets of the first TCP session pass the verification test. Operation proceeds from sub-step 3130 via connection node H 3134 to step 3136 shown on FIG. 3I.

In sub-step 3132, the CMTS makes a determination to send or transmit a NACK message when the first subset of TCP data packets of the first set of TCP data packets of the first TCP session does not pass the verification test. Operation proceeds from sub-step 3132 via connection node I 3138 to step 3140 shown on FIG. 3I.

In step 3136, the CMTS sends an ACK message to the wireless base station via the cable modem when a determination is made that the first subset of TCP data packets of the first set of TCP data packets of the first TCP session was correctly received. The ACK message being for the entire first set of TCP data packets of the first TCP session. The percentage of TCP data packets verified of the first set of TCP data packets being in accordance with the verification frequency information and/or instructions received by the CMTS from the wireless base station for the first TCP session (e.g., the CMTS sampling and verifying the verification frequency percentage of packets of the first set of TCP data packets of the first TCP session specified by the wireless base station). The CMTS also reports/sends its ACK message for the entire first set of TCP data packets in accordance with the received ACK/NACK reporting frequency information and/or instructions received from the wireless base station for the first TCP session. Operation proceeds from step 3136 to step 3142.

In step 3140, the CMTS sends a NACK message to the wireless base station via the cable modem when a determination is made that the first subset of TCP data packets of the first set of TCP data packets of the first TCP session was not correctly received. The NACK message being for the entire first set of TCP data packets of the first TCP session. The percentage of TCP data packets verified of the first set of TCP data packets being in accordance with the verification frequency information and/or instructions received by the CMTS from the wireless base station for the first TCP session (e.g., the CMTS sampling and verifying the verification frequency percentage of packets of the first set of TCP data packets of the first TCP session specified by the wireless base station). The CMTS also reports/sends its NACK message for the entire first set of TCP data packets in accordance with the received ACK/NACK reporting frequency information and/or instructions received from the wireless base station for the first TCP session. Operation proceeds from step 3140 to step 3142.

In step 3142, the wireless base station determines to update or adjust the ACK/NACK verification frequency percentage of TCP data packets of each set of TCP data packets of the first TCP session to be verified by the CMTS. This dynamic update and/or adjustment. In some embodiments, it is based on feedback from the CMTS and/or the status of uplink data congestion at the wireless base station (e.g., with respect to the first TCP session). In some embodiments, step 3142 includes one or more sub-steps 3144, 3146, and 3148. This update and/or adjustment usually occurs after a plurality of sets of TCP packets have been sent to the CMTS and verified by the CMTS with ACK or NACK messages being reporting/sent to the wireless base station.

In sub-step 3144, the wireless base station determines to update and/or adjust the ACK/NACK verification frequency percentage of TCP data packets of each subsequent set of TCP data packets of the first TCP session to be verified by the CMTS based on an amount of uplink data congestion at the wireless base station for the first TCP session.

In sub-step 3146, the wireless base station determines the amount of uplink data congestion at the wireless base station through monitoring of the wireless base station available uplink buffer capacity for the first TCP session (e.g., monitoring the status of the first wireless base station uplink data buffer being used for storing uplink sensor data received from sensors to which the wireless base station is providing services).

In sub-step 3148, the wireless base station adjusts and/or updates the percentage of TCP data packets per total number of TCP data packets in a set of TCP data packets to be verified by the CMTS based on determining through monitoring that the amount of available uplink data buffer capacity for the first TCP session has fallen below a first threshold value or the amount of available uplink buffer capacity for the first TCP session has exceeded a second threshold value. The first threshold value is less than the second threshold value. In some embodiments, sub-step 3148 includes one or more sub-steps 3150 and 3152. In sub-step 3150, the wireless base station increases the percentage of TCP data packets of a set of TCP data packets for the first TCP session which are to be verified when the amount of available uplink data buffer capacity for the first TCP session at the wireless base station exceeds the second threshold value. In sub-step 3152, the wireless base station decrease the percentage of TCP data packets of a set of TCP data packets for the first TCP session which are to be verified when the amount of available uplink data buffer capacity for the first TCP session at the wireless base station falls below the first threshold value. Operation proceeds from step 3142 via connection node J 3154 to step 3156 shown on FIG. 3J.

In step 3156, the wireless base station sends updated and/or adjusted ACK/NACK verification frequency information/instructions to the CMTS. The updated and/or adjusted ACK/NACK verification frequency information/instructions include the updated and/or adjusted percentage of TCP data packets of each subsequent set of TCP data packets of the first TCP session to be verified by the CMTS. Operation proceeds from step 3156 to step 3158.

In step 3158, the CMTS receives the updated and/or adjusted ACK/NACK verification information/instructions. Operation proceeds from step 3158 via connection node K 3160 to step 3162 shown on FIG. 3K.

In step 3162, the CMTS dynamically changes the ACK/NACK verification frequency percentage for one or more of the established TCP sessions. In some embodiments, the CMTS dynamically changes the ACK/NACK verification frequency percentage for subsequent sets of TCP data packets received from the cable modem which are part of the first TCP session. In some embodiments, step 3162 includes one or more sub-steps 3164, 3166, 3168, and 3174.

In sub-step 3164, the CMTS dynamically changes the ACK/NACK verification frequency percentage at the CMTS in response to receiving updated verification frequency information/instructions, e.g., an updated ACK/NACK verification frequency percentage for the first TCP session from the wireless base station.

In sub-step 3166, the CMTS dynamically changes the percentage of received TCP data packets of a subsequently received set of TCP data packets to be verified at the CMTS for the first TCP session in response to receiving updated ACK/NACK verification frequency information/instructions for the first TCP session from the wireless base station.

In sub-step 3168, the CMTS dynamically changes the ACK/NACK verification frequency percentage for an established TCP session (e.g., the first TCP session) at the CMTS based on a first threshold value. In some embodiments, sub-step 3168 includes one or more sub-steps 3170 and 3172. In sub-step 3170, the CMTS reduces the ACK/NACK verification frequency percentage at the CMTS when the CMTS takes on average a first amount of time to process the percentage of TCP data packets of each set of recurring data packets received during a first time period, said first amount of time being greater than the first threshold value. The first threshold value being a maximum processing time threshold value. In sub-step 3172, the CMTS reduces the ACK/NACK verification frequency percentage at the CMTS for an established TCP session when a verification failure percentage falls below the first threshold value. The first threshold value being a failure verification threshold value.

In sub-step 3174, the CMTS dynamically changes the percentage of received TCP data packets of a received set of TCP data packets to be verified at the CMTS for the first TCP session from a first percentage to a second percentage in response to receiving an ACK/NACK verification frequency update message from the wireless base station. The ACK/NACK verification frequency update message including an updated or new percentage of the total number of TCP data packets from each additional set of received TCP data packets of the first TCP session to be verified by the CMTS and the total number of TCP data packets to be included in each additional set of TCP data packets for the first TCP session. Operation proceeds from step 3162 via connection node L 3176 to step 3178 shown on FIG. 3L.

In step 3178, the CMTS receives a second set of TCP data packets via the first TCP session from the wireless base station via the cable modem subsequent to dynamically changing the percentage of received TCP data packets of a received set of TCP data packets to be verified at the CMTS for the first TCP session. Operation proceeds from step 3178 to step 3180.

In step 3180, the CMTS determines the number of TCP data packets to be included in a second subset of TCP data packets of the second set of TCP data packets of the first TCP session based on the updated ACK/NACK verification frequency information/instructions received from the wireless base station by the CMTS. Operation proceeds from step 3180 to step 3182.

In step 3182. the CMTS performs a verification test on the second subset of TCP data packets of the received second set of TCP data packets of the first TCP session. The second subset of TCP data packets of the received second set of TCP data packets of the first TCP session making up a percentage of the second set of TCP data packets equal to the new/updated verification percentage for the first TCP session to which the CMTS dynamically changed (e.g., the determined number of TCP data packets to be included in the second subset of TCP data packets). Operation proceeds from step 3182 to step 3184.

In step 3184, the CMTS makes a determination as to whether to send an ACK message or NACK message to the wireless base station for the entire second set of TCP data packets received at the CMTS based on the results of the verification test performed on the second subset of TCP data packets of the second set to TCP data packets of the first TCP session. Step 3184 includes sub-steps 3186 and 3188. In sub-step 3186, the CMTS makes the determination to send an ACK message when the second subset of TCP data packets of the second set of TCP data packets of the first TCP session pass the verification test. Operation proceeds from sub-step 3186 to step 3190. In sub-step 3188, the CMTS makes a determination to send a NACK message when the second subset of TCP data packets of the second set of TCP data packets of the first TCP session does not pass the verification test. Operation proceeds from step 3188 to step 3192.

In step 3190, the CMTS sends an ACK message from the CMTS to the wireless base via the cable modem when a determination is made that the second subset of the TCP data packets of the second set of TCP data packets of the first TCP session was corrected received. Operation proceeds from step 3190 to step 3194.

In step 3192, the CMTS sends a NACK message from the CMTS to the wireless base via the cable modem when a determination is made that the second subset of the TCP data packets of the second set of TCP data packets of the first TCP session was not corrected received. Operation proceeds from step 3192 to step 3194.

In step 3194, the process of sending uplink data for each of the TCP sessions and dynamically updating ACK/NACK reporting frequency and/or verification frequency for the TCP sessions continues.

While the first and second TCP session have been discussed, the steps are also applicable to the other TCP session and may be, and in some embodiments, are implemented in connection with other established TCP sessions. In some embodiments, the TCP session is established prior to the wireless base station determining and/or the cable modem creating uplink buffers for the storage of the uplink data for the TCP session and/or the wireless base station determining ACK/NACK reporting frequency and/or ACK/NACK verification frequency information/instructions for the TCP session.

Figure 4:
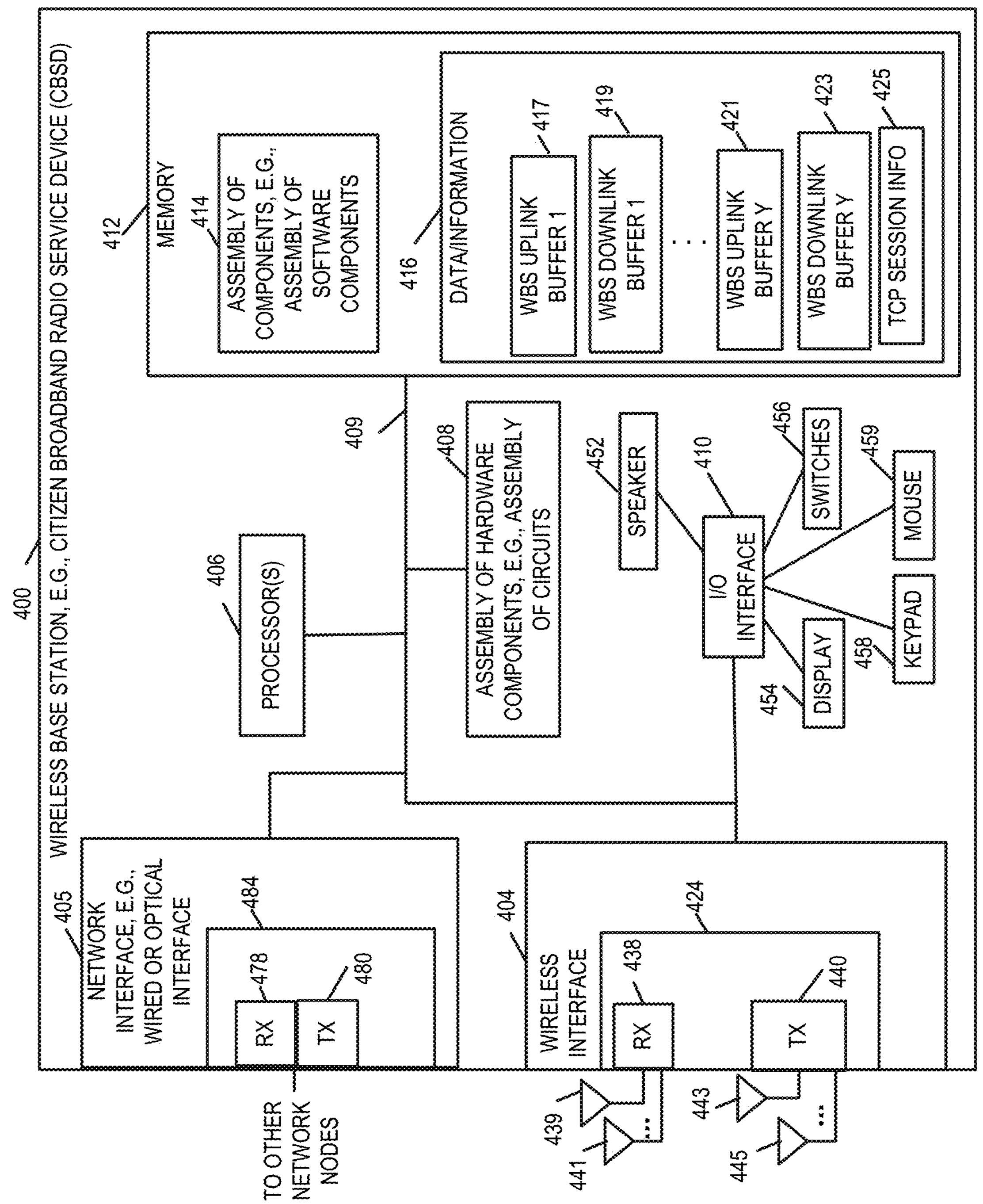
FIG. 4 illustrates details of an exemplary wireless base station (e.g., Citizens Broadband Radio Service Device (CBSD)) in accordance with one embodiment of the present invention.

FIG. 4 is a drawing of an exemplary wireless base station (WBS) (e.g., Citizens Broadband Radio Service Device (CBSD), LTE base station, 4G base station, 5G base station) 400 in accordance with an exemplary embodiment. The wireless base station device (e.g., CBSD device) 400. In some embodiments, the wireless base station (e.g., CBSD device) 400 also includes the capabilities of a CBSD as defined by the Federal Communications Commission's Rules with Regard to Commercial Operations in the 3550-3650 MHz Band. Exemplary wireless base station (e.g., CBSD device) 400 includes a wireless interface 404, a network interface 405, e.g., a wired or optical interface, processor(s) 406 (one or more processors), e.g., a CPU, an assembly of hardware components 408, e.g., an assembly of circuits, and I/O interface 410 and memory 412 coupled together via a bus 409 over which the various elements may interchange data and information. Wireless base station 400 further includes a speaker 452, a display 454, switches 456, keypad 458 and mouse 459 coupled to I/O interface 410, via which the various I/O devices (452, 454, 456, 458, 459) may communicate with other elements (404, 405, 406, 408, 412) of the wireless base station 400. Network interface 405 includes a receiver 478 and a transmitter 480. In some embodiments, receiver 478 and transmitter 480 are part of a transceiver 484. Wireless interface 404 includes a wireless receiver 438 and a wireless transmitter 440. In some embodiments, receiver 438 and transmitter 440 are part of a transceiver 442. In various embodiments, wireless interface 404 includes a plurality of wireless receivers and a plurality of wireless transmitters. Wireless receiver 438 is coupled to a plurality of receive antennas (receive antenna 1 439, . . . , receive antenna M 441), via which wireless base station 400 can receive wireless signals from other wireless communications devices including a second wireless communications device, e.g., a UE device. Wireless transmitter 440 is coupled to a plurality of wireless transmit antennas (transmit antenna 1 443, . . . , transmit antenna N 445) via which the wireless base station 400 can transmit signals to other wireless communications devices including a second wireless communications device, e.g., a UE device. Memory 412 includes an assembly of component 414, e.g., an assembly of software components, and data/information 416. Data/information 416 includes a plurality of wireless base station uplink and downlink buffers (wireless base station uplink buffer 1 417 and wireless base station downlink buffer 1 419, . . . , wireless base station uplink buffer Y 421, wireless base station downlink buffer Y 423) and TCP session information 425. The TCP session information includes information about each TCP session including the type of data the session is being used for, the size of the cable modem uplink buffer being used for storing uplink TCP data messages for the TCP session, size of TCP data packets being used for the TCP session, the information and instructions provided to the cable modem (e.g., uplink buffer size to be used for uplink TCP packets of the session, information and instructions sent to the CMTS for the TCP session (type of data, type of ACK/NACK reporting, frequency of ACK/NACK reporting, type of packet verification to be performed on received TCP packets of the session, percentage of packets of a set or number of packets sent on which verification tests are to be performed, threshold values being used to adjust uplink buffer sizes and percentage of packets of a set or number of packets sent on which verification tests are to be performed. In some embodiments, the wireless base stations discussed in the Figures and/or in connection with the embodiments of the present invention described are implemented in accordance with wireless base station 400. For example, WBS 1 (e.g., CBSD 1) 102 and/or WBS 2 (e.g., CBSD 2) 112 of system 100, may be, and in some embodiments are, implemented in accordance with wireless base station 400.

Figure 5:
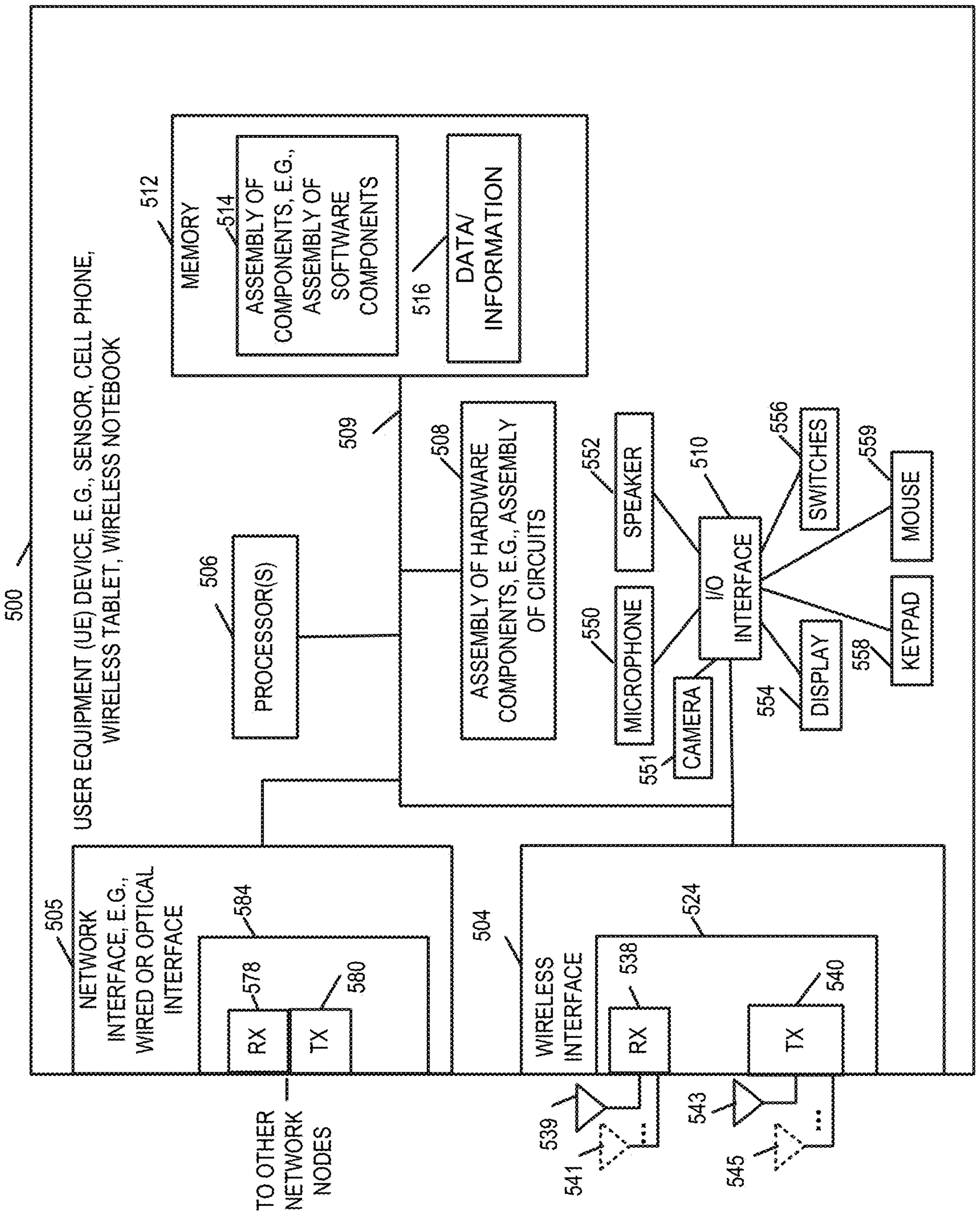
FIG. 5 illustrates details of an exemplary User Equipment (UE) device in accordance with one embodiment of the present invention.

FIG. 5 is a drawing of an exemplary user equipment (UE) device 500 in accordance with an exemplary embodiment. UE device 500 is, e.g., a mobile device such as a cell phone, a smart phone, wireless tablet or wireless notebook. UE device 500, in some embodiments, includes CBRS, 5G, Long Term Evolution (LTE), e.g., 4G LTE, mobile device capabilities. Exemplary UE device 500 includes a wireless interface 504, a network interface 505, a processor(s) 506, e.g., a CPU, an assembly of hardware components 508, e.g., an assembly of circuits, and I/O interface 510 and memory 512 coupled together via a bus 509 over which the various elements may interchange data and information. UE device 500 further includes a microphone 550, camera 551, speaker 552, a display 554, e.g., a touch screen display, switches 556, keypad 558 and mouse 559 coupled to I/O interface 510, via which the various I/O devices (550, 551, 552, 554, 556, 558, 559) may communicate with other elements (504, 505, 506, 508, 512) of the UE device. Network interface 505 includes a receiver 578 and a transmitter 580. In some embodiments, receiver 578 and transmitter 580 are part of a transceiver 584. Wireless interface 504 includes a wireless receiver 538 and a wireless transmitter 540. In some embodiments, receiver 538 and transmitter 540 are part of a transceiver 524. In various embodiments, wireless interface 504 includes a plurality of wireless receivers and a plurality of wireless transmitters. Wireless receiver 538 is coupled to one or more receive antennas (receive antenna 1 539, . . . , receive antenna M 541), via which UE device 500 can receive wireless signals from other wireless communications devices including, e.g., a wireless base station such as wireless base station 400. Wireless transmitter 540 is coupled to one or more wireless transmit antennas (transmit antenna 1 543, . . . , transmit antenna N 545) via which the UE device 500 can transmit signals to other wireless communications device including a first wireless communications device, e.g., a wireless base station 400. Memory 512 includes an assembly of components 514, e.g., an assembly of software components, and data/information 516. The user equipment devices illustrated in FIG. 1 may be, and in some embodiments are, implemented in accordance with user equipment device 500.

Figure 6:
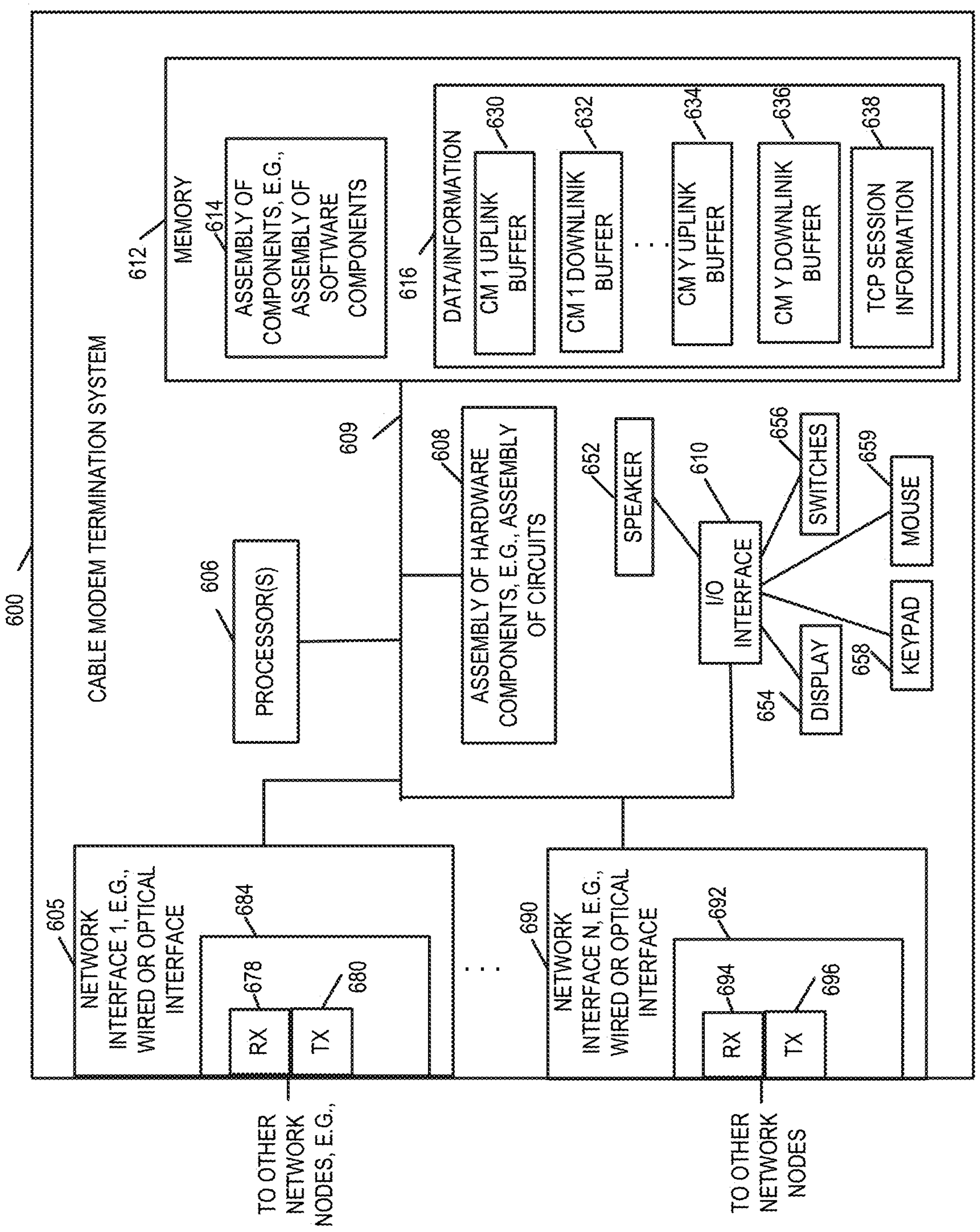
FIG. 6 illustrates details of an exemplary cable modem termination system in accordance with one embodiment of the present invention.

FIG. 6 is a drawing of an exemplary cable modem termination system in accordance with an exemplary embodiment. The cable modem termination system in some embodiments is implemented in accordance with DOCSIS standards. The cable modem termination system 600 includes a plurality of network interfaces 605, . . . , 690, e.g., a wired or optical interface, a processor(s) 606 (e.g., one or more processors), e.g., a CPU, an assembly of hardware components 608, e.g., an assembly of circuits, and I/O interface 610 and memory 612 coupled together via a bus 609 over which the various elements may interchange data and information. The computing device 600 further includes a speaker 652, a display 654, switches 656, keypad 658 and mouse 659 coupled to I/O interface 610, via which the various I/O devices (652, 654, 656, 658, 659) may communicate with other elements (605, . . . , 690, 606, 608, 612) of the cable modem termination system 600. Network interface 605 includes a receiver 678 and a transmitter 680. The network interface 605 is typically used to communicate with other devices, e.g., cable modems, CMTS power management device, other devices in the network core. In some embodiments, receiver 678 and transmitter 680 are part of a transceiver 684. Memory 612 includes an assembly of component 614, e.g., an assembly of software components, and data/information 616. Data/information 616 includes, among other things, uplink and downlink buffers for each cable modem to which it is connected. In this example, it includes cable modem termination system cable modem (CM) 1 uplink buffer 630, cable modem termination system CM 1 downlink buffer 632, . . . , cable modem termination system CM Y uplink buffer 634, and cable modem termination system CM Y downlink buffer 636, and TCP session information 238. The TCP session information includes information and instructions for each TCP session including the wireless base station with which the TCP session is established, instructions and information received from the wireless base station regarding the processing of uplink data packets, the type of ACK/NACK reporting to be provided, the type of packet verification testing to be performed, the percentage of TCP data packets of a set or number of data received to be verified as correctly received, thresholding values to determine if a request to change ACK/NACK reporting frequency and % of packets of a received set or number of packets to be verified. In some embodiments, cable modem termination systems disclosed in the figures and/or discussed in connection with the various embodiments of the invention are implemented in accordance with cable modem termination system 600. For example, cable modem termination system 1 122 and cable modem termination system 2 124 of system 100 of FIG. 1 are implemented in accordance with cable modem termination system 600.

Figure 7:
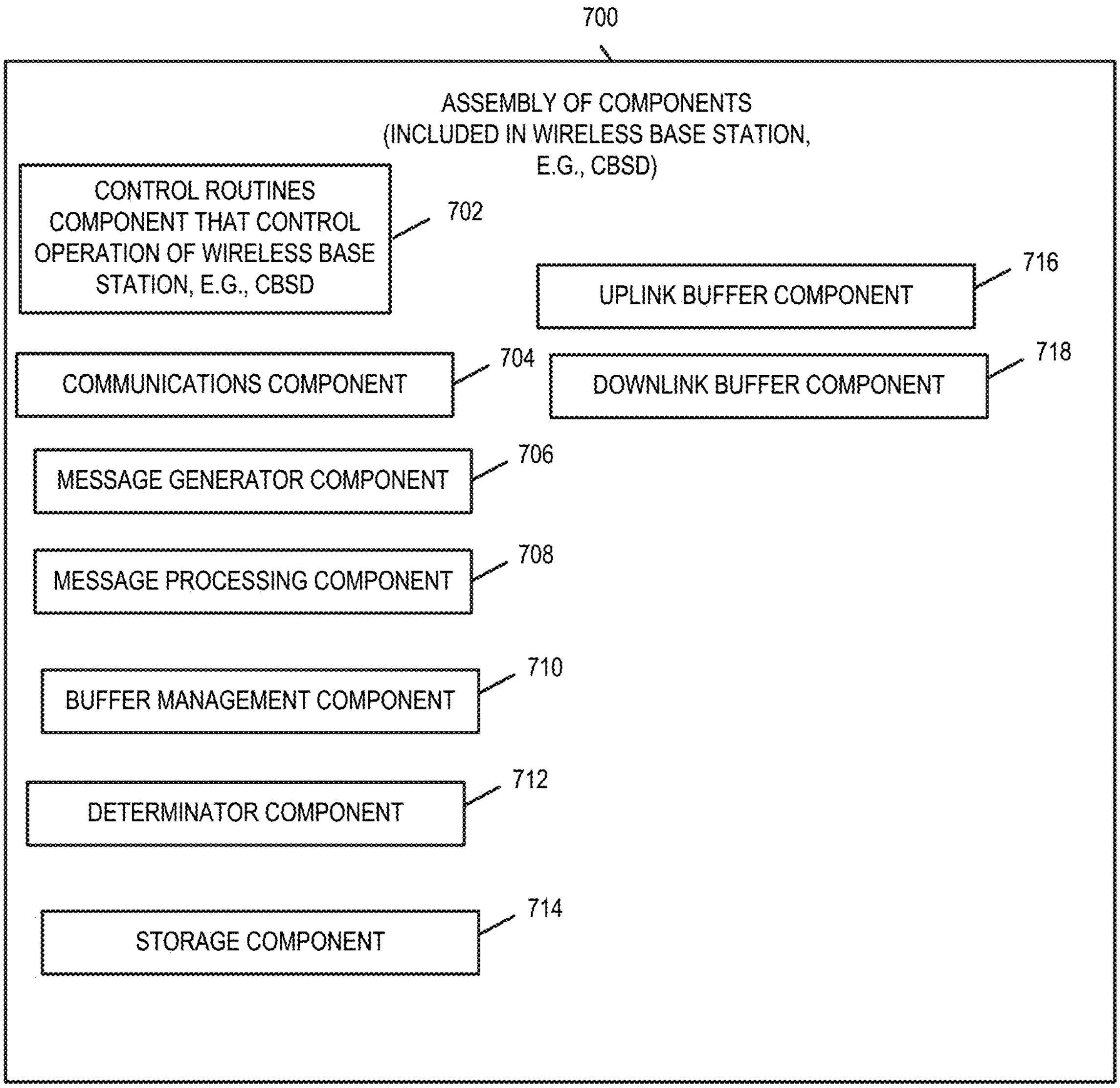
FIG. 7 illustrates an exemplary assembly of components for a wireless base station (e.g., CBSD) in accordance with an embodiment of the present invention.

FIG. 7 is a drawing of an exemplary assembly of components 700 which may be included in an exemplary wireless base station (e.g., exemplary wireless base station 400 of FIG. 4), in accordance with an exemplary embodiment. The components in the assembly of components 700 can, and in some embodiments are, implemented fully in hardware within a processor, e.g., processor 406, e.g., as individual circuits. The components in the assembly of components 700 can, and in some embodiments are, implemented fully in hardware within the assembly of hardware components 408, e.g., as individual circuits corresponding to the different components. In other embodiments some of the components are implemented, e.g., as circuits, within processor 406 with other components being implemented, e.g., as circuits within assembly of components 408, external to and coupled to the processor 406. As should be appreciated the level of integration of components on the processor and/or with some components being external to the processor may be one of design choice. Alternatively, rather than being implemented as circuits, all or some of the components may be implemented in software and stored in the memory 412 of the wireless base station 400, with the components controlling operation of wireless base station device 400 to implement the functions corresponding to the components when the components are executed by a processor e.g., processor 406. In some such embodiments, the assembly of components 700 is included in the memory 412 as assembly of software components 414. In still other embodiments, various components in assembly of components 700 are implemented as a combination of hardware and software, e.g., with another circuit external to the processor providing input to the processor which then under software control operates to perform a portion of a component's function.

When implemented in software the components include code, which when executed by a processor, e.g., processor 406, configure the processor to implement the function corresponding to the component. In embodiments where the assembly of components 700 is stored in the memory 412, the memory 412 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 7 control and/or configure the wireless base station 400 or elements therein such as the processor 406, to perform the functions of corresponding steps illustrated and/or described in the method of one or more of the flowcharts, signaling diagrams and/or described with respect to any of the Figures. Thus the assembly of components 700 includes various components that perform functions of corresponding one or more described and/or illustrated steps of an exemplary method.

Assembly of components 700 includes a control routines component 702, a communications component 704, a message generator component 706, a message processing component 708, a buffer management component 710, a determinator component 712, a storage component 714, an uplink buffer component 716, and a downlink buffer component 718.

The control routines component 702 is configured to control operation of the wireless base station (e.g., CBSD). The communication component 704 is configured to handle communications, e.g., transmission and reception of messages, and protocol signaling for the wireless base station (e.g., CBSD). The message generator component 706 is configured to generate messages for transmission to other devices. The message processing component 708 is configured to process messages received from other devices, e.g., messages from user equipment devices, messages from a cable modem, messages from an Spectrum Access System, and policy control function devices.

The buffer management component 710 is configured to implement all aspects related to buffer management including creation and management of uplink data buffer(s) for storing data from user equipment devices to be transmitted to the cable modem, creation of downlink buffer(s) for storing data received from the cable modem, providing wireless base station buffer information to the cable modem including uplink and downlink buffer size and fill rates, uplink and downlink buffer sizes in terms of time to receive and store data to fully occupy the uplink buffer and the downlink buffer, type of ACK/NACK verification and frequency to be used by a CMTS in connection with TCP session for which data is being buffered.

The determinator component 712 is configured to make determinations and decisions for the wireless base station including for example: buffer size as an amount of time for the buffer to become full, buffer size as number of bytes of storage capacity, buffer fill rate, and when to send data to the cable modem and when not to send data to the cable modem, e.g., send data after receiving a send data message and do not send data after receiving a do not send data message, when to store data received from user equipment devices in the uplink buffer as opposed to sending the data immediately to the cable modem (e.g., store data in the uplink buffer after receiving a do not send data message is received from the cable modem), determining ACK/NACK reporting and/or ACK/NACK verification frequency information and/or instructions to be sent to CMTS, determining dynamic changes to the ACK/NACK reporting and/or ACK/NACK verification frequency information and/or instructions to send to a CMTS, determining type of type of TCP packet tests to instruct a CMTS to perform on received TCP packets from the wireless base station, making decisions and/or determinations to adjust the percentage of TCP data packets per total number of TCP data packets in a set of TCP data to be verified by the CMTS, determining a percentage of TCP data packets from the first set of TCP data packets to be verified by the CMTS, determining amount of uplink data congestion at the wireless base station, determining type of data to be transmitted to the CMTS from the wireless base station using a particular TCP session, determining the relationship between threshold values including when a first threshold value is less than, equal to, or greater than a second threshold value/

The storage component 714 is configured to manage the storage, and retrieval of data and/or instructions to/and from memory, buffers in memory, hardware buffers and/or storage device coupled and/or connected to the wireless base station.

The uplink buffer component 716 is configured to handle uplink buffer creation and modification, e.g., increase and decrease in buffer size, management, storage and retrieval of data to the uplink buffer, flushing and/or transmittal of data from the uplink buffer to the cable modem, provide notifications when thresholds have been exceeded with respect to buffer storage, provide notifications when the uplink buffer is full, determine the uplink buffer size, increase uplink buffer size, determine uplink buffer fill rate, determine amount of time it takes for the uplink buffer to become full, respond to queries and/or requests from the cable modem to provide uplink buffer information, provide confirmation that cable modem instructions have been carried out, such as for example increasing a buffer size, performing operations to implement instructions received from a cable modem. In some embodiments, uplink buffer component 716 is a sub-component of buffer management component 710 or storage component 714.

The downlink buffer component 718 is configured to handle downlink buffer creation and modification, e.g., increase and decrease in buffer size, management, storage and retrieval of data to the downlink buffer, increase downlink buffer size, flushing and/or transmittal of data from the downlink buffer to the user equipment devices, provide notifications when thresholds have been exceeded with respect to buffer storage, provide notifications when the downlink buffer is full, determine the downlink buffer size, determine downlink buffer fill rate, determine amount of time it takes for the downlink buffer to become full, respond to queries and/or requests from the cable modem to provide downlink buffer information, provide confirmation that cable modem instructions have been carried out, such as for example, increasing a buffer size, performing operations to implement instructions received from a cable modem. In some embodiments, downlink buffer component 718 is a sub-component of buffer management component 710 or storage component 714.

Figure 8:
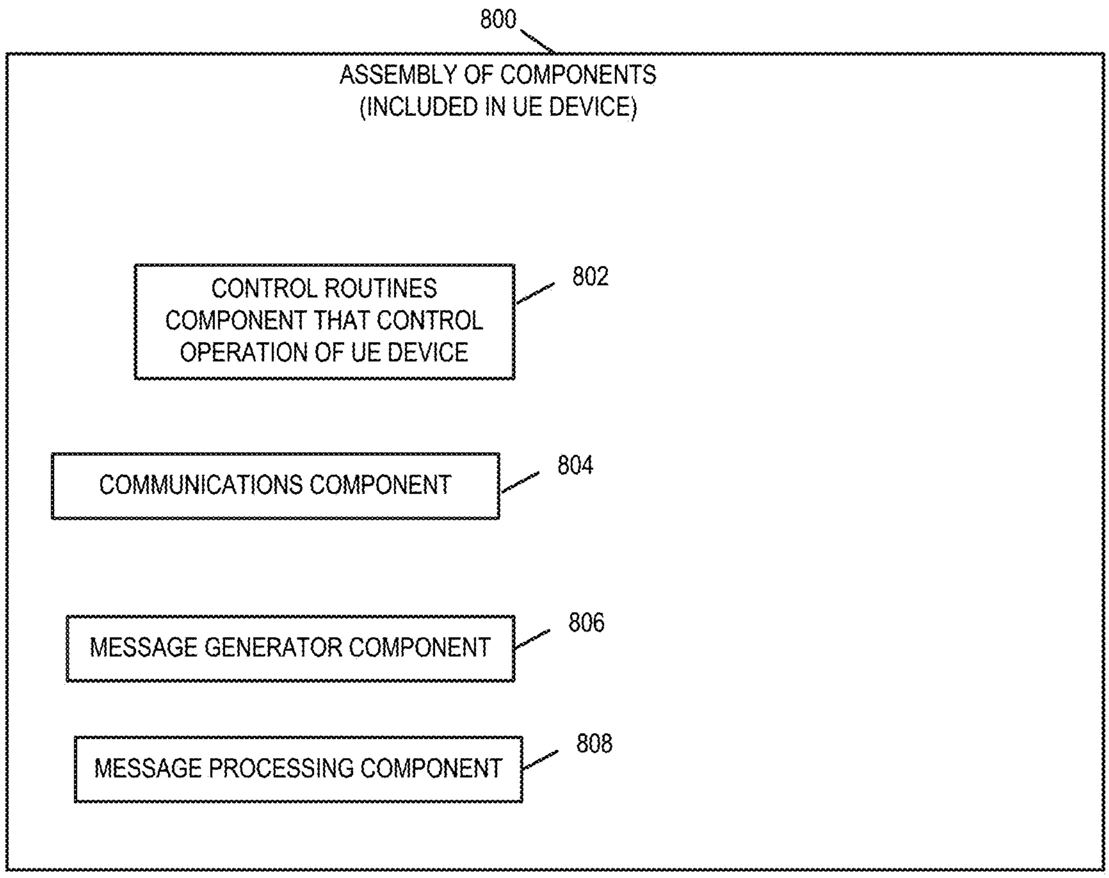
FIG. 8 illustrates an exemplary assembly of components for a user equipment device in accordance with an embodiment of the present invention.

FIG. 8 is a drawing of an exemplary assembly of components 800 which may be included in an exemplary user equipment (UE) device, e.g., UE device 500 of FIG. 5, in accordance with an exemplary embodiment. The components in the assembly of components 800 can, and in some embodiments are, implemented fully in hardware within a processor, e.g., processor 506, e.g., as individual circuits. The components in the assembly of components 800 can, and in some embodiments are, implemented fully in hardware within the assembly of hardware components 508, e.g., as individual circuits corresponding to the different components. In other embodiments some of the components are implemented, e.g., as circuits, within processor 506 with other components being implemented, e.g., as circuits within assembly of components 508, external to and coupled to the processor 506. As should be appreciated the level of integration of components on the processor and/or with some components being external to the processor may be one of design choice. Alternatively, rather than being implemented as circuits, all or some of the components may be implemented in software and stored in the memory 512 of the UE device 500, with the components controlling operation of UE device 500 to implement the functions corresponding to the components when the components are executed by a processor e.g., processor 506. In some such embodiments, the assembly of components 800 is included in the memory 512 as assembly of software components 514. In still other embodiments, various components in assembly of components 800 are implemented as a combination of hardware and software, e.g., with another circuit external to the processor providing input to the processor which then under software control operates to perform a portion of a component's function. When implemented in software the components include code, which when executed by a processor, e.g., processor 506, configure the processor to implement the function corresponding to the component. In embodiments where the assembly of components 800 is stored in the memory 512, the memory 512 is a computer program product comprising a computer readable medium comprising code, e.g., individual code for each component, for causing at least one computer, e.g., processor 506, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 8 control and/or configure the UE device 500 or elements therein such as the processor 506, to perform the functions of corresponding steps illustrated and/or described in the method of one or more of the flowcharts, signaling diagrams and/or described with respect to any of the Figures. Thus the assembly of components 800 includes various components that perform functions of corresponding one or more described and/or illustrated steps of an exemplary method.

Assembly of components 800 includes a control routines component 802, a communications component 804, a message generator component 806, a message processing component 808.

The control routines component 802 is configured to control operation of the UE. The communication component 804 is configured to handle communications, e.g., receipt and transmission of signals and provide protocol signal processing for one or protocols for the UE. The message generator component 806 is configured to generate messages for transmission to the wireless base stations (e.g., CBSD devices) such as messages including user data and/or user data requests, control messages, etc. In some embodiments, the message generator component 806 is a sub-component of the communications component 804. The message processing component 808 processes received messages, e.g., requests for information. In some embodiments, the message processing component is a sub-component of the communications component 808.

Figure 9:
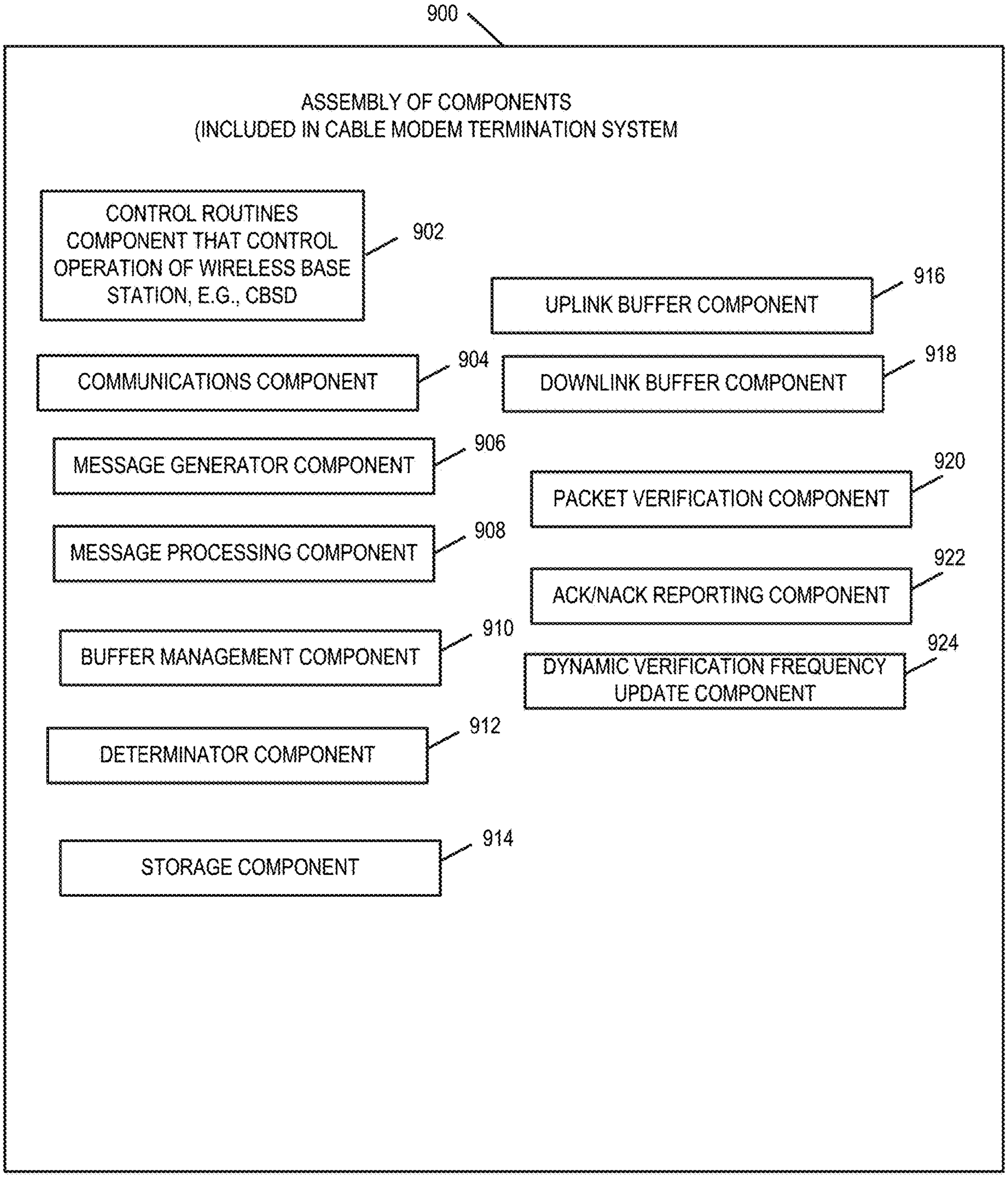
FIG. 9 illustrates an exemplary assembly of components for a cable modem termination system in accordance with an embodiment of the present invention.

FIG. 9 is a drawing of an exemplary assembly of components 900 which may be included in a cable modem termination system, e.g., cable modem termination system 600 of FIG. 6, in accordance with an exemplary embodiment. The components in the assembly of components 900 can, and in some embodiments are, implemented fully in hardware within a processor or one or more processors, e.g., processor(s) 606, e.g., as individual circuits. The components in the assembly of components 900 can, and in some embodiments are, implemented fully in hardware within the assembly of hardware components 608, e.g., as individual circuits corresponding to the different components. In other embodiments some of the components are implemented, e.g., as circuits, within processor(s) 606 with other components being implemented, e.g., as circuits within assembly of components 608, external to and coupled to the processor(s) 606. As should be appreciated the level of integration of components on the processor and/or with some components being external to the processor may be one of design choice. Alternatively, rather than being implemented as circuits, all or some of the components may be implemented in software and stored in the memory 612 of the cable modem termination system 600, with the components controlling operation of the cable modem termination system 600 to implement the functions corresponding to the components when the components are executed by a processor e.g., processor 606. In some such embodiments, the assembly of components 900 is included in the memory 612 as assembly of software components 614. In still other embodiments, various components in assembly of components 900 are implemented as a combination of hardware and software, e.g., with another circuit external to the processor providing input to the processor which then under software control operates to perform a portion of a component's function.

When implemented in software the components include code, which when executed by a processor or one or more processors, e.g., processor(s) 606, configure the processor(s) to implement the function corresponding to the component. In embodiments where the assembly of components 900 is stored in the memory 612, the memory 612 is a computer program product comprising a computer readable medium comprising code, e.g., individual code for each component, for causing at least one computer, e.g., processor 606, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 9 control and/or configure the cable modem termination system 600 or elements therein such as the processor(s) 606, to perform the functions of corresponding steps illustrated and/or described in the method of one or more of the flowcharts, signaling diagrams and/or described with respect to any of the Figures. Thus the assembly of components 900 includes various components that perform functions of corresponding one or more described and/or illustrated steps of an exemplary method.

Assembly of components 900 includes a control routines component 902, a communications component 904, a message generator component 906, a message processing component 908, a buffer management component 910, a determinator component 912, a storage component 914, an uplink buffer component 916, a downlink buffer component 918, a packet verification component 920, an ACK/NACK reporting component 922, and a dynamic verification frequency update component 924

The control routines component 902 is configured to control operation of the cable modem termination system. The communication component 904 is configured to handle communications, e.g., transmission and reception of messages, and protocol signaling for the cable modem termination system. The message generator component 906 is configured to generate messages for transmission to other devices. The message processing component 908 is configured to process messages received from other devices, e.g., messages from cable modems, messages from wireless base stations, messages from the core network, and messages from CMTS power management devices.

The buffer management component 910 is configured to implement all aspects related to buffer management including creation and management of uplink data buffer(s) for storing data from cable modem devices to be transmitted to the core network devices, creation of downlink buffer(s) for storing data received from devices, e.g., core network devices for transmission to the cable modem, providing cable modem termination system buffer information to cable modems including uplink and downlink buffer size and fill rates, uplink and downlink buffer sizes in terms of time to receive and store data to fully occupy the uplink buffer and the downlink buffer corresponding to a particular cable modem.

The determinator component 912 is configured to make determinations and decisions for the cable modem termination system including for example: buffer size based on information/instructions provided and/or received from the wireless base station, determinations making dynamic adjustments/updates to the verification frequency percentage for a session, the determination of which and how many received TCP packets of a set of TCP packets received via a TCP session are to be verified, the determination of whether to generate and send an ACK or NACK message in response to received TCP data packets or a set of received TCP data packets, determination as to whether a TCP data packet has been correctly received by the CMTS, a determination as to whether a set of TCP data packets has been correctly received by the CMTS, a determination of whether a TCP checksum test has been passed or failed, a determination of after how many received TCP data packets for a TCP session an ACK or NACK message is to be reported to the sending device, e.g., wireless base station.

The storage component 914 is configured to manage the storage, and retrieval of data and/or instructions to/and from memory, buffers in memory, hardware buffers and/or storage device coupled and/or connected to the cable modem termination system.

The uplink buffer component 916 is configured to handle uplink buffer creation and modification, e.g., increases and decreases in buffer size, management, storage and retrieval of data to the uplink buffer, flushing and/or transmittal of data from the uplink buffer to the other devices, e.g., devices in the core network, provide notifications when thresholds have been exceeded with respect to buffer storage, provide notifications when the uplink buffer is full, determine the uplink buffer size, increase uplink buffer size, determine uplink buffer fill rate, determine amount of time it takes for the uplink buffer to become full, respond to queries and/or requests from the cable modem to provide uplink buffer information, implement instructions from the cable modem or wireless base station, e.g., to increase the buffer size, provide confirmations that instructions received regarding changes to the buffer have been implemented. In some embodiments, uplink buffer component 916 is a sub-component of buffer management component 910 or storage component 914.

The downlink buffer component 918 is configured to handle downlink buffer creation and modification, e.g., increases and/or decreases to buffer size, management, storage and retrieval of data to the downlink buffer, flushing and/or transmittal of data from the downlink buffer to the cable modem, provide notifications when thresholds have been exceeded with respect to buffer storage, provide notifications when the downlink buffer is full, determine the downlink buffer size, determine downlink buffer fill rate, increase downlink buffer size, determine amount of time it takes for the downlink buffer to become full, respond to queries and/or requests from the cable modem to provide downlink buffer information, determine when the downlink buffer should not send data to the cable modem but should instead store the data (e.g., after receiving a do not send data message), determine when to send data/flush the downlink buffer to the cable modem (e.g., after receiving a send data message), implement instructions to modify the downlink buffer, e.g., implement instructions to increase the buffer size received from a cable modem, provide confirmations to devices that provided instructions to make modifications to the buffer that the instructions have been implemented. In some embodiments, downlink buffer component 718 is a sub-component of buffer management component 910 or storage component 914.

The packet verification component 920 performs one or more packet verification tests on received data packets (e.g., TCP data packets) and/or sets or sub-sets of received data packets (e.g., sets or sub-sets of received TCP data packets). In some embodiments, the packet verification test performed is a TCP checksum verification test. In some embodiments, the packet verification component 920 is a sub-component of communications component 904 or the message processing component 908.

The ACK/NACK reporting component 922 generates and sends ACK or NACK messages to the wireless base station based on the results of packet verification test(s) performed on a received packet, e.g., TCP data packet, and/or sets or sub-sets of received data packets, e.g., sets or sub-sets of received TCP data packets. In some embodiments, the ACK/NACK reporting component 922 is a sub-component of communications component 904 or the message processing component 908.

The dynamic verification frequency update component 924 determines when to update the verification frequency percentage used to determine the number of packets of a set of packets to sample and verify that the packets were correctly received without error. The dynamic verification frequency component also dynamically updates the verification frequency percentage of data packets of a set of received data packets for a TCP session with a wireless base station which are to be verified based on a first threshold and/or information received from the wireless base station with which the TCP session has been established. In some embodiments, the dynamic verification frequency update component 924 is a sub-component of communications component 904 or the message processing component 908.

Figure 11:
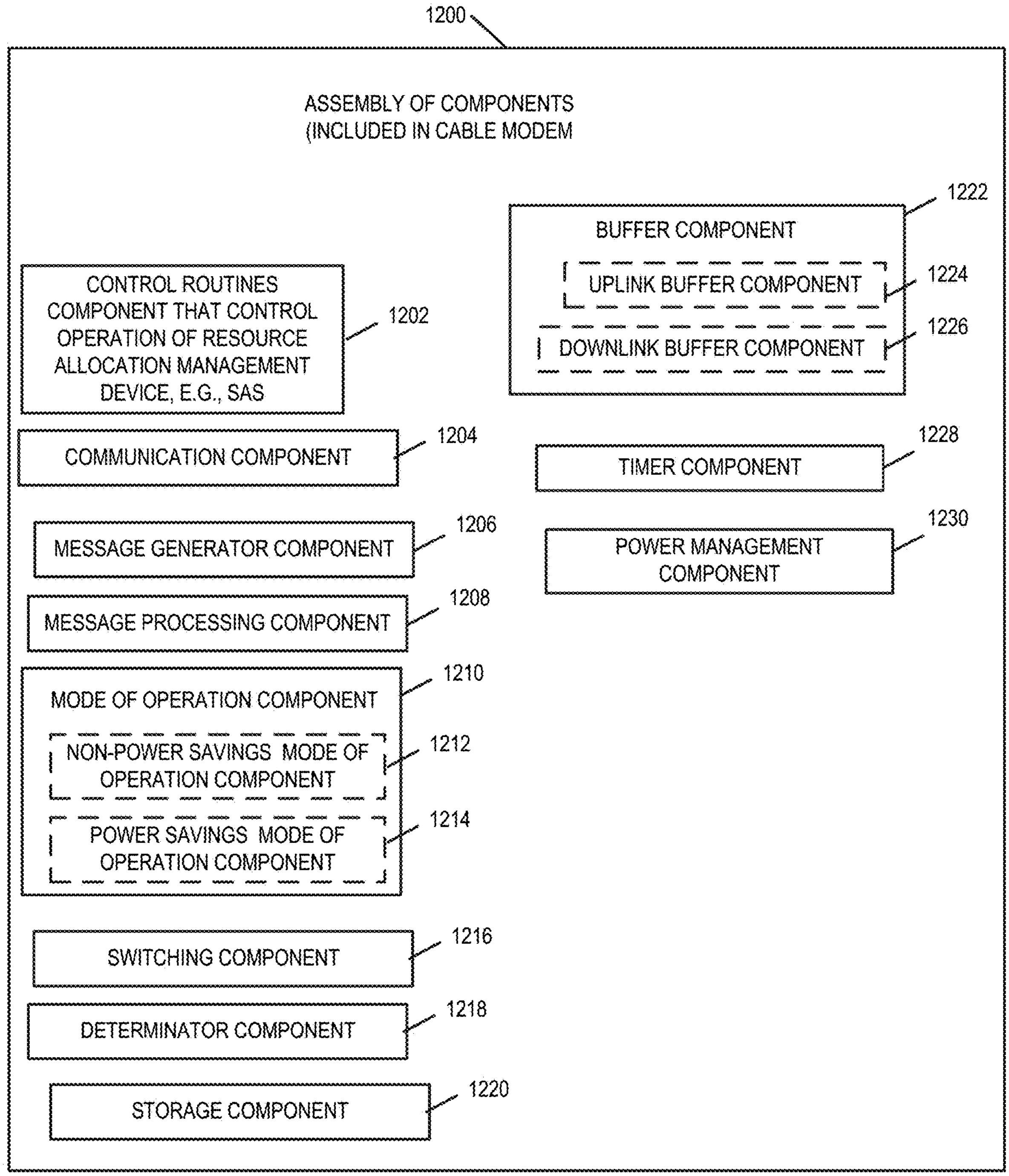
FIG. 11 illustrates details of an exemplary assembly of components for a cable modem in accordance with an embodiment of the present invention.

FIG. 11 is a drawing of an exemplary assembly of components 1200 which may be included in an exemplary cable modem (e.g., exemplary cable modem 200 of FIG. 2), in accordance with an exemplary embodiment. The components in the assembly of components 200 can, and in some embodiments are, implemented fully in hardware within a processor, e.g., processor 206, e.g., as individual circuits. The components in the assembly of components 200 can, and in some embodiments are, implemented fully in hardware within the assembly of hardware components 208, e.g., as individual circuits corresponding to the different components. In other embodiments some of the components are implemented, e.g., as circuits, within processor 206 with other components being implemented, e.g., as circuits within assembly of components 208, external to and coupled to the processor 206. As should be appreciated the level of integration of components on the processor and/or with some components being external to the processor may be one of design choice. Alternatively, rather than being implemented as circuits, all or some of the components may be implemented in software and stored in the memory 212 of the cable modem 200, with the components controlling operation of cable modem 200 to implement the functions corresponding to the components when the components are executed by a processor e.g., processor 206. In some such embodiments, the assembly of components 1200 is included in the memory 212 as assembly of software components 214. In still other embodiments, various components in assembly of components 1200 are implemented as a combination of hardware and software, e.g., with another circuit external to the processor providing input to the processor which then under software control operates to perform a portion of a component's function.

When implemented in software the components include code, which when executed by a processor, e.g., processor 206, configure the processor to implement the function corresponding to the component. In embodiments where the assembly of components 200 is stored in the memory 212, the memory 212 is a computer program product comprising a computer readable medium comprising code, e.g., individual code for each component, for causing at least one computer, e.g., processor 406, to implement the functions to which the components correspond.

Completely hardware based or completely software based components may be used. However, it should be appreciated that any combination of software and hardware, e.g., circuit implemented components may be used to implement the functions. As should be appreciated, the components illustrated in FIG. 2 control and/or configure the cable modem 200 or elements therein such as the processor 206, to perform the functions of corresponding steps illustrated and/or described in the method of one or more of the flowcharts, signaling diagrams and/or described with respect to any of the Figures. Thus the assembly of components 1200 includes various components that perform functions of corresponding one or more described and/or illustrated steps of an exemplary method.

Assembly of components 1200 includes a control routines component 1202, a communications component 1204, a message generator component 1206, a message processing component 1208, a mode of operation component 1210, a switching component 1216, a determinator component 1218, a storage component 1220, and a buffer component 1222, a timer component 1228, and a power management component 1230. In some embodiments, the mode of operation component 1210 includes one or more of the following sub-components: a non-power savings mode of operation component 1212 and a power savings mode of operation component 1214. In some embodiments, the buffer component 1222 includes one or more of the following sub-components: an uplink buffer component 1224 and a downlink buffer component 1226.

The control routines component 1202 is configured to control operation of the cable modem. The communication component 1104 is configured to handle communications, e.g., transmission and reception of messages, data packets, and protocol signaling for the cable modem. The message generator component 1206 is configured to generate messages for transmission to other devices such as for example messages indicating that data is not to be sent to the cable modem, messages indicating that data is to be sent to the data modem, messages including data packets for uplink transmission to a CMTS and messages including data packets for downlink transmission to a wireless base station, messages requesting buffer information, e.g., CMTS buffer information and wireless base station buffer information. The message processing component 1208 is configured to process messages received from other devices, e.g., messages such as messages including buffer information and/or data packets from a wireless base station, messages including buffer information and/or data packets from a cable modem termination system.

The mode of operation component 1210 is configured to control the cable mode to perform operations and steps of the methods disclosed herein while operating in the power savings mode of operation and the non-power savings mode of operation. In some embodiments, the mode of operation component 1210 is also makes determinations as to when the cable modem is to enter or exit either the power savings mode of operation or the non-power savings mode of operation. In some embodiments, the mode of operation component 1210 controls the cable modem to switch from the power savings mode of operation to the non-power savings mode of operation. In some embodiments, the mode of operation component 1210 controls the cable modem to switch from the non-power savings mode of operation to the power savings mode of operation.

In some embodiments, the mode of operation component includes a non-power savings mode of operation sub-component 1212. The non-power savings mode of operation sub-component 1212 is configured to control the cable modem to perform one or more of the various method steps described herein and/or attributed to the cable modem while it is operating in the non-power savings mode of operation including for example turning on transmitter(s) and receiver(s) which were turned off turning the power savings mode of operation, notifying the wireless base station and cable modem termination system that data should be sent to the cable modem via controlling the cable modem to transmit "Send data messages" to the cable modem termination system and the wireless base station, storing data which is received from the wireless base station in the uplink data buffer until a determination is made to send the data to CMTS (e.g., when the uplink and downlink buffer have reached a fullness threshold), storing data which is received from the CMTS in a downlink buffer until a determination is made to send the data to the wireless base station.

In some embodiments, the mode of operation component includes a power savings mode of operation sub-component 1214. The power savings mode of operation sub-component 1214 is configured to control the cable modem to perform one or more of the various method steps described herein and/or attributed to the cable modem while it is operating in the power savings mode of operation.

The switching component 1216 is configured to control the cable modem to: (i) switch from a first mode of operation to a second mode of operation, and (ii) switch from a second mode of operation to a first mode of operation. The first mode of operation may be and typically is a non-power savings mode of operation and the second mode of operation is typically a power savings mode of operation. In some embodiments, the switching component is also configured to make the determination of when the cable modem is to switch: (i) from the first mode of operation to the second mode of operation, and (ii) from the second mode of operation to the first mode of operation. In some embodiments, the switching component 1216 is a sub-component of the mode of operation component 1214.

The determinator component 1218 is configured to make determinations and decisions for the cable modem including for example: whether an amount of data in a buffer has reached or exceeded a threshold, whether the cable modem is to switch from one mode of operation to another mode of operation, whether the cable modem is to store data in its uplink or downlink buffer or transmit the uplink and downlink data, whether the cable modem is to transmit it data or continue to wait until at least one of the following occurs: (i) the amount of data in the cable modem uplink buffer reaches a first threshold value, or (ii) the amount of data in the cable modem downlink buffer reaches a second threshold value to transmit the data in uplink or downlink before transmitting data, when to store data received from wireless base station in the uplink buffer as opposed to sending the data to the CMTS; when to transmit data, when to send a message indicating data is not to be sent to the cable modem by the wireless base station, when to send a message indicating data is not to be sent to the cable modem by the cable modem termination system, when to send a message indicating data is to be sent to the cable modem from the wireless base station, when to send a message indicating data is to be sent to the cable modem from the CMTS, when to start a power savings timer, when to enter power savings mode of operation, when to enter non-power savings mode of operation, when to turn off the cable modem transmitter(s), receiver(s), and/or transceiver(s), when to turn on the cable modem transmitter(s), receiver(s), and/or transceiver(s), when to flush the uplink and downlink cable modem buffers transmitting the data in a burst to the CMTS and the wireless base station, the expiration of the first period of time, the size to create the cable modem uplink buffer, the size to create the cable modem downlink buffer.

The storage component 1220 is configured to manage the storage, and retrieval of data and/or instructions to/and from memory, buffers in memory, hardware buffers and/or storage devices coupled and/or connected to the cable modem.

The buffer t component 1222 is configured to control the cable modem to implement all aspects related to buffer management including creation and management of an uplink data buffer for storing data from wireless base station to be transmitted to the cable modem termination system, creation of downlink buffer for storing data received from the cable modem termination system, receiving wireless base station buffer information including uplink and downlink buffer size and fill rates, uplink and downlink buffer sizes in terms of time to receive and store data to fully occupy the uplink buffer and the downlink buffer of the wireless base station, receiving cable modem termination system buffer information including uplink and downlink buffer size and fill rates, uplink and downlink buffer sizes in terms of time to receive and store data to fully occupy the uplink buffer and the downlink buffer of the cable modem termination system, determination of cable modem uplink and downlink buffer sizes, determination of when the amount of data stored in the cable modem uplink buffer has reached a first threshold, determination of when the amount of data stored in the cable modem downlink buffer has reached a second threshold, determination of when the cable modem uplink buffer data is to be transmitted to the cable modem termination system, determination of when the cable modem downlink buffer data is transmitted to the wireless base station, determination of when the uplink data is to be stored in the uplink buffer, determination of when the downlink data is to be stored in the downlink buffer. In some embodiments, the buffer component 1222 is a sub-component of the storage component 1220.

In some embodiments the buffer component 1222 includes uplink buffer component 1224. The uplink buffer component 1224 is a sub-component of the buffer component 1222 and is configured to perform operations relating to the uplink buffer including uplink buffer creation and modification, e.g., increase and decrease in buffer size, management, storage and retrieval of data to the uplink buffer, flushing and/or transmittal of data from the uplink buffer to the cable modem termination system, providing notifications when thresholds have been met or exceeded with respect to buffer storage, providing notifications when the uplink buffer is full, determine the uplink buffer size, determine uplink buffer fill rate, determine amount of time it takes for the uplink buffer to become full. In some embodiments, uplink buffer component 1224 is not a sub-component of buffer component 1222 but is a separate component. In some embodiments, the uplink buffer component 1224 is a sub-component of the storage component 1220.

In some embodiments the buffer component 1222 includes downlink buffer component 1226. The downlink buffer component 1226 is a sub-component of the buffer component 1222 and is configured to perform operations relating to the downlink buffer including downlink buffer creation and modification, e.g., increase and decrease in buffer size, management, storage and retrieval of data to the downlink buffer, flushing and/or transmittal of data from the downlink buffer to the wireless base station, providing notifications when thresholds have been met or exceeded with respect to buffer storage, providing notifications when the downlink buffer is full, determine the downlink buffer size, determine downlink buffer fill rate, determine amount of time it takes for the downlink buffer to become full. In some embodiments, downlink buffer component 1226 is not a sub-component of buffer component 1222 but is a separate component. In some embodiments, the downlink buffer component 1226 is a sub-component of the storage component 1220.

The timer component is configured to implement the power savings timer operations of the cable modem as well as setting of the power savings timer, causing the cable modem to switch modes of operation at the expiration or passage of the first period of time. In some embodiments, the timer components is a sub-component of the mode of operation component 1210 or the switching component 1216.

The power component 1228 is configured to receive and power supply and to control the management of the power usage by the cable modem including for example which elements, circuits, components, transceivers, receivers and transmitters are powered on and when (e.g., cable modem transmitters and receivers are powered on during non-power savings mode of operation) and powered off and when (e.g., turning off the cable modem transmitter(s) and receiver(s) after entering power savings mode of operation). The power component 1228 is also configured to receive power from the cable modem termination system, e.g., via Power over Ethernet. The power component 1228 is also configured to provide and/or supply power to the wireless base station, e.g., via Power over Ethernet, and to ensure that power to the wireless base station is not interrupted while the cable modem is in power savings mode of operation that is the cable modem.

Figure 10A:
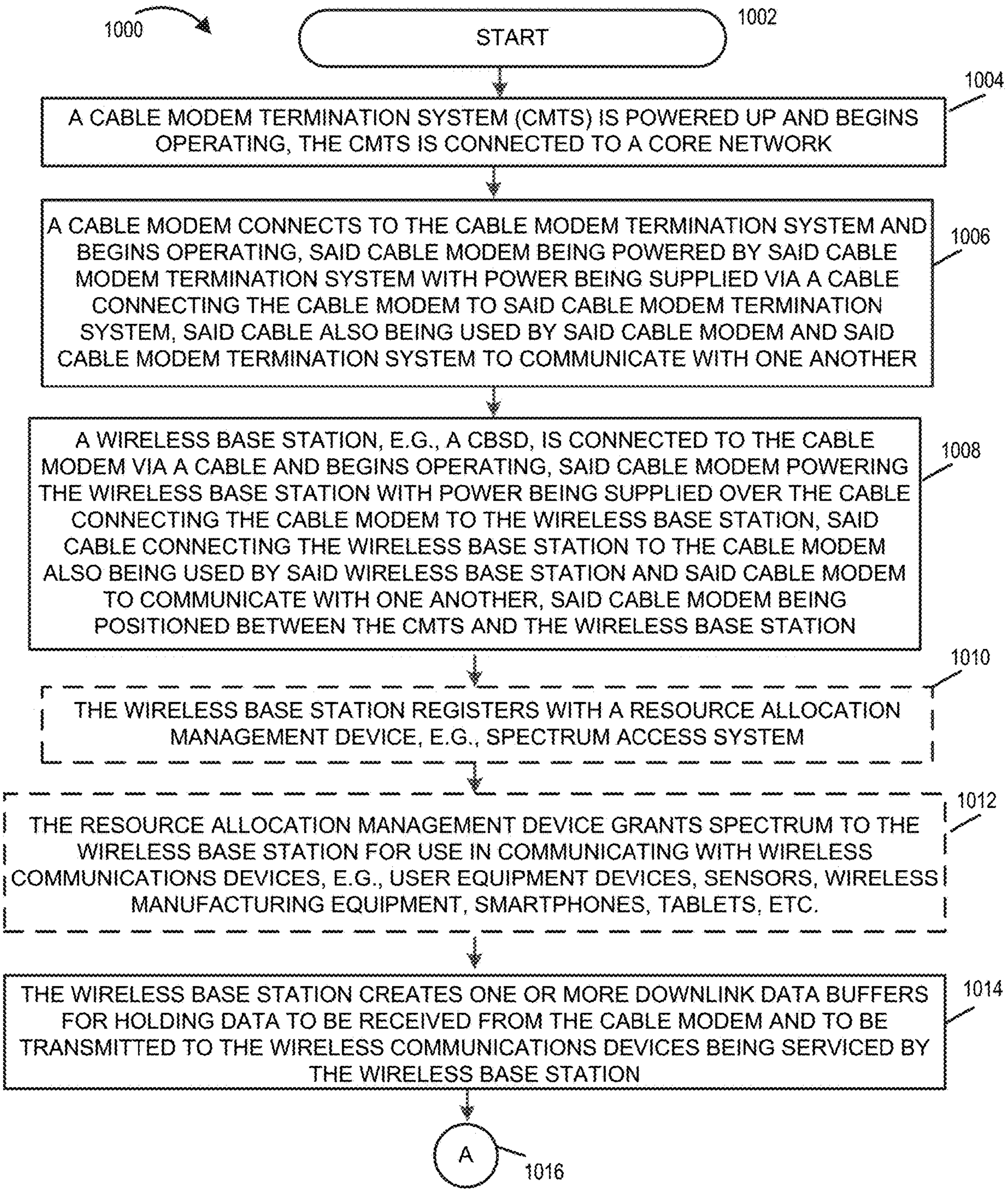
FIG. 10A illustrates the steps of the first part of an exemplary method in accordance with an embodiment of the present invention.
Figure 10B:
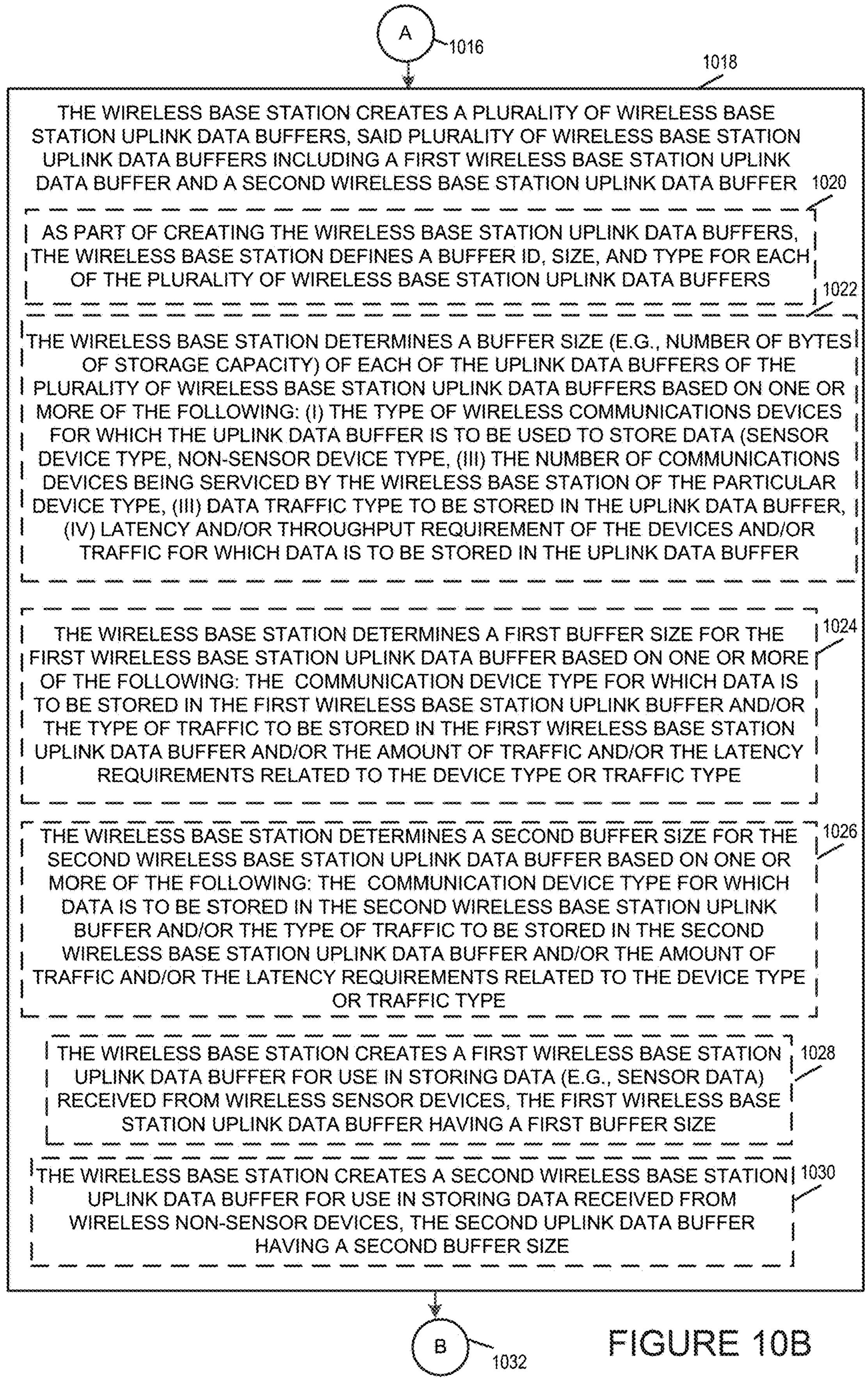
FIG. 10B illustrates the steps of the second part of an exemplary method in accordance with an embodiment of the present invention.
Figure 10C:
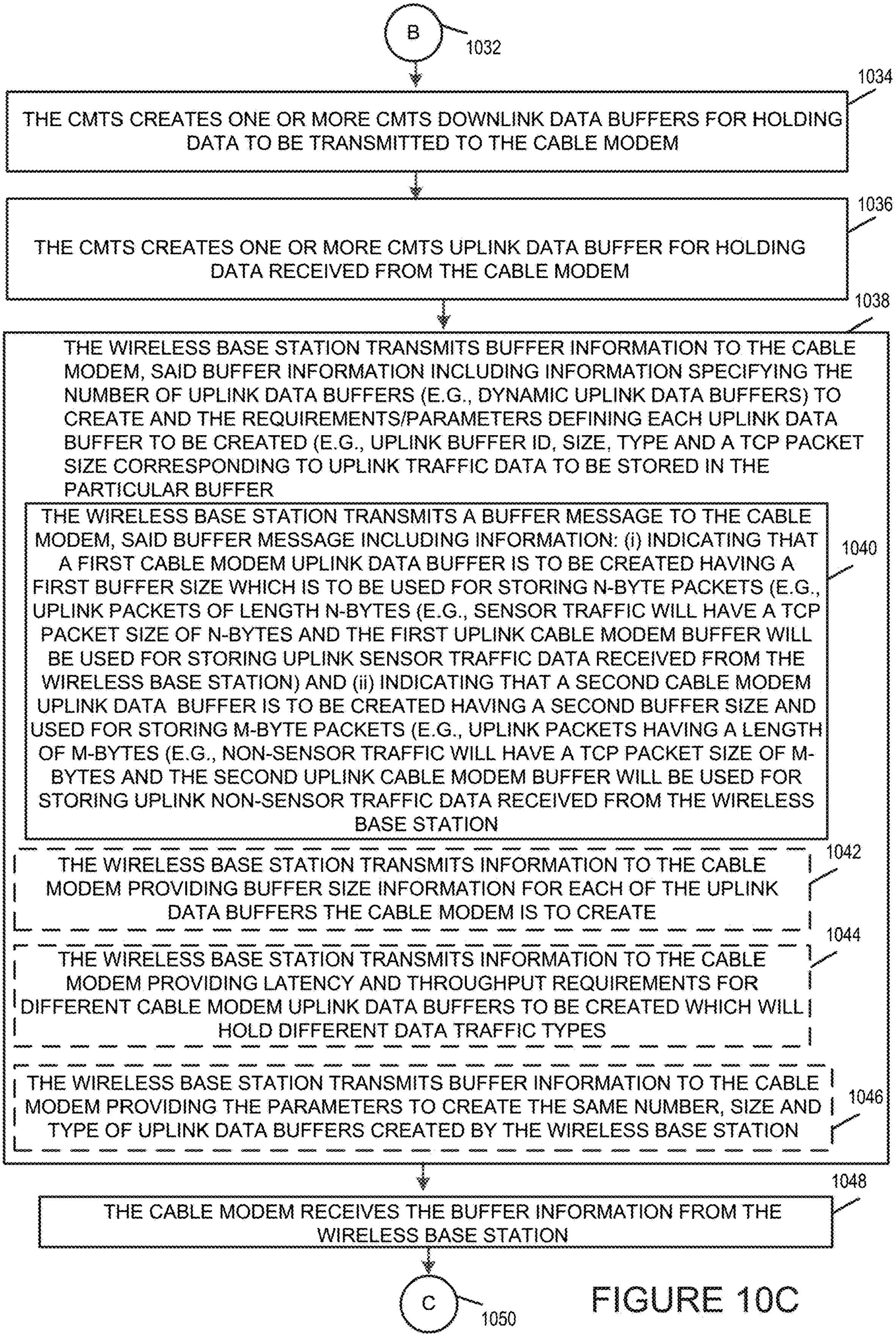
FIG. 10C illustrates the steps of the third part of an exemplary method in accordance with an embodiment of the present invention.
Figure 10D:
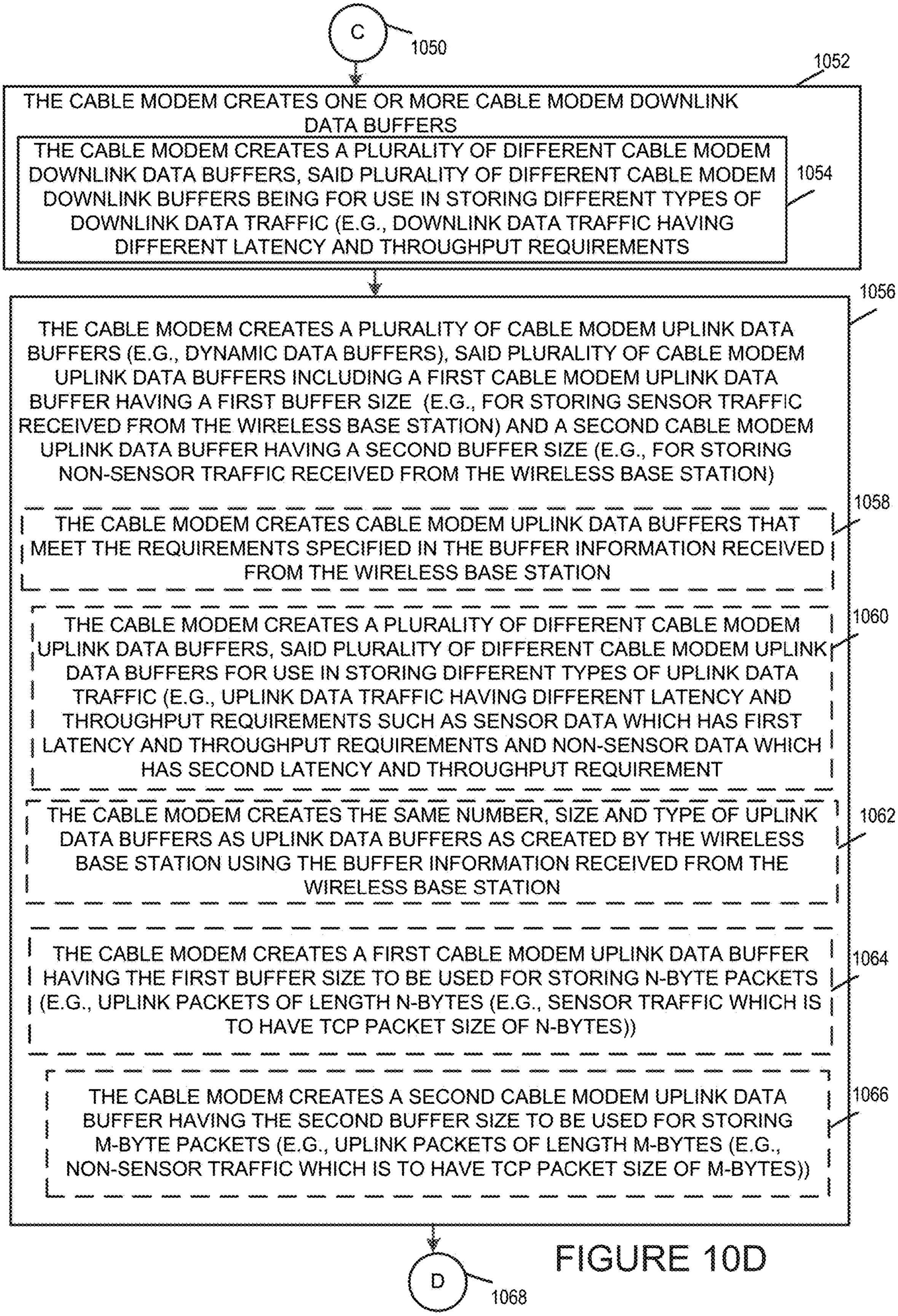
FIG. 10D illustrates the steps of the fourth part of an exemplary method in accordance with an embodiment of the present invention.
Figure 10E:
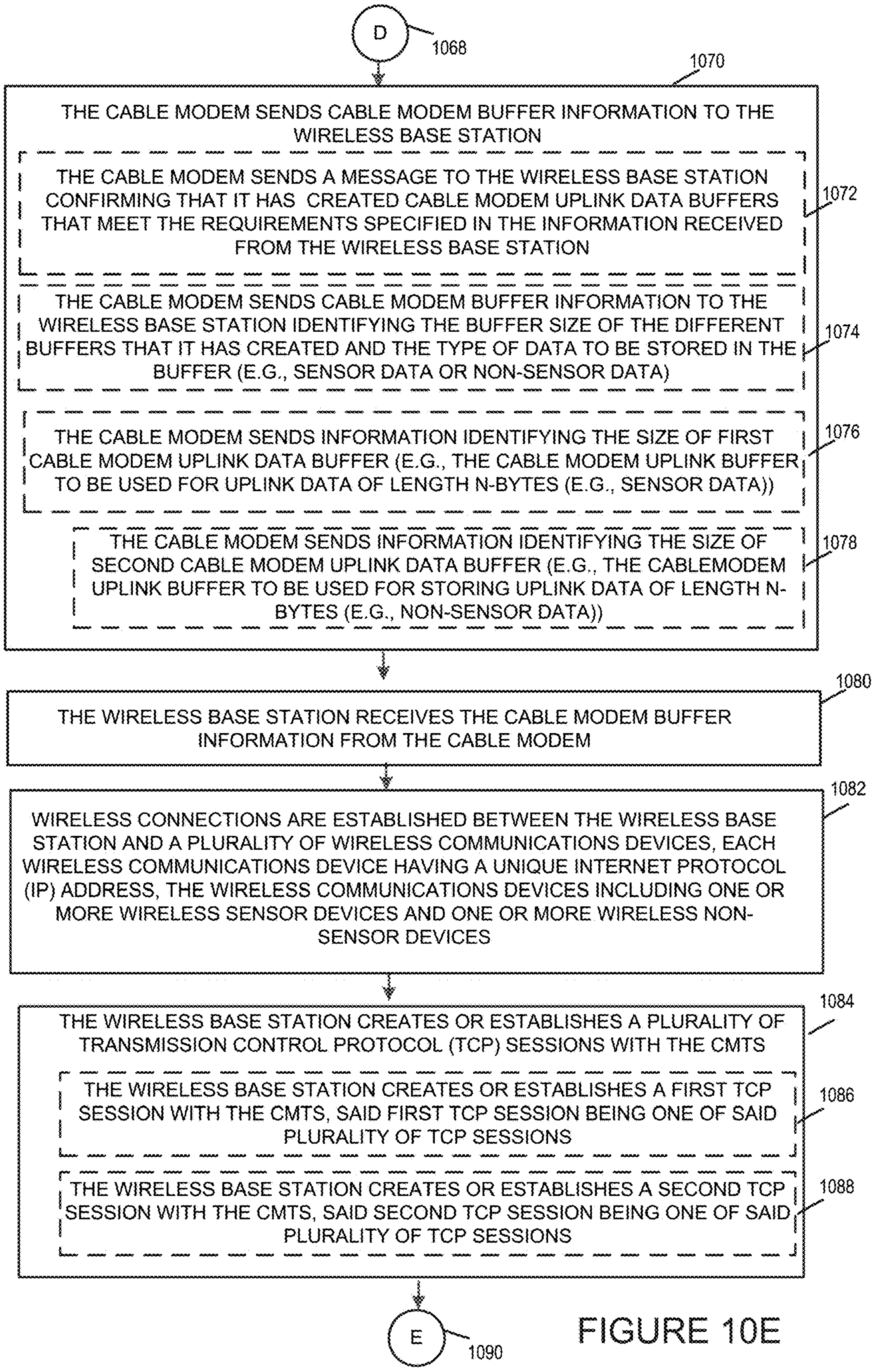
FIG. 10E illustrates the steps of the fifth part of an exemplary method in accordance with an embodiment of the present invention.
Figure 10F:
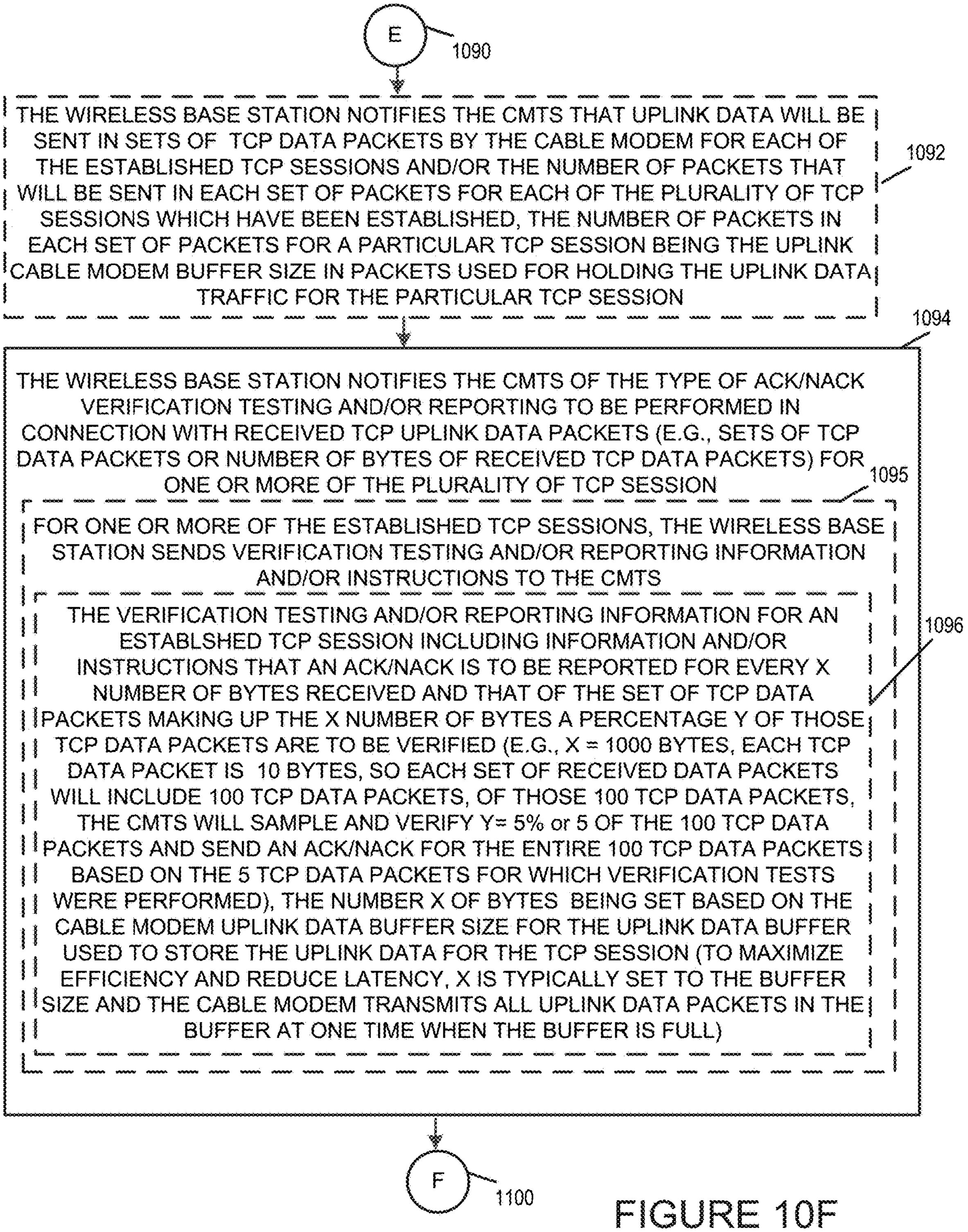
FIG. 10F illustrates the steps of the sixth part of an exemplary method in accordance with an embodiment of the present invention.
Figure 10G:
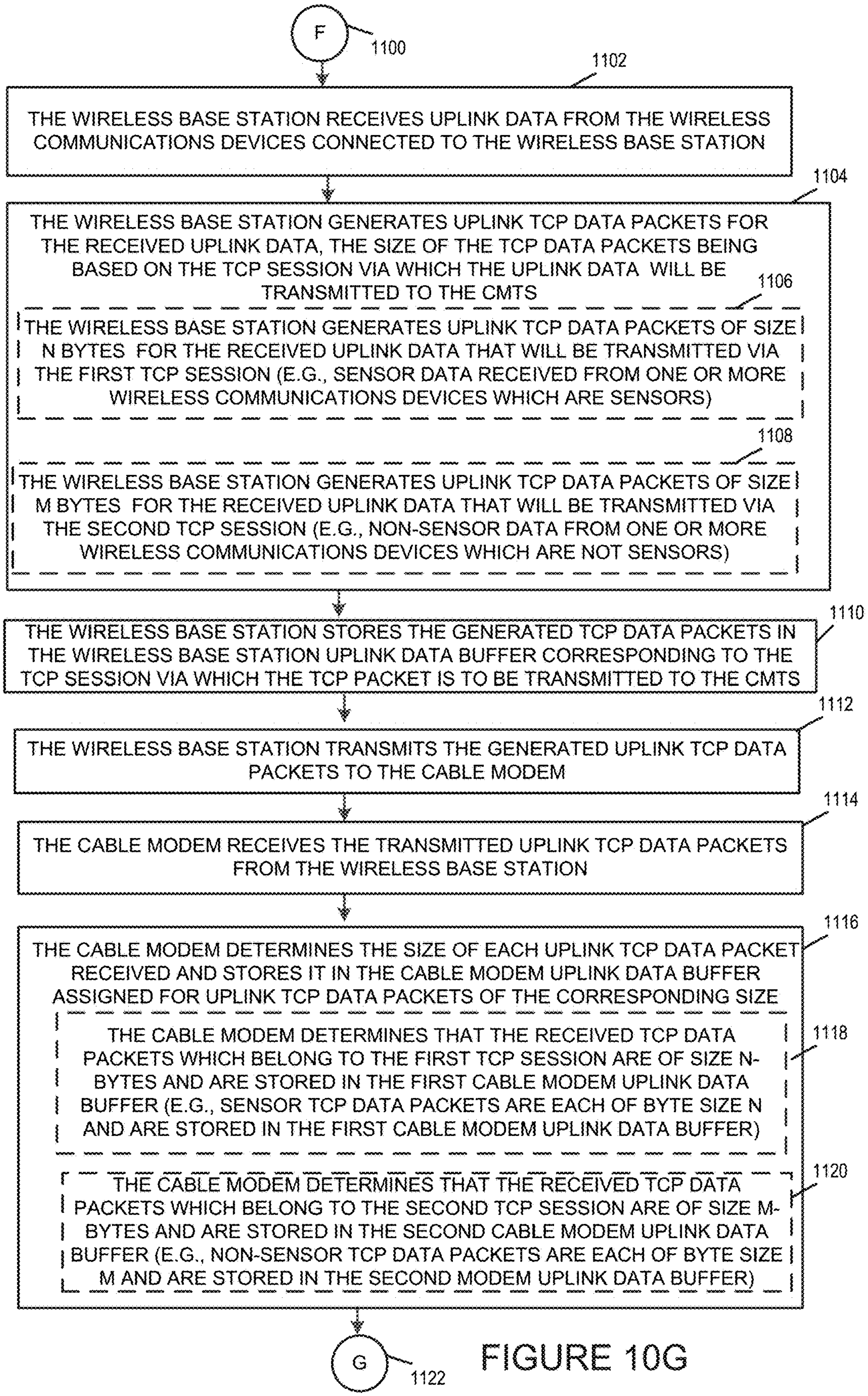
FIG. 10G illustrates the steps of the seventh part of an exemplary method in accordance with an embodiment of the present invention.
Figure 10H:
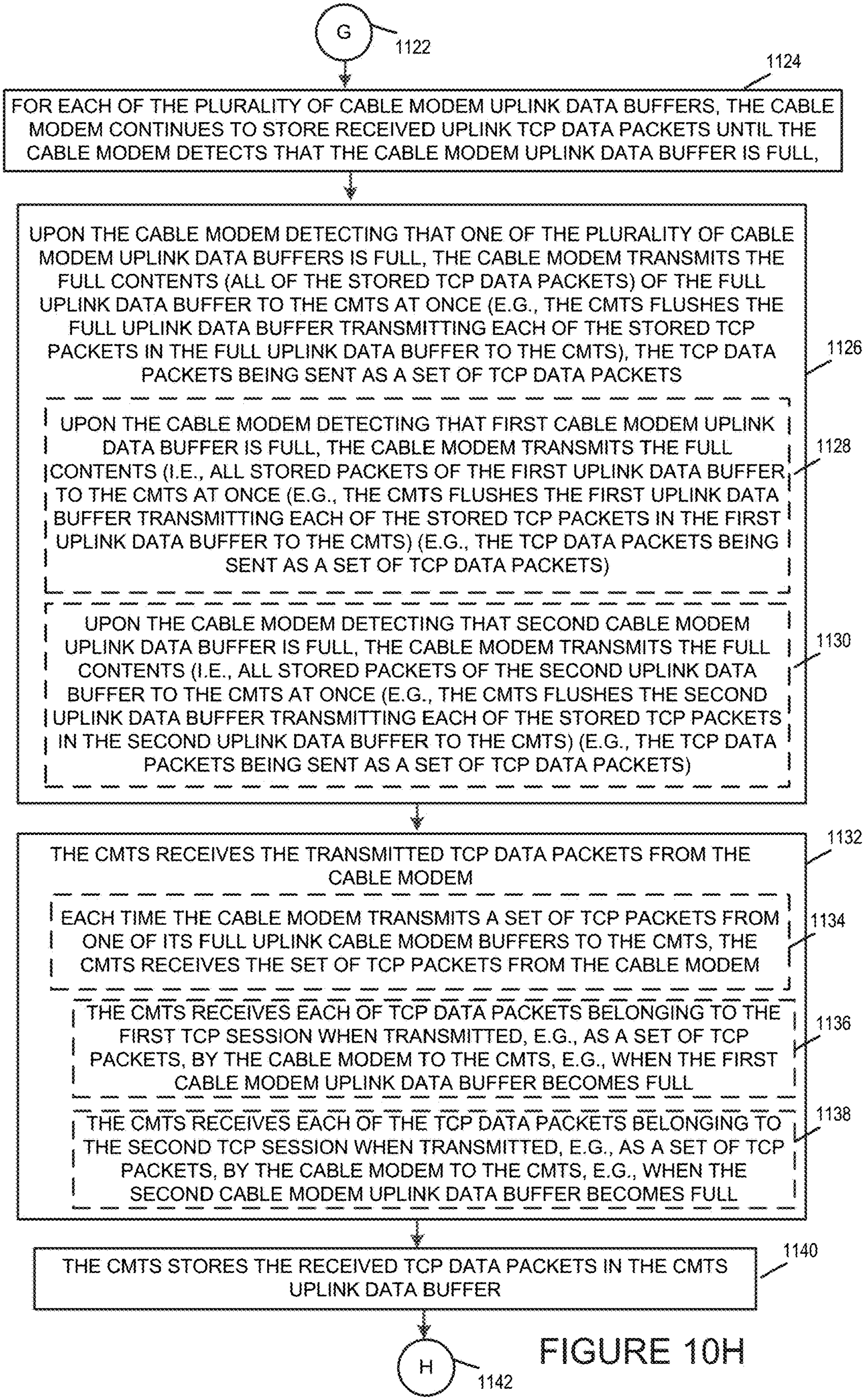
FIG. 10H illustrates the steps of the eighth part of an exemplary method in accordance with an embodiment of the present invention.
Figure 10I:
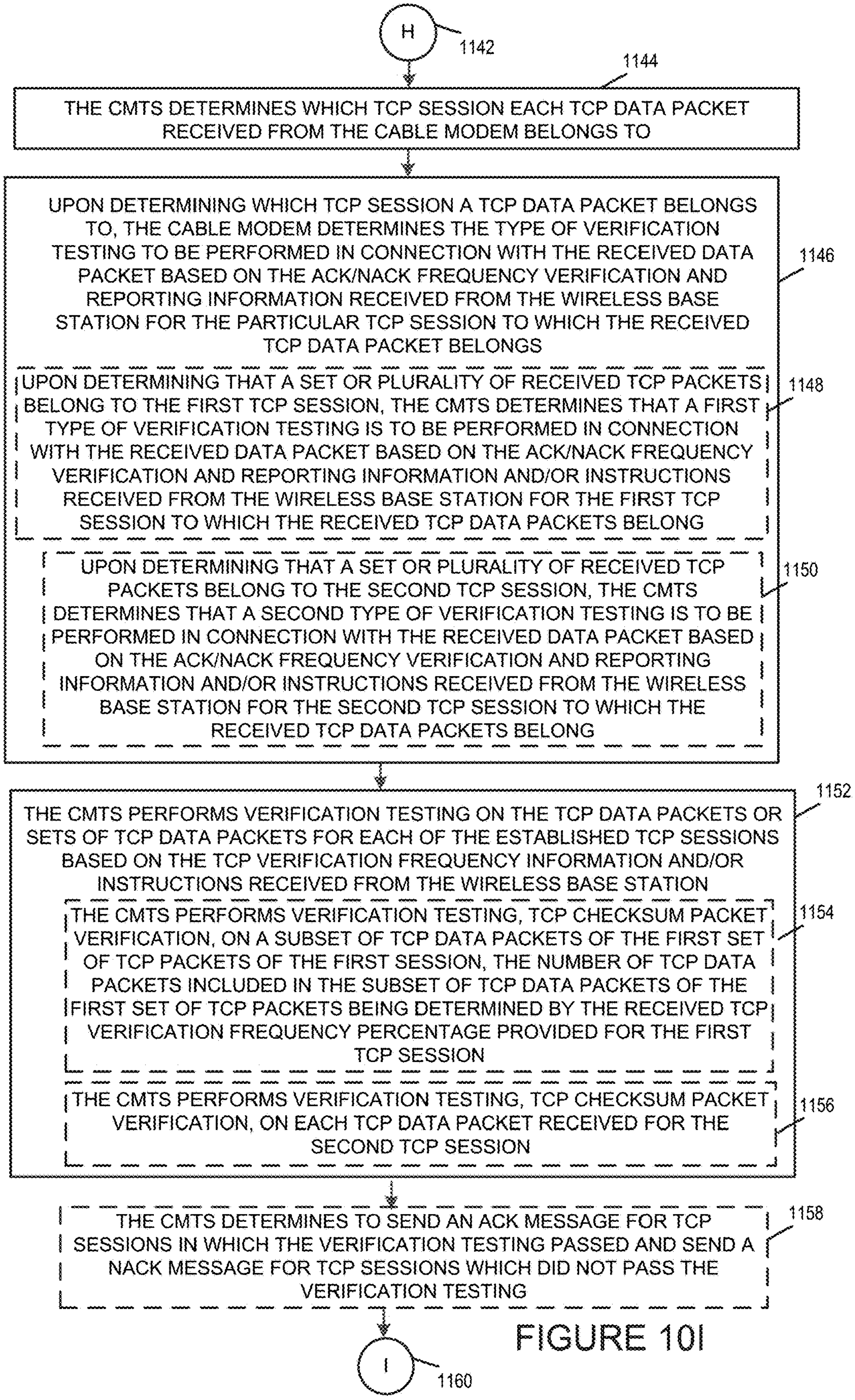
FIG. 10I illustrates the steps of the ninth part of an exemplary method in accordance with an embodiment of the present invention.
Figure 10J:
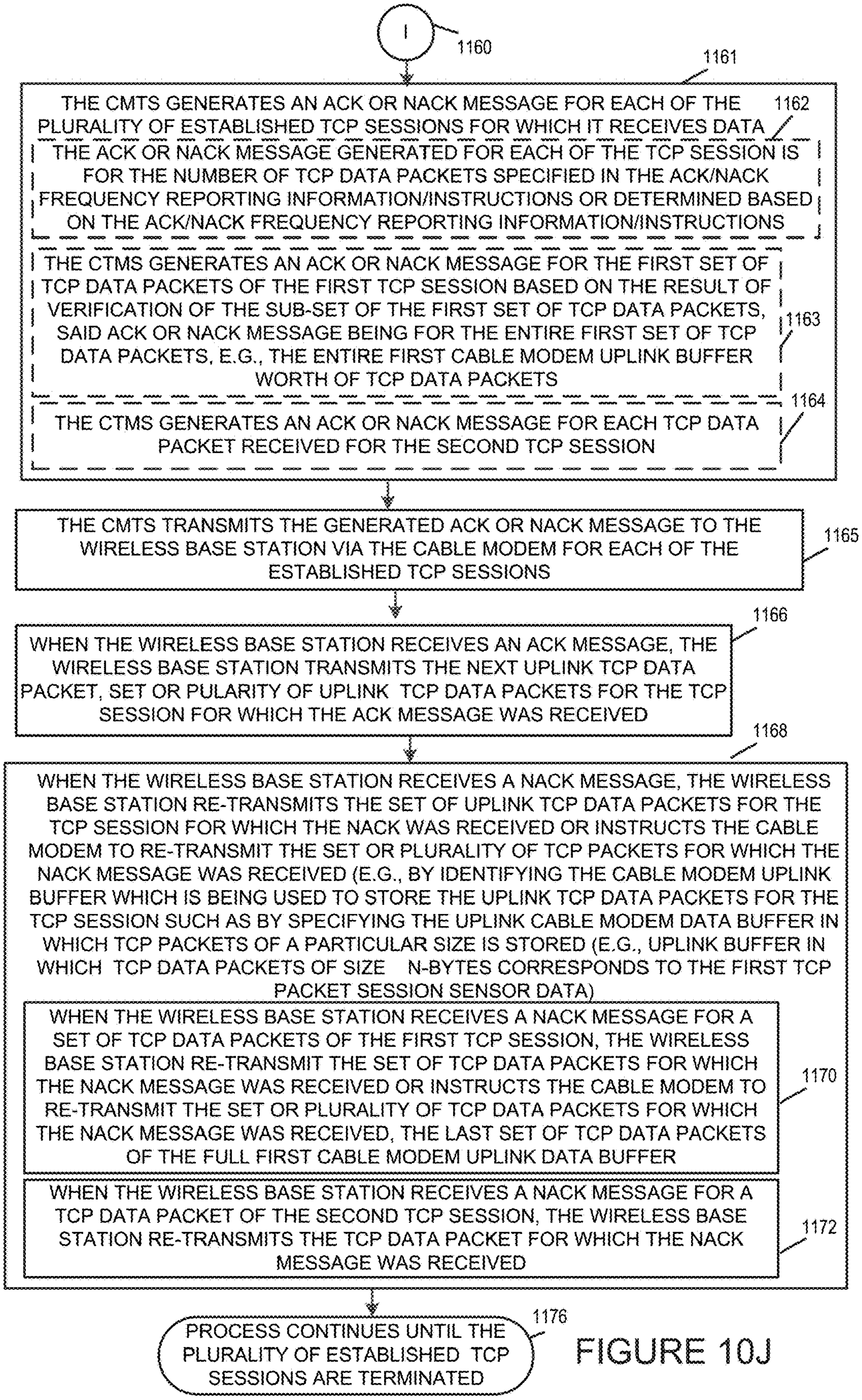
FIG. 10J illustrates the steps of the tenth part of an exemplary method in accordance with an embodiment of the present invention.
Figure 10:
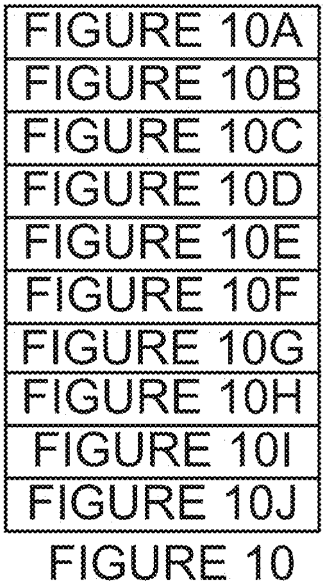
FIG. 10 illustrates the combination of FIGS. 10A, 10B, 10C, 10D, 10E, 10F, 10G, 10H, 10I and 10J.

FIG. 10 which illustrates the steps of a flowchart of a method 1000 which illustrates another exemplary method embodiment for communicating TCP packets between a wireless base station and a cable modem termination system via a cable modem. FIG. 10 illustrates the combination of FIGS. 10A, 10B, 10C, 10D, 10E, 10F, 10G, 10H, 10I and 10J. FIG. 10A illustrates the steps of the first part of an exemplary method in accordance with an embodiment of the present invention. FIG. 10B illustrates the steps of the second part of an exemplary method in accordance with an embodiment of the present invention. FIG. 10C illustrates the steps of the third part of an exemplary method in accordance with an embodiment of the present invention. FIG. 10D illustrates the steps of the fourth part of an exemplary method in accordance with an embodiment of the present invention. FIG. 10E illustrates the steps of the fifth part of an exemplary method in accordance with an embodiment of the present invention. FIG. 10F illustrates the steps of the sixth part of an exemplary method in accordance with an embodiment of the present invention. FIG. 10G illustrates the steps of the seventh part of an exemplary method in accordance with an embodiment of the present invention. FIG. 10H illustrates the steps of the eighth part of an exemplary method in accordance with an embodiment of the present invention. FIG. 10I illustrates the steps of the ninth part of an exemplary method in accordance with an embodiment of the present invention. FIG. 10J illustrates the steps of the tenth part of an exemplary method in accordance with an embodiment of the present invention.

For explanatory purposes the exemplary method 1000 will be explained in connection with the exemplary communications system 100 illustrated in FIG. 1 wherein the wireless network is a CBRS network, wireless base stations are CBSD devices, the resource allocation management devices are SAS devices, the user equipment devices are wireless communications devices which are either sensors or non-sensor device types, and cables connect the cable modem 1 104, . . . , CM Y 114 to the cable modem termination system 1 122. The cable modem termination system 1 122 supplying power to the cable modems which in turn supplies power to the wireless base station 1 (CBSD 1) 102 and wireless base station 2 (CBSD 2) 112. However, it should be understood that the method may be implemented using other systems, e.g., other non-CBRS wireless systems as well as other system configurations then those illustrated in FIG. 1. While it will be readily understood that additional steps and signaling are performed in connection with communicating information, messages, and packets between devices, the method 1000 focuses on and discusses the steps and signaling for understanding the invention.

The method 1000 shown in FIG. 10 will now be discussed in detail. The method starts in start step 1002 shown on FIG. 10A.

Operation proceeds from start step 1002 to step 1004.

In step 1004, a cable modem termination system (e.g., cable modem termination system 1 122 of system 100) is powered up and begins operating. Operation proceeds from step 1004 to step 1006.

In step 1006, a cable modem (e.g., cable modem 1 104 of system 100) connects to the cable modem termination system and begins operating. In various embodiments, the cable modem is powered by the cable modem termination system with power being supplied via a cable connecting the cable modem to the cable modem termination system. The cable is also used by the cable modem termination system and the cable modem to communicate with one another. In at least some embodiments, the power is supplied using power over Ethernet protocols, technologies and/or connections. In some embodiments, the cable modem not powered by the CMTS by a separate power source located at the site at which the cable modem is installed. Operation proceeds from step 1006 to step 1008.

In step 1008, a wireless base station (e.g., wireless base station 102 (e.g., a CSBD) of system 100) is connected to the cable modem via a cable and begins operating. The cable modem supplies power to the wireless base station. The power is supplied by the cable modem to the wireless base station over the cable connecting the wireless base station to the cable modem. The cable connecting the wireless base station to the cable mode is also used by the cable modem and the wireless base station to communicate with one another. The cable modem is positioned between the wireless base station and the cable modem termination system, The cable modem is positioned on the communications path between the wireless base station and the cable modem termination system such that the transmission of packets between the wireless base station and the cable modem termination system pass through the cable modem.

When the system is operating, the wireless base station provides services, e.g., broadband services, to user equipment devices, e.g., wireless communications devices such as sensor devices (e.g., devices which communicate sensor data traffic), non-sensor devices (devices which do not communicate sensor data traffic), laptops, smartphones, cellphones, tablets, cars, etc. which connect to the wireless base station. The user equipment device uplink data is sent to the core network (e.g., core network 150) of the service provider (e.g., service provider 1 in system 100) which typically operates both the wireless base station 1 102, the cable modem 104, the cable modem termination system 1 122 and the core network 150. The service provider typically provides both wireless and cable services. The user equipment device uplink data which is sent to the core network traverses the following path: user equipment device to wireless base station to cable modem to cable modem termination system to core network device. Downlink data sent via the core network to the user equipment device follows the reverse path: core network to cable modem termination system to cable modem to wireless base station to user equipment device. The terms downlink and downstream are used interchangeable herein, The terms uplink and upstream are also used interchangeable herein.

Operation proceeds from step 1008 to optional step 1010. In optional step 1010. The wireless base station registers with a resource allocation management device, e.g., a spectrum access system (e.g., RAMD 1 126 of system 100). This optional step is typically implemented by wireless base stations such as for example CBSD base stations of CBRS systems wherein a Spectrum Access System allocates and manages spectrum, e.g., General Authorized Access spectrum, which a wireless base station is to utilize. Operation proceeds from optional step 1010 to optional step 1012.

In optional step 1012, the resource allocation management device grants spectrum to the wireless base station for use in communicating with user equipment devices. Operation proceeds from optional step 1012 to step 1014.

When optional steps 1010 and 1012 are not implemented, operation proceeds from step 1008 to step 1014.

In step 1014, the wireless base station creates one or more downlink data buffers for holding data to be received from the cable modem and to be transmitted to the wireless communications devices to which the wireless base station provides services. Operation proceeds from step 1014 via connection node A 1016 to step 1018 shown on FIG. 10B.

In step 1018, the wireless base station creates a plurality of wireless base station uplink data buffers (e.g., from memory located within the wireless base station), said plurality of wireless base station uplink data buffers including a first wireless base station uplink data buffer and a second wireless base station uplink data buffer. In some embodiments, step 1018 includes one or more sub-steps 1020, 1022, 1024, 1026, 1028 and 1030.

In sub-step 1020, as part of creating the wireless base station uplink data buffers, the wireless base station defines a buffer ID, size, and type for each of the plurality of wireless base station uplink data buffers. With respect to the first wireless base station uplink data buffer, the wireless base station in some embodiments defines the buffer ID as a buffer ID 1, the size is a first buffer size which is X bytes (X being a positive integer number such as 1 MB (megabytes), and the type is for traffic with a first latency requirement, e.g., low latency sensor data traffic. With respect to the second wireless base station uplink data buffer, the wireless base station in some embodiments defines the buffer ID as a buffer ID 2, the size is a second buffer size which is Z bytes (Z being a positive integer number such as 0.5 MB (megabytes), and the type is for traffic with a second latency requirement, e.g., non-sensor data traffic.

In sub-step 1022, the wireless base statin determines a buffer size (e.g., number of bytes of storage capacity) of each of the uplink data buffers based on one or more of the following: (i) the type of wireless communications devices for which the uplink data buffer is to be used to store data (e.g., sensor device type, non-sensor device type), (ii) the number of communications devices of a particular type expected or estimated to be serviced at the same time by the wireless base station for which the buffer is to be used to store data, (iii) type of data traffic to be stored in the buffer (e.g., sensor data or non-sensor data), and (iv) latency and/or throughput requirements of the devices and/or traffic for which data is to be stored in the uplink data buffer.

In step 1024, the wireless base station determines a first buffer size for the first wireless base station uplink data buffer based on one or more of the following: (i) the communication device type for which data is to be stored in the first wireless base station uplink data buffer, (ii) the type of data traffic to be stored in the first wireless base station uplink data buffer, (iii) the amount of data traffic and/or the latency requirements related to the device type or data traffic type for which the first wireless base station uplink data buffer is to be used to store data.

In sub-step 1026, the wireless base station determines a second buffer size for the second wireless base station uplink data buffer based on one or more of the following: (i) the communication device type for which data is to be stored in the second wireless base station uplink data buffer, (ii) the type of data traffic to be stored in the second wireless base station uplink data buffer, (iii) the amount of data traffic and/or the latency requirements related to the device type or data traffic type for which the second wireless base station uplink data buffer is to be used to store data.

In sub-step 1028, the wireless base station creates a first wireless base station uplink data buffer for use in storing data (e.g., sensor data) received from wireless sensor devices. The first wireless base station uplink data buffer having a first buffer size.

In sub-step 1030, the wireless base station creates a second wireless base station uplink data buffer for use in storing data (e.g., sensor data) received from wireless non-sensor devices. The second wireless base station uplink data buffer having a second buffer size.

Operation proceeds from step 1018 via connection node B 1032 to step 1034 shown on FIG. 10C.

In step 1034, the CMTS creates one or more CMTS downlink data buffers for storing or holding data to be transmitted to the cable modem. Operation proceeds from step 1034 to step 1036.

In step 1036, the CMTS creates one or more CMTS uplink data buffers for storing or holding data received from the cable modem. Operation proceeds from step 1036 to step 1038.

In step 1036, the wireless base station transmits information to the cable modem, the buffer information including information specifying the number of cable modem uplink data buffers to create and the requirements and/or parameters for each of the uplink data buffers to be created (e.g., uplink data buffer ID, size, type and TCP packet size of received TCP packets to be stored in the uplink data buffer). Operation proceeds from step 1036 to step 1038.

In step 1038, the wireless base station transmits buffer information to the cable mode. The buffer information includes information specifying the number of uplink data buffers (e.g., dynamic uplink data buffers) to create and the requirements/parameters defining each uplink data buffer to be created (e.g., uplink buffer ID, size, type and a TCP packet size corresponding to uplink data traffic to be stored in the particular uplink data buffer). The cable modem uplink data buffers are referred to as dynamic uplink data buffers as the cable modem will be capable of adjusting and/or changing the number of cable modem uplink data buffers (e.g., based on the latency and uplink data speed. Also, the size of the uplink buffers will be adjustable and may be, and in some embodiments is adjusted based on for example the data processing speed of the cable modem and/or other components in the system. The adjustments to the cable modem uplink data buffers may be, and in some embodiments are, implemented by the cable modem in response to instructions or information, e.g., updated buffer information, received from the wireless base station. The wireless base station uplink and downlink data buffers are also dynamic data buffers which are adjustable by the wireless base station. In some embodiments step 1038, includes one or more sub-steps 1040, 1042, 1044, and 1046.

In sub-step 1040, the wireless base station transmits a buffer message to the cable modem. The buffer message includes one or more of the following: (i) information indicating that a first cable modem uplink data buffer is to be created having a first buffer size which is to be used for N-byte packets (e.g., uplink TCP data packets having a length of N-bytes (N being a positive integer) (e.g., sensor traffic will have a TCP packet size of N-bytes and the first uplink cable modem buffer will be used for storing uplink sensor traffic data received from the wireless base station), and (ii) information indicating that a second cable modem uplink data buffer is to be created having a second buffer size which is to be used for M-byte packets (e.g., uplink TCP data packets having a length of M-bytes (M being a positive integer) (e.g., non-sensor traffic will have a TCP packet size of M-bytes and the first uplink cable modem buffer will be used for storing uplink non-sensor traffic data received from the wireless base station).

In sub-step 1042, the wireless base station transmits information to the cable modem providing buffer size information for each of the uplink data buffers the cable modem is to create (e.g., capacity of the buffer specified in number of bytes).

In sub-step 1044, the wireless base station transmits information to the cable modem providing latency and throughput requirements for different cable modem uplink data buffers to be created which will be used to hold different data traffic types (e.g., sensor traffic vs. non-sensor traffic).

In sub-step 1046, the wireless base station transmits buffer information to the cable modem providing the parameters to create the same number, size and type of uplink data buffers created by the wireless base station.

Operation proceeds from step 1038 to step 1048.

In step 1048, the cable mode receives the buffer information from the wireless base station.

Operation proceeds from step 1048 via connection node C 1050 to step 1052 shown on FIG. 10D.

In step 1052, the cable modem creates one or more downlink data buffers. In some embodiments, step 1052 includes sub-step 1054. In sub-step 1054, the cable modem creates a plurality of different cable modem downlink data buffers. The plurality of different cable modem downlink buffers being for use in storing different types of downlink data traffic (e.g., downlink data traffic having different latency and throughput requirements. Operation proceeds from step 1052 to step 1056.

In step 1056, the cable modem creates a plurality of cable modem uplink data buffers (e.g., dynamic data buffers). The plurality of cable modem uplink data buffers includes a first cable modem uplink data buffer having a first buffer size (e.g., for storing sensor traffic received from the wireless base station) and a second cable modem uplink data buffer having a second buffer size (e.g., for storing non-sensor traffic received from the wireless base station). In some embodiments, step 1056 includes one or more sub-steps 1058, 1060, 1062, 1064, and 1066.

In sub-step 1058, the cable modem creates cable modem uplink data buffers (e.g., dynamic data buffers) that meet the requirements specified in the buffer information received from the wireless base station.

In sub-step 1060, the cable modem creates a plurality of different cable modem uplink data buffers, said plurality of different cable modem uplink data buffers for use in storing different types of uplink data traffic (e.g., uplink data traffic having different latency and throughput requirements such as sensor data which has a first latency and throughput requirement and non-sensor data which has a second latency and throughput requirement, the first and second latency and throughput requirements being different.

In sub-step 1062, the cable modem creates the same number of uplink data buffers having the same buffer size and being of the same buffer type as created by the wireless base station using the buffer information received from the wireless base station. In such an embodiment, the created cable modem uplink data buffers match the wireless base station uplink data buffers.

In sub-step 1064, the cable modem creates a first cable modem uplink data buffer having the first buffer size to be used for storing N-byte packets (e.g., uplink TCP data packets having a length of N-bytes (e.g., sensor traffic uplink TCP data packets which have a TCP packet size of N-bytes)).

In sub-step 1066, the cable modem creates a second cable modem uplink data buffer having the second buffer size to be used for storing M-byte packets (e.g., uplink TCP data packets having a length of M-bytes (e.g., non-sensor traffic uplink TCP data packets which have a TCP packet size of M-bytes)).

The cable modem uplink and downlink data buffers may be, and in some embodiments are, implemented in memory (e.g., volatile memory) in the cable modem.

Operation proceeds from step 1056 via connection node D 1068 to step 1070 shown on FIG. 10E.

In step 1070, the cable modem sends cable modem buffer information to the wireless base station, said cable modem buffer information including information about the cable modem uplink buffers created by the cable modem (e.g., ID, number, size, and type for each cable modem uplink buffer and packet byte size to be stored in the buffer).

In some embodiments step 1070 includes one or more sub-steps 1072, 1074, 1076 and 1078.

In sub-step 1071, the cable modem sends a message to the wireless base station confirming that the cable modem has created cable modem uplink data buffers that meet the requirements specified in the buffer information received from the wireless base station.

In sub-step 1074, the cable modem sends cable modem buffer information to the wireless base station identifying the buffer size of the different buffers that the cable modem has created and the type of data to be stored in the buffer (e.g., sensor data or non-sensor data).

In sub-step 1076, the cable modem sends information identifying the size of first cable modem uplink data buffer (e.g., the cable modem uplink data buffer to be used for storing uplink data of length N-bytes, (e.g., sensor data)).

In sub-step 1078, the cable modem sends information identifying the size of second cable modem uplink data buffer (e.g., the cable modem uplink data buffer to be used for storing uplink data of length M-bytes, (e.g., non-sensor data)).

Operation proceeds from step 1078 to step 1080. In step 1080, the wireless base station receives the cable modem buffer information from the cable modem. Operation proceeds from step 1080 to step 1082.

In step 1082, wireless connections are established between the wireless base station and a plurality of wireless communications devices, each wireless communications device having a unique Internet Protocol (IP) address. The wireless communications devices including one or more wireless sensor devices and one or more wireless non-sensor devices. In various embodiments, the wireless communications devices include a plurality of wireless sensor devices and a plurality of wireless non-sensor devices. In some embodiments, the wireless communications devices connected to the wireless base station are classified by the wireless base station as being either sensor device type or non-sensor device type. In such embodiments, the sensor device type devices sending uplink sensor data traffic to the core network and the non-sensor device type device sending uplink data which is not sensor data traffic to the core network.

Operation proceeds from step 1082 to step 1084.

In step 1084, the wireless base station creates or establishes a plurality of TCP sessions with the CMTS. In some embodiments, the wireless base station creates one or more TCP session with the CMTS. In some embodiments, step 1084 includes one or more sub-steps 1086 and 1088.

In sub-step 1086, the wireless base station creates or establishes a first TCP session with the CMTS, the first TCP session being one of said plurality of TCP sessions.

In sub-step 1088, the wireless base station creates or establishes a second TCP session with the CMTS, the second TCP session being one of the plurality of TCP sessions.

Operation proceeds from step 1084 via connection node 1090 to optional step 1092 shown on FIG. 10F.

In step 1092, the wireless base station provides information to the CMTS about each of the plurality of established TCP session. The information includes one or more of the following: (i) the type of TCP ACK/NACK verification testing to be performed with respect to TCP data packets received from cable modem for one or more of the established TCP sessions; (ii) information on the timing of when ACK/NACK reporting is to be provided by the CTMS to the wireless base station for one or more of the established TCP sessions (e.g., on a recurring basis after each plurality or set of X bytes of TCP data packets are received for the TCP session (i.e., after X bytes are received, after next plurality of X bytes are received (total of 2X bytes received), etc.) or on a recurring basis after each plurality or set of W packets are received (i.e., after a plurality of W packets are received, after a plurality of next W packets have been received (total of 2X packets received), etc.); (iii) the number of bytes in an uplink TCP data packet corresponding to a particular TCP session; (iv) information about the cable modem uplink data buffers being used for one or more of the established TCP data sessions (e.g., ID, size (e.g., number of bytes and/or packets it holds), type); (v) information about the wireless base station uplink data buffers being used for one or more of the established TCP data sessions (e.g., ID, size (e.g., number of bytes and/or packets it holds), type); (vi) information about the size of TCP data packets being used for one or more of the established TCP sessions; (vii) whether or not the cable modem will store received TCP packets for a TCP session until its uplink cable modem data buffer for the TCP session is full and then send/transmit all packets in the buffer to the CMTS (e.g., flush the full buffer). In some embodiments step 1092 includes one or more sub-steps 1094, 1096, 1097, 1098, and 1099.

In sub-step 1094, the wireless base station notifies the CMTS of the type of ACK/NACK verification testing and/or reporting to be performed in connection with received TCP uplink data packets (e.g., sets of TCP data packets or number of bytes of received TCP data packets) for one or more of the plurality of TCP sessions. In some embodiments, the CMTS wireless base station notifies the CMTS of the type of ACK/NACK verification testing and/or reporting to be performed in connection with each of the established TCP sessions. In some embodiments, step 1094 includes sub-step 1095.

In sub-step 1095, for one or more of the established TCP sessions, the wireless base station sends verification testing and/or ACK/NACK reporting information and/or instructions to the CMTS. In some embodiments, step 1096 includes step 1096. In step 1096, the verification testing and/or ACK/NACK reporting information includes information and/or instructions that an ACK/NACK is to be reported after every X number of bytes is received and that of the plurality or set of TCP data packets making up the X number of bytes a percentage Y or number Z of those TCP data packets are to be sampled and verified to determine whether or not to send an ACK or NACK message (e.g., X=1000 bytes, each received TCP data packet in the TCP session is 10 bytes in length, so each set or plurality of received TCP data packets will include 100 TCP data packets, of those 100 TCP data packets, the CMTS will sample and verify Y=5% or 5 of the 100 TCP data packets and send an ACK/NACK for the entire 100 TCP data packets based on the 5 TCP data packets for which verification tests were performed), the number X of bytes being set based on the cable modem uplink data buffer size and/or the wireless base station uplink buffer size for the uplink data buffer used to store the uplink data for the TCP session (to maximize efficiency and reduce latency, X is typically set to the buffer size of the cable modem uplink buffer being used to store TCP data packets for the TCP session and the cable modem stores the uplink TCP data packets for the TCP session in the uplink data buffer until it full and then transmits all of the uplink data packets in the buffer at once when the buffer is full using all available link capacity). The size of the wireless base station uplink data buffer is used when the cable modem is merely passing uplink TCP data packets without respect to whether or not the uplink cable modem is full or not, that is it receives and automatically transmits without regarding to the uplink data buffer status.

Operation proceeds from step 1094 via connection node 1100 F to step 1102 shown on FIG. 10G.

In step 1102, the wireless base station receives uplink data from the wireless communications devices connected to the wireless base station and for which the wireless base station is providing services. Operation proceeds from step 1102 to step 1104.

In step 1104, the wireless base station generates uplink TCP data packets for the received uplink data, the size of the TCP data packets being based on the TCP session via which the uplink data will be transmitted to the CMTS. In some embodiments step 1104 includes one ore more sub-steps 1106 and 10018. In sub-step 1106, the wireless base station generates uplink TCP data packets of size N bytes for the received uplink data to be transmitted via the first TCP session (e.g., sensor data received from one or more wireless communications devices which are sensors or produce sensor data). In step 1106, the wireless base station generates uplink TCP data packets of size M bytes for the received uplink data that will be transmitted via the second TCP session (e.g., non-sensor data received from one or more wireless communications devices which are not sensors). In various embodiments, different TCP data packet sizes are used for different TCP session, each session having a unique TCP packet size so that the cable modem can distinguish based on TCP data packet size which of its created cable modem uplink buffers to use for storing the TCP data packets corresponding to a particular TCP session. Operation proceeds from step 1104 to step 1110.

In step 1110, the wireless base station stores the generated TCP packets in wireless base station uplink data buffers corresponding to the TCP session to be used for transmitting the generated packet. TCP data packets of size N which include sensor data are stored in the first wireless base station uplink data buffer which corresponds to the first TCP session. TCP data packets of size M which include non-sensor data are stored in the second wireless base station uplink data buffer which correspond to the second TCP session. Operation proceeds from step 1110 to step 1112.

In step 1112, the wireless base station transmits the generated uplink TCP data packets to the cable modem. In various embodiments step 1112 includes the wireless base station transmitting the N-byte size packets which are TCP data packets including sensor data to the cable modem and/or the M-byte size packets which are TCP packets including the non-sensor data to the cable modem. In some embodiments, the wireless base station transmits all of the TCP data packets in a particular uplink data buffer until the uplink data buffer becoming full. In some such embodiments, as the cable modem has a corresponding uplink data buffer of the same size for the TCP data packets the received TCP data packets will fill up the cable modem's corresponding uplink buffer which will cause the cable modem to then send the TCP data packets to the CMTS when it flushes its buffer. This increases the efficiency of transmitting the TCP data packets for the TCP session. Operation proceeds from step 1112 to step 1114.

In step 1114, the cable modem receives the transmitted uplink TCP data packets from the wireless base station. Operation proceeds from step 1114 to step 1116.

In step 1116, the cable modem determines the size of each uplink TCP data packet received and store it in the cable modem uplink data buffer assigned for uplink TCP data packets of the corresponding size. In some embodiments, step 1116 includes one or more sub-steps 1118 and 1120. In sub-step 1118, the cable modem determines that the received TCP data packets which belong to the first TCP session are of size N-bytes and stores these TCP data packets in the first cable modem uplink data buffer (e.g., sensor TCP data packets are each of byte length size N and are stored in the first cable modem uplink data buffer). In sub-step 1120, the cable modem determines that the received TCP data packets which belong to the second TCP session are of size M-bytes and stores these packets in the second cable modem uplink data buffer (e.g., non-sensor TCP data packets are each of byte size length and are stored in the second modem uplink data buffer). Operation proceeds from step 1116 via connection node G 1122 to step 1124 shown on FIG. 10H.

In step 1124, for each of the plurality of cable modem uplink data buffers, the cable modem continues to store received uplink TCP data packets until the cable modem detects that the cable modem uplink data buffer is full. Operation proceeds from step 1124 to step 1126.

In step 1126, upon the cable modem detecting that one of the plurality of cable modem uplink data buffers is full, the cable modem transmits the full contents (all of the stored TCP data packets) of the full uplink cable modem data buffer to the CMTS at once (e.g., the CMTS flushes the full uplink data buffer transmitting each of the stored TCP data packets in the full uplink data buffer to the CMTS). In various embodiments, the plurality of TCP data packets which are contained in the full uplink cable modem are transmitted using all available link capacity to the CMTS and may be, and in some embodiments are, transmitted as a set of TCP data packets (e.g., without data packets from any other cable modem uplink data buffers being transmitted during the transmission of the TCP data packets of the full uplink data buffer. In some embodiments, step 1126 includes one or more steps 1128 and 1130. In step 1128, the cable modem upon detecting that the first cable modem uplink data buffer is full, the cable modem transmits the full contents (i.e., all stored TCP data packets of the first cable modem uplink data buffer to the CMTS at once (e.g., the CMTS flushes the first cable modem uplink data buffer transmitting each of the stored TCP packets in the first cable modem uplink data buffer to the CMTS) (e.g., the TCP data packets being sent as a set of TCP data packets). In step 1130, the cable modem upon detecting that the second cable modem uplink data buffer is full, the cable modem transmits the full contents (i.e., all stored TCP data packets of the second cable modem uplink data buffer to the CMTS at once (e.g., the CMTS flushes the second cable modem uplink data buffer transmitting each of the stored TCP packets in the second cable modem uplink data buffer to the CMTS) (e.g., the TCP data packets being sent as a set of TCP data packets). In an embodiment, the cable modem sends the TCP data packets of one or more of the cable modem uplink data buffers to the CMTS on a rolling basis without waiting for the cable modem uplink data buffer to become full. Operation proceeds from step 1126 to step 1132.

In step 1132, the CMTS receives the transmitted TCP data packets from the cable modem. Step 1132 includes one or more sub-steps 1134,1136, and 1138. In sub-step 1134, each time the cable modem transmits a plurality or set of TCP data packets from one of its full uplink cable modem buffers to the CMTS, the CMTS receives the set of TCP packets from the cable modem. In sub-step 1136, the CMTS receives each of the TCP data packets belonging to the first TCP session when transmitted, e.g., as a set of TCP packets, by the cable modem to the CMTS, e.g., when the first cable modem uplink data buffer becomes full. In sub-step 1138, the CMTS receives each of the TCP data packets belonging to the second TCP session when transmitted, e.g., as a set of TCP packets, by the cable modem to the CMTS, e.g., when the second cable modem uplink data buffer becomes full. Operation proceeds from step 1132 to step 1140.

In step 1140, the CMTS stores the received TCP data packets in the CMTS uplink data buffer. Operation proceeds from step 1140 via connection node H 1142 to step 1144 shown on FIG. 10I.

In step 1144, the CMTS determines which of the established TCP sessions each TCP data pack received from the cable modem belongs to. Operation proceeds from step 1144 to step 1146.

In step 1146, upon determining which TCP session a TCP data packet belongs to, the cable modem determines the type of verification testing to be performed in connection with the received data packet based on the ACK/NACK frequency verification and/or reporting information and/or instructions received from the wireless base station for the particular TCP session to which the received TCP data packet belongs. In some embodiments steps 1146 includes one or more sub-steps 1148 and 1150. In sub-step 1148, upon determining that a set of received packets or a plurality of received packets, belong to the first TCP session, the CMTS determines that a first type of verification testing is to be performed in connection with the received data packets based on the ACK/NACK frequency verification and reporting information and/or instructions received from the wireless base station for the first TCP session to which the received TCP data packets belong (e.g., the sensor TCP data packets). In sub-step 1150, upon determining that a set of received packets or a plurality of received packets, belong to the second TCP session, the CMTS determines that a second type of verification testing is to be performed in connection with the received data packets based on the ACK/NACK frequency verification and reporting information and/or instructions received from the wireless base station for the second TCP session to which the received TCP data packets belong (e.g., the non-sensor TCP data packets). Operation proceeds from step 1146 to step 1152.

In step 1152, the CMTS performs verification testing on the TCP data packets or sets of TCP data packets for each of the established TCP sessions based on the TCP verification frequency information and/or instructions received from the wireless base station. Verification of a received set of TCP data packets for a TCP session including performing verification testing on sub-set of the TCP data packets included in the received set of TCP data packets for the session. The number of TCP data packets included in the subset of TCP data packets being specified by the verification frequency percentage provided by the wireless base station. Step 1152 in some embodiments includes one or more sub-steps 1154 and 1156.

In sub-step 1154, the CMTS performs verification testing, e.g., TCP checksum packet verification testing, on a subset of TCP data packets of the first set of TCP packets of the first session. The number of TCP data packets included in the subset of TCP data packets of the first set of TCP data packets being determined based on the received TCP verification frequency percentage provided for the first TCP session.

In sub-step 1156, the CMTS performs verification testing, e.g., TCP checksum packet verification, on each TCP data packet received for the second TCP session. Operation proceeds from step 1152 to step 1154.

In step 1154, the CMTS determines to: (i) send an ACK message for TCP sessions in which the verification testing for the received TCP data packet or set of TCP data packets passed (e.g., all TCP packets tested passed the verification test), and (ii) send a NACK message for TCP sessions which did not pass the verification testing (e.g., one or more TCP data packets tested did not pass the verification test). Operation proceeds from step 1158 via connection node I 1160 to step 1161 shown in FIG. 10J.

In step 1161, the CMTS generates an ACK or NACK message for each of the established TCP sessions for which the CMTS has received data. In some embodiments step 1161 includes one or more sub-steps 1162, 1163, and 1164. In sub-step 1162, the ACK or NACK message generated for each of the TCP sessions is for the number of TCP data packets specified in the ACK/NACK frequency reporting information/instructions received from the wireless base station or determined based on the ACK/NACK frequency reporting information/instructions received from the wireless base station. In sub-step 1163, the CMTS generates an ACK or NACK message for the first set of TCP data packets of the first TCP session. Whether an ACK or NACK message is generated is based on the result of the verification of the sub-set of first set of TCP data packets, e.g., the entire first cable modem uplink buffer worth of TCP data packets when the ACK/NACK frequency reporting information/instructions indicates that an ACK or NACK message is to be reporting for the number of TCP data packets or number of bytes of TCP data equal to the size of the first cable modem uplink data buffer. In sub-step 1164, the CMTS generates an ACK or NACK message for each TCP data packet received for the second TCP session when the ACK/NACK frequency reporting information indicates that an ACK or NACK message is to be reported for each of the received TCP data packets of the second TCP session. In such embodiments, the TCP data packet verification frequency is for each received TCP data packet of the second TCP session.

Operation proceeds from step 1161 to step 1165.

In step 1165, the CMTS transmits the generated ACK or NACK message for each of the established TCP sessions to the wireless base station via the cable modem. Operation proceeds from step 1165 to step 1166.

In step 1166, when the wireless base station receives an ACK message in connection with one of the established TCP sessions, the wireless base station transmits the next uplink TCP data packet, or set or plurality of uplink TCP data packets for the TCP session for which the ACK message was received. Operation proceeds from step 1166 to step 1168.

In step 1168, when the wireless base station receives a NACK message, the wireless base station re-transmits the set of uplink TCP data packets for the TCP session for which the NACK message was received or instructs the cable modem to re-transmit the set or plurality of TCP packets for which the NACK message was received (e.g., by identifying the cable modem uplink buffer which is being used to store the uplink TCP data packets for the TCP session such as by specifying the uplink cable modem data buffer in which TCP packets of a particular size is store (e.g., uplink buffer in which TCP data packets of size N-bytes corresponding to the first TCP packet session which includes sensor data). In some embodiments, step 1168 includes one or more sub-steps 1170 and 1172.

In step 1170, when the wireless base station receives a NACK message for a set of TCP data packets of the first TCP session, the wireless base station re-transmits the set of TCP data packets for which the NACK message was received or instructs the cable modem to re-transmit the set or plurality of TCP data packets for which the NACK message was received, e.g., the TCP data packet of the first cable modem uplink data buffer. In some embodiments, the cable modem maintains a copy of the TCP uplink data packets in the uplink data buffers until it receives additional TCP uplink data packets until it receives a confirmation a re-transmit message from the wireless base station for the buffer or additional TCP data packets for the buffer after a full buffer has been transmitted to the CMTS. In other embodiments, in which the wireless base station re-transmits the TCP packets after receiving a NACK message, the cable modem empties the uplink data buffer after transmission of the entire contents of the uplink data buffer when it is full.

In step 1172, when the wireless base station receives a NACK message for a TCP data packet of the second TCP session, the wireless base station re-transmits the TCP data packet for which the NACK message was received.

Operation proceeds from step 1172 to step 1174. In step 1174, the process continues for each of the TCP sessions until each TCP session of the plurality of TCP sessions is terminated.

Various implementations and optional features of the method 1000 will now be discussed. In various embodiments, the receiving and storage steps of the cable modem of data from the wireless base station and the CMTS are performed independently and may be done in parallel or simultaneously. The transmission of instructions to change buffer sizes of the uplink data buffer for the cable modem sent to the cable modem by the wireless base station for one or more uplink data buffers corresponding to different uplink data packet lengths may be, and in many embodiments are, performed independently and may be done in parallel or simultaneously. The establishment of each TCP session and determination of what type of data traffic it will carry may be done prior to determining ACK/NACK reporting frequency and/or verification frequency for the TCP session. In various embodiments, the ACK/NACK reporting frequency and/or verification frequency (e.g., number of TCP data packets from a set of TCP data packets to be verified) is dynamically updated and changed for one or more established TCP sessions. The updates, adjustments and changes for example being based on the amount of uplink data congestion being experienced by the wireless base station (e.g., with respect to the particular TCP session), the quality of the data channel being used for the transmission of TCP data packets of the TCP session, the rate of transmission supported by the channel used for the transmission of the TCP data packets of the TCP session, and/or the number of ACKs and/or NACKs received over a period of time.

Various exemplary numbered embodiments illustrating different features of the present invention will now be discussed. The various features discussed may be used in variety of different combinations. The numbered embodiments are only exemplary and are not meant to be limiting to the scope of the invention.

LIST OF FIRST SET OF EXEMPLARY NUMBERED METHOD EMBODIMENTS

Method Embodiment 1. A communications method comprising: establishing a first Transmission Control Protocol (TCP) session between a wireless base station (e.g., first CBSD) and a Cable Modem Termination System (CMTS); receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

Method Embodiment 1A. The communications method of Method Embodiment 1, further comprising: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to the type of ACK/NACK verification that is to be utilized in connection with sets of TCP data packets received via the first TCP session from the cable modem.

Method Embodiment 1B. The communications method of Method Embodiment 1A, wherein the type of ACK/NACK verification is one of the following: (i) ACK/NACK verification for each TCP data packet received by the CMTS via the first TCP session or (ii) infrequent ACK/NACK verification, said infrequent ACK/NACK verification being verification of a percentage or portion of the total number of TCP data packets in a received set of TCP data packets received by the CMTS via the first TCP session (e.g., verifying a subset of the TCP data packets received from a first set of TCP data packets received).

Method Embodiment 1B1. The communications method of Method Embodiment 1, wherein infrequent ACK/NACK verification includes performing a verification test on only a subset of TCP data packets received from a set of TCP data packets (e.g., a verification test is performed on 10 TCP data packets received out of a first set of 100 TCP data packets (the 100 TCP data packets being equal to the size of the cable modem upstream buffer used for storing TCP data packets received from the wireless base station and destined for the CMTS)).

Method Embodiment 1C. The communications method of Method Embodiment 1, further comprising: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to an ACK/NACK verification frequency percentage, said ACK/NACK verification frequency percentage being a percentage of TCP data packets received in a received set of TCP data packets for which a verification test is to be performed (e.g., 100% means all TCP data packets in a received set of TCP data packets are to have a verification test performed on them, and 10% means only 10% of the TCP data packets in a received set of TCP data packets are to have a verification test performed on them).

Method Embodiment 1C1. The communications method of Method Embodiment 1C, further comprising: dynamically determining by the CMTS to change the ACK/NACK frequency percentage based on a first threshold value.

Method Embodiment 1C2. The communications method of Method Embodiment 1C1, wherein said dynamically determining by the CMTS to change the ACK/NACK verification frequency percentage based on the first threshold value includes reducing the ACK/NACK frequency percentage when a verification failure percentage falls below the first threshold value (e.g., the verification failure percentage being the number of TCP data sets which failed the verification test out of the total number of TCP data sets for which a verification test was performed within a specified time period—100 TCP data sets were tested during a first time period and only 1 data set failed—1% verification failure percentage is 1%, when the first threshold is 5% then then the verification failure percentage has fallen below the first threshold and the ACK/NACK frequency percentage will be reduced for example if it was 10% of received TCP data packets in a received set of data packets will be verified then it will be reduced to 8%.)

Method Embodiment 2. The communications method of Method Embodiment 1, wherein determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether the subset of TCP data packets of the first set of TCP data packets was correctly received by the CMTS (e.g., received without error such as being corrupted or altered during transmission).

Method Embodiment 3. The communications method of Method Embodiment 2, wherein said determining whether each of the TCP data packets of the subset of TCP data packets of the first set of TCP data packets was correctly received by the CMTS includes: performing a TCP checksum verification test on each of the TCP data packets of the subset of TCP data packets; and making a determination that the subset of TCP data packets of the first set of TCP data packets was correctly received when all of the TCP data packets of the subset of TCP data packets of the first set of TCP data packets pass the TCP checksum verification test; and making a determination that the subset of TCP data packets of the first set of TCP data packets was not correctly received when not all of the TCP data packets of the subset of TCP data packets of the first set of TCP data packets pass the TCP checksum verification test.

Method Embodiment 2A. The communications method of Method Embodiment 1, wherein determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether at least one of the TCP data packets of the subset of TCP data packets of the first set of TCP data packets was not correctly received by the CMTS (e.g., received with an error such as being corrupted or altered during transmission).

Method Embodiment 3A. The communications method of Method Embodiment 2, wherein said determining whether at least one of the TCP data packets of the subset of TCP data packets of the first set of TCP data packets was not correctly received by the CMTS (e.g., received with an error such as being corrupted or altered during transmission) includes: performing a TCP checksum verification test on each of the TCP data packets of the first set of TCP data packets; and making a determination that that subset of TCP data packets of the first set of TCP data packets was correctly received when all of the TCP data packets of the subset of TCP data packets of the first set of TCP data packets pass the TCP checksum verification test; and making a determination that that subset of TCP data packets of the first set of TCP data packets was not correctly received when at least one of the TCP data packets of the subset of TCP data packets of the first set of TCP data packets does not pass the TCP checksum verification test (e.g., a checksum error is detected).

Method Embodiment 4. The communications method of Method Embodiment 3 further comprising: sending an Acknowledgement (ACK) message from the CMTS to the wireless base station when the CMTS makes a determination that the subset of TCP data packets of the first set of TCP data packets was correctly received by the CMTS.

Method Embodiment 5. The communications method of Method Embodiment 4 further comprising: sending a Negative Acknowledgement (NACK) message from the CMTS to the wireless base station when the CMTS makes a determination that the subset of TCP data packets of the first set of TCP data packets was not correctly received by the CMTS.

Method Embodiment 6. The communications method of Method Embodiment 1, wherein the number of TCP data packets included in the first set of TCP data packets is equal to a first cable modem upstream buffer size, said first cable modem upstream buffer size being the size of a first cable modem upstream buffer located in the cable modem.

Method Embodiment 7. The communications method of Method Embodiment 1, further comprising: dynamically changing the percentage of received TCP data packets of a received set of TCP data packets to be verified at the CMTS for the first TCP session in response to receiving updated ACK/NACK verification frequency information from the wireless base station.

Method Embodiment 7A. The communications method of Method Embodiment 1, further comprising: dynamically changing the percentage of received TCP data packets of a received set of TCP data packets to be verified at the CMTS for the first TCP session from a first percentage to a second percentage in response to receiving an ACK/NACK verification frequency update message from the wireless base station, said ACK/NACK verification frequency update message including a new percentage of the total number of TCP data packets from each additional set of received TCP data packets for the first TCP session to be verified by the CMTS and the number of TCP data packets to be included in each additional set of TCP data packets for the first TCP session.

Method Embodiment 8. The communications method of Method Embodiment 7, further comprising: receiving, at the CMTS, a second set of TCP data packets via the first TCP session from the wireless base station via the cable modem subsequent to dynamically changing the percentage of received TCP data packets of a received set of TCP data packets to be verified at the CMTS for the first TCP session; and performing a verification test on a second subset of TCP data packets of the received second set of TCP data packets of the first TCP session.

Method Embodiment 9. The communications method of Method Embodiment 8, further comprising: making a determination as to whether to send an ACK or NACK message to the wireless base station for the second set of TCP data packets received at the CMTS based on the results of the verification test performed on the second subset of TCP data packets.

Method Embodiment 10. The communications method of Method Embodiment 8, further comprising: determining the number of TCP data packets to be included in the second subset of TCP data packets based on the updated ACK/NACK verification frequency information received by the CMTS.

Method Embodiment 11. The communications method of Method Embodiment 1, further comprising: determining, by the wireless base station, a percentage of TCP data packets from the first set of TCP data packets to be verified by the CMTS and communicating this information to the CMTS.

Method Embodiment 12. The communications method of Method Embodiment 11, wherein said determining, by the wireless base station, the percentage of TCP data packets from the first set of TCP data packets to be verified by the CMTS includes: making said determination based on one or more of the following: (i) the type of data (e.g., sensor data or non-sensor data) to be transmitted to the CMTS using the first TCP session, (ii) an amount of uplink data capacity allocated for the first TCP session at the wireless base station, and (iii) the amount of uplink data congestion at the wireless base station.

Method Embodiment 13. The communications method of Method Embodiment 12, further comprising: wherein the amount of uplink data congestion at the wireless base station is determined through monitoring the wireless base station available uplink buffer capacity for the first TCP session; and wherein the first wireless base station adjusts the percentage of TCP data packets per total number of TCP data packets in a set of TCP data packets to be verified by the CMTS based on determining through the monitoring that the amount of available uplink data buffer capacity for the first TCP session has fallen below a first threshold value or the amount of available uplink data buffer capacity has exceeded a second threshold value.

Method Embodiment 13A. The communications method of Method Embodiment 13, wherein said first threshold value is less than said second threshold value; wherein said wireless base station increases the percentage of TCP data packets of a set of TCP data packets for the first TCP session which are to be verified when the amount of available uplink data buffer capacity has exceeded the second threshold value (i.e., when there is excess uplink data capacity and no issue with uplink buffer overflow); and wherein the wireless base station decreases the percentage of TCP data packets of a set of TCP data packets for the first TCP session which are to be verified when the amount of available uplink data buffer capacity has fallen below a first threshold (e.g., when the congestion at the wireless base station indicates that the uplink data buffer for the first TCP session may overflow).

Method Embodiment 14. The communications method of claim 1, further comprising: establishing a second TCP session between the wireless base station and the CMTS; receiving via the second TCP session at the CMTS a second set of TCP data packets from the cable modem; and determining, by the CMTS, the frequency of reporting or sending ACK or NACK messages to the wireless base station for received TCP data packets based on instructions received from the wireless base station.

Method Embodiment 15. The communications method of Method Embodiment 14, wherein the data communicated in the TCP data packets of the first TCP session include sensor data; wherein the data communicated in the TCP data packets of the second TCP session include non-sensor data; and wherein the frequency of reporting or sending ACK or NACK messages to the wireless base station for the received TCP data packets of the first TCP session and the second TCP session is based on the data type.

LIST OF FIRST SET OF EXEMPLARY NUMBERED APPARATUS EMBODIMENTS

System Embodiment 1. A communications system comprising: a cable modem termination system (CMTS) including: a memory, said memory including an uplink buffer and a downlink buffer; and a first processor that controls the CMTS to perform the following operations: establishing a first Transmission Control Protocol (TCP) session between a wireless base station (e.g., first CBSD) and the Cable Modem Termination System; receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

System Embodiment 1A. The communications system System Embodiment 1, wherein the first processor further controls the cable modem termination system to perform the following additional operation: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to the type of ACK/NACK verification that is to be utilized in connection with sets of TCP data packets received via the first TCP session from the cable modem.

System Embodiment 1B. The communications system of System Embodiment 1A, wherein the type of ACK/NACK verification is one of the following: (i) ACK/NACK verification for each TCP data packet received by the CMTS via the first TCP session or (ii) infrequent ACK/NACK verification, said infrequent ACK/NACK verification being verification of a percentage or portion of the total number of TCP data packets in a received set of TCP data packets received by the CMTS via the first TCP session (e.g., verifying a subset of the TCP data packets received from a first set of TCP data packets received).

System Embodiment 1B1. The communications method of System Embodiment 1, wherein infrequent ACK/NACK verification includes performing a verification test on only a subset of TCP data packets received from a set of TCP data packets (e.g., a verification test is performed on 10 TCP data packets received out of a first set of 100 TCP data packets (the 100 TCP data packets being equal to the size of the cable modem upstream buffer used for storing TCP data packets received from the wireless base station and destined for the CMTS)).

System Embodiment 1C. The communications system of System Embodiment 1, wherein said first processor further controls the CMTS to perform the following additional operation: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to an ACK/NACK verification frequency percentage, said ACK/NACK verification frequency percentage being a percentage of TCP data packets received in a received set of TCP data packets for which a verification test is to be performed (e.g., 100% means all TCP data packets in a received set of TCP data packets are to have a verification test performed on them, and 10% means only 10% of the TCP data packets in a received set of TCP data packets are to have a verification test performed on them).

System Embodiment 1C1. The communications system of System Embodiment 1C, wherein the first processor further controls the CMTS to perform the following additional operation: dynamically determining by the CMTS to change the ACK/NACK frequency percentage based on a first threshold value.

System Embodiment 1C2. The communications system of System Embodiment 1C1, wherein said dynamically determining by the CMTS to change the ACK/NACK verification frequency percentage based on the first threshold value includes reducing the ACK/NACK frequency percentage when a verification failure percentage falls below the first threshold value (e.g., the verification failure percentage being the number of TCP data sets which failed the verification test out of the total number of TCP data sets for which a verification test was performed within a specified time period—100 TCP data sets were tested during a first time period and only 1 data set failed—1% verification failure percentage is 1%, when the first threshold is 5% then then the verification failure percentage has fallen below the first threshold and the ACK/NACK frequency percentage will be reduced for example if it was 10% of received TCP data packets in a received set of data packets will be verified then it will be reduced to 8%.)

System Embodiment 2. The communications system of System Embodiment 1, wherein determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether the subset of TCP data packets of the first set of TCP data packets was correctly received by the CMTS (e.g., received without error such as being corrupted or altered during transmission).

System Embodiment 3. The communications system of System Embodiment 2, wherein said determining whether each of the TCP data packets of the subset of TCP data packets of the first set of TCP data packets was correctly received by the CMTS includes: performing a TCP checksum verification test on each of the TCP data packets of the subset of TCP data packets; and making a determination that the subset of TCP data packets of the first set of TCP data packets was correctly received when all of the TCP data packets of the subset of TCP data packets of the first set of TCP data packets pass the TCP checksum verification test; and making a determination that the subset of TCP data packets of the first set of TCP data packets was not correctly received when not all of the TCP data packets of the subset of TCP data packets of the first set of TCP data packets pass the TCP checksum verification test.

System Embodiment 2A. The communications system of System Embodiment 1, wherein determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets includes: determining whether at least one of the TCP data packets of the subset of TCP data packets of the first set of TCP data packets was not correctly received by the CMTS (e.g., received with an error such as being corrupted or altered during transmission).

System Embodiment 3A. The communications system of System Embodiment 2, wherein said determining whether at least one of the subset of TCP data packets of the first set of TCP data packets was not correctly received by the CMTS (e.g., received with an error such as being corrupted or altered during transmission) includes: performing a TCP checksum verification test on each of the TCP data packets of the first set of TCP data packets; and making a determination that that subset of TCP data packets of the first set of TCP data packets was correctly received when all of the TCP data packets of the subset of TCP data packets of the first set of TCP data packets pass the TCP checksum verification test; and making a determination that that subset of TCP data packets of the first set of TCP data packets was not correctly received when at least one of the TCP data packets of the subset of TCP data packets of the first set of TCP data packets does not pass the TCP checksum verification test (e.g., a checksum error is detected).

System Embodiment 4. The communications system of System Embodiment 3, wherein the first processor further controls the CMTS to perform the following additional operation: sending an Acknowledgement (ACK) message from the CMTS to the wireless base station when the CMTS makes a determination that the subset of TCP data packets of the first set of TCP data packets was correctly received by the CMTS.

System Embodiment 5. The communications system of System Embodiment 4, wherein the first processor further controls the CMTS to perform the following additional operation: sending a Negative Acknowledgement (NACK) message from the CMTS to the wireless base station when the CMTS makes a determination that the subset of TCP data packets of the first set of TCP data packets was not correctly received by the CMTS.

System Embodiment 6. The communications system of System Embodiment 1, wherein the number of TCP data packets included in the first set of TCP data packets is equal to a first cable modem upstream buffer size, said first cable modem upstream buffer size being the size of a first cable modem upstream buffer located in the cable modem.

System Embodiment 7. The communications system of System Embodiment 1, wherein the first processor further controls the CMTS to perform the following additional operation: dynamically changing the percentage of received TCP data packets of a received set of TCP data packets to be verified at the CMTS for the first TCP session in response to receiving updated ACK/NACK verification frequency information from the wireless base station.

System Embodiment 7A. The communications system of System Embodiment 1, wherein the first processor further controls the CMTS to perform the following additional operation: dynamically changing the percentage of received TCP data packets of a received set of TCP data packets to be verified at the CMTS for the first TCP session from a first percentage to a second percentage in response to receiving an ACK/NACK verification frequency update message from the wireless base station, said ACK/NACK verification frequency update message including a new percentage of the total number of TCP data packets from each additional set of received TCP data packets for the first TCP session to be verified by the CMTS and the number of TCP data packets to be included in each additional set of TCP data packets for the first TCP session.

System Embodiment 8. The communications system of System Embodiment 7, wherein the first processor further controls the CMTS to perform the following additional operation: receiving at the CMTS a second set of TCP data packets via the first TCP session from the wireless base station via the cable modem subsequent to dynamically changing the percentage of received TCP data packets of a received set of TCP data packets to be verified at the CMTS for the first TCP session; and performing a verification test on a second subset of TCP data packets of the received second set of TCP data packets.

System Embodiment 9. The communications system of System Embodiment 8, wherein the first processor further controls the cable modem termination system to perform the following additional operation: making a determination as to whether to send an ACK or NACK message to the wireless base station for the second set of TCP data packets received at the CMTS based on the results of the verification test performed on the second subset of TCP data packets.

System Embodiment 10. The communications system of System Embodiment 8, wherein the first processor further controls the CMTS to perform the following additional operation: determining the number of TCP data packets to be included in the second subset of TCP data packets based on the updated ACK/NACK verification frequency information received by the CMTS.

System Embodiment 11. The communications system of claim 1, wherein the wireless base station determines a percentage of TCP data packets from the first set of TCP data packets to be verified by the CMTS and communicates this information to the CMTS.

12. The communications system of System Embodiment 11, wherein said determining, by the w System Embodiment ireless base station, the percentage of TCP data packets from the first set of TCP data packets to be verified by the CMTS includes: making said determination based on one or more of the following: (i) the type of data (e.g., sensor data or non-sensor data) to be transmitted to the CMTS using the first TCP session, (ii) an amount of uplink data capacity allocated for the first TCP session at the wireless base station, and (iii) the amount of uplink data congestion at the wireless base station.

System Embodiment 13. The communications system of System Embodiment 12, wherein the amount of uplink data congestion at the wireless base station is determined through monitoring the wireless base station available uplink buffer capacity for the first TCP session; and wherein the first wireless base station adjusts the percentage of TCP data packets per total number of TCP data packets in a set of TCP data packets to be verified by the CMTS based on determining through the monitoring that the amount of available uplink data buffer capacity for the first TCP session has fallen below a first threshold value or the amount of available uplink data buffer capacity has exceeded a second threshold value.

System Embodiment 13A. The communications system of System Embodiment 13, wherein said first threshold value is less than said second threshold value; wherein said wireless base station increases the percentage of TCP data packets of a set of TCP data packets for the first TCP session which are to be verified when the amount of available uplink data buffer capacity has exceeded the second threshold value (i.e., when there is excess uplink data capacity and no issue with uplink buffer overflow); and wherein the wireless base station decreases the percentage of TCP data packets of a set of TCP data packets for the first TCP session which are to be verified when the amount of available uplink data buffer capacity has fallen below a first threshold (e.g., when the congestion at the wireless base station indicates that the uplink data buffer for the first TCP session may overflow).

System Embodiment 14. The communications system of System Embodiment 1, wherein the first processor further controls the CMTS to perform the following additional operations: establishing a second TCP session between the wireless base station and the CMTS; and receiving via the second TCP session at the CMTS a second set of TCP data packets from the cable modem; determining, by the CMTS, the frequency of reporting or sending ACK or NACK messages to the wireless base station for received TCP data packets based on instructions received from the wireless base station.

System Embodiment 15. The communications system of System Embodiment 14, wherein the data communicated in the TCP data packets of the first TCP session include sensor data; wherein the data communicated in the TCP data packets of the second TCP session include non-sensor data; and wherein the frequency of reporting or sending ACK or NACK messages to the wireless base station for the received TCP data packets of the first TCP session and the second TCP session is based on the data type.

LIST OF FIRST SET OF EXEMPLARY NUMBERED NON-TRANSITORY COMPUTER READABLE MEDIUM EMBODIMENTS

Non-transitory Computer Readable Medium Embodiment 1. A non-transitory computer readable medium including a first set of computer executable instructions which when executed by a processor of a cable modem termination system (CMTS) cause the CMTS to perform the steps of: establishing a first Transmission Control Protocol (TCP) session between a wireless base station (e.g., first CBSD) and the CMTS; receiving via the first TCP session at the CMTS a first set of TCP data packets (also referred to as TCP segments) from a cable modem located on a communications path between the wireless base station and the CMTS, said first set of TCP data packets having been sent by the wireless base station; and determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets.

Non-transitory Computer Readable Medium Embodiment 1A. The non-transitory computer readable medium of Non-transitory Computer Readable Medium Embodiment 1, wherein the first set of computer executable instructions which when executed by the first processor of the cable modem termination system further cause the cable modem termination system to perform the additional step of: prior to performing said operation of determining, by the CMTS, whether to send an Acknowledgement (ACK) message or a Negative Acknowledgement (NACK) message to the wireless base station for the entire first set of TCP data packets based on verifying a subset of TCP data packets of the first set of TCP data packets, receiving from the wireless base station by the CMTS an ACK/NACK verification frequency message, said ACK/NACK verification frequency message including information notifying the CMTS as to the type of ACK/NACK verification that is to be utilized in connection with sets of TCP data packets received via the first TCP session from the cable modem.

Non-transitory Computer Readable Medium Embodiment 1B. The communications system of Non-transitory Computer Readable Medium Embodiment 1A, wherein the type of ACK/NACK verification is one of the following: (i) ACK/NACK verification for each TCP data packet received by the CMTS via the first TCP session or (ii) infrequent ACK/NACK verification, said infrequent ACK/NACK verification being verification of a percentage or portion of the total number of TCP data packets in a received set of TCP data packets received by the CMTS via the first TCP session (e.g., verifying a subset of the TCP data packets received from a first set of TCP data packets received).

The techniques of various embodiments may be implemented using software, hardware and/or a combination of software and hardware. Various embodiments are directed to apparatus, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to methods, e.g., method of controlling and/or operating cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. Various embodiments are also directed to machine, e.g., computer, readable medium, e.g., ROM, RAM, CDs, hard discs, etc., which include machine readable instructions for controlling a machine to implement one or more steps of a method. The computer readable medium is, e.g., non-transitory computer readable medium.

It is understood that the specific order or hierarchy of steps in the processes and methods disclosed is an example of exemplary approaches. Based upon design preferences, it is understood that the specific order or hierarchy of steps in the processes and methods may be rearranged while remaining within the scope of the present disclosure. The accompanying method claims present elements of the various steps in a sample order, and are not meant to be limited to the specific order or hierarchy presented. In some embodiments, one or more processors are used to carry out one or more steps of the each of the described methods.

In various embodiments each of the steps or elements of a method are implemented using one or more processors. In some embodiments, each of elements or steps are implemented using hardware circuitry.

In various embodiments devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements described herein are implemented using one or more components to perform the steps corresponding to one or more methods, for example, generating or creating buffers, implementing timers, connections, message reception, message transmission, powering on and off receivers, transmitters, and or transceivers, buffering data, flushing data from buffers, determining buffer sizes and amount of time for a buffer to fill to its capacity, signal processing, sending, comparing, determining and/or transmission steps. Thus, in some embodiments various features are implemented using components or in some embodiments logic such as for example logic circuits. Such components may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more devices, servers, nodes and/or elements. Accordingly, among other things, various embodiments are directed to a machine-readable medium, e.g., a non-transitory computer readable medium, including machine executable instructions for causing a machine, e.g., processor and associated hardware, to perform one or more of the steps of the above-described method(s). Some embodiments are directed to a device, e.g., a controller, including a processor configured to implement one, multiple or all of the steps of one or more methods of the invention.

In some embodiments, the processor or processors, e.g., CPUs, of one or more devices, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements are configured to perform the steps of the methods described as being performed by the cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements. The configuration of the processor may be achieved by using one or more components, e.g., software components, to control processor configuration and/or by including hardware in the processor, e.g., hardware components, to perform the recited steps and/or control processor configuration. Accordingly, some but not all embodiments are directed to a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, with a processor which includes a component corresponding to each of the steps of the various described methods performed by the device in which the processor is included. In some but not all embodiments a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, includes a controller corresponding to each of the steps of the various described methods performed by the device in which the processor is included. The components may be implemented using software and/or hardware.

Some embodiments are directed to a computer program product comprising a computer-readable medium, e.g., a non-transitory computer-readable medium, comprising code for causing a computer, or multiple computers, to implement various functions, steps, acts and/or operations, e.g., one or more steps described above. Depending on the embodiment, the computer program product can, and sometimes does, include different code for each step to be performed. Thus, the computer program product may, and sometimes does, include code for each individual step of a method, e.g., a method of controlling a device, e.g., cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements, Session Management Function nodes/devices, subscriber devices, servers, nodes and/or elements. The code may be in the form of machine, e.g., computer, executable instructions stored on a computer-readable medium, e.g., a non-transitory computer-readable medium, such as a RAM (Random Access Memory), ROM (Read Only Memory) or other type of storage device. In addition to being directed to a computer program product, some embodiments are directed to a processor configured to implement one or more of the various functions, steps, acts and/or operations of one or more methods described above. Accordingly, some embodiments are directed to a processor, e.g., CPU, configured to implement some or all of the steps of the methods described herein. The processor may be for use in, e.g., a communications device such as a cable modems, cable modem termination systems, cable modem termination system power management devices, wireless base stations, wireless devices, mobile terminals, sensors, vehicles, user equipment, terminal, gNBs, CBSDs, CBRS tower base stations, smart devices, vehicles, user equipment devices, user devices, computers, smartphones, Spectrum Access Systems, Resource Allocation Management Devices, subscriber devices, servers, nodes and/or elements or other device described in the present application.

Numerous additional variations on the methods and apparatus of the various embodiments described above will be apparent to those skilled in the art in view of the above description. Such variations are to be considered within the scope. Numerous additional embodiments, within the scope of the present invention, will be apparent to those of ordinary skill in the art in view of the above description and the claims which follow. Such variations are to be considered within the scope of the invention.

What is claimed is:

1. A communications method comprising:

establishing a first communications session between a wireless base station and a Cable Modem Termination System (CMTS);

receiving, at the CMTS, from the wireless base station first Acknowledgement/Negative Acknowledgement (ACK/NACK) verification frequency information indicating a percentage of data packets from a set of data packets of the first communications session to be verified by the CMTS;

receiving at the CMTS a first set of data packets for the first communications session from a cable modem located on a communications path between the wireless base station and the CMTS, said first set of data packets having been sent by the wireless base station; and determining, by the CMTS, whether to send an Acknowledgement (ACK) message or a Negative Acknowledgement (NACK) message to the wireless base station for the entire first set of data packets based on verifying the percentage of data packets of the first set of data packets indicated in the first ACK/NACK verification information.

2. The communications method of claim 1, wherein said determining, by the CMTS, whether to send an Acknowledgement (ACK) message or a Negative Acknowledgement (NACK) message to the wireless base station for the entire first set of data packets based on verifying the percentage of data packets of the first set of data packets indicated in the first ACK/NACK verification information includes:

determining a subset of data packets from the first set of data packets using the first ACK/NACK verification frequency information; and determining whether the subset of data packets of the first set of data packets was correctly received by the CMTS.

3. The communications method of claim 2, wherein said determining whether the subset of data packets of the first set of data packets was correctly received by the CMTS includes:

performing a checksum verification test on each of the data packets of the subset of data packets; and making a determination that the subset of data packets of the first set of data packets was correctly received when all of the data packets of the subset of data packets of the first set of data packets pass the checksum verification test; and making a determination that the subset of data packets of the first set of data packets was not correctly received when not all of the data packets of the subset of data packets of the first set of data packets pass the checksum verification test.

4. The communications method of claim 3, further comprising:

sending a NACK message from the CMTS to the wireless base station when the CMTS makes a determination that the subset of data packets of the first set of data packets was not correctly received by the CMTS.

5. The communications method of claim 3, further comprising:

sending an ACK message from the CMTS to the wireless base station when the CMTS makes a determination that the subset of data packets of the first set of data packets was correctly received by the CMTS.

6. The method of claim 1, wherein said percentage of data packets from a set of data packets of the first communications session to be verified by the CMTS is based on data type of data being communicated in the first communications session.

7. The method of claim 1, wherein said percentage of data packets from a set of data packets of the first communications session to be verified by the CMTS is based on an amount of uplink data congestion being experienced by the wireless base station.

8. The method of claim 1, wherein said percentage of data packets from a set of data packets of the first communications session to be verified by the CMTS is based on data channel quality of a data channel being used for the transmission of the data packets of the first communications session.

9. The method of claim 1, wherein said percentage of data packets from a set of data packets of the first communications session to be verified by the CMTS is based on at least one of the following: (i) a quantity of NACK messages received by the wireless base station from the CMTS over a period of time, (ii) a quantity of ACK messages received by the wireless base station from the CMTS over a period of time, or (iii) a combination of both a quantity of ACK messages and a quantity of NACK messages received over a period of time.

10. The method of claim 1, wherein said percentage of data packets from a set of data packets of the first communications session to be verified by the CMTS is based on a rate of transmission supported by a channel used for the transmission of the data packets of the first communications session.

11. A Cable Modem Termination System (CMTS) comprising:

memory; and a first processor that controls the CMTS to perform the following operations:

establishing a first communications session between a wireless base station and the CMTS;

receiving from the wireless base station first Acknowledgement/Negative Acknowledgement (ACK/NACK) verification frequency information indicating a percentage of data packets from a set of data packets of the first communications session to be verified by the CMTS;

receiving a first set of data packets for the first communications session from a cable modem located on a communications path between the wireless base station and the CMTS, said first set of data packets having been sent by the wireless base station; and determining whether to send an Acknowledgement (ACK) message or a Negative Acknowledgement (NACK) message to the wireless base station for the entire first set of data packets based on verifying the percentage of data packets of the first set of data packets indicated in the first ACK/NACK verification information.

12. The Cable Modem Termination System of claim 11, wherein said determining whether to send an Acknowledgement (ACK) message or a Negative Acknowledgement (NACK) message to the wireless base station for the entire first set of data packets based on verifying the percentage of data packets of the first set of data packets includes:

determining a subset of data packets from the first set of data packets using the first ACK/NACK verification frequency information; and determining whether the subset of data packets of the first set of data packets was correctly received by the CMTS.

13. The Cable Modem Termination System of claim 12, wherein said determining whether the subset of data packets of the first set of data packets was correctly received by the CMTS includes:

performing a checksum verification test on each of the data packets of the subset of data packets;

making a determination that the subset of data packets of the first set of data packets was correctly received when all of the data packets of the subset of data packets of the first set of data packets pass the checksum verification test; and making a determination that the subset of data packets of the first set of data packets was not correctly received when not all of the data packets of the subset of data packets of the first set of data packets pass the checksum verification test.

14. The Cable Modem Termination System of claim 13, wherein said first processor further controls the CMTS to perform the following additional operations:

sending a NACK message from the CMTS to the wireless base station when the CMTS makes a determination that the subset of data packets of the first set of data packets was not correctly received by the CMTS; and sending an ACK message from the CMTS to the wireless base station when the CMTS makes a determination that the subset of data packets of the first set of data packets was correctly received by the CMTS.

15. The Cable Modem Termination System of claim 11, wherein said percentage of data packets from a set of data packets of the first communications session to be verified by the CMTS is based on data type of data being communicated in the first communications session.

16. The Cable Modem Termination System of claim 11, wherein said percentage of data packets from a set of data packets of the first communications session to be verified by the CMTS is based on an amount of uplink data congestion being experienced by the wireless base station.

17. The Cable Modem Termination System of claim 11, wherein said percentage of data packets from a set of data packets of the first communications session to be verified by the CMTS is based on data channel quality of a data channel being used for the transmission of the data packets of the first communications session.

18. The Cable Modem Termination System of claim 11, wherein said percentage of data packets from a set of data packets of the first communications session to be verified by the CMTS is based on at least one of the following: (i) a quantity of NACK messages received by the wireless base station from the CMTS over a period of time, (ii) a quantity of ACK messages received by the wireless base station from the CMTS over a period of time, or (iii) a combination of both a quantity of NACK messages and a quantity of ACK messages received over a period of time.

19. The Cable Modem Termination System of claim 11, wherein said percentage of data packets from a set of data packets of the first communications session to be verified by the CMTS is based on a rate of transmission supported by a channel used for the transmission of the data packets of the first communications session.

20. A non-transitory computer readable medium including a first set of computer executable instructions which when executed by a processor of a Cable Modem Termination System (CMTS) cause the CMTS to perform the steps of:

establishing a first communications session between a wireless base station and the CMTS;

receiving from the wireless base station first Acknowledgement/Negative Acknowledgement (ACK/NACK) verification frequency information indicating a percentage of data packets from a set of data packets of the first communications session to be verified by the CMTS;

receiving a first set of data packets for the first communications session from a cable modem located on a communications path between the wireless base station and the CMTS, said first set of data packets having been sent by the wireless base station; and determining whether to send an Acknowledgement (ACK) message or a Negative Acknowledgement (NACK) message to the wireless base station for the entire first set of data packets based on verifying the percentage of data packets of the first set of data packets indicated in the first ACK/NACK verification information.

* * * * *